(12) United States Patent
Aklian

(10) Patent No.: US 10,467,594 B2
(45) Date of Patent: Nov. 5, 2019

(54) SYSTEMS AND METHODS FOR DESIGNING, DEVELOPING, AND SHARING ASSAYS

(75) Inventor: Mannix Aklian, West Windsor, NJ (US)

(73) Assignee: Label Independent, Inc., West Windsor, NJ (US)

( * ) Notice: Subject to any disclaimer, the term of this patent is extended or adjusted under 35 U.S.C. 154(b) by 594 days.

(21) Appl. No.: 13/566,654

(22) Filed: Aug. 3, 2012

(65) Prior Publication Data

US 2014/0040058 A1 Feb. 6, 2014

(51) Int. Cl.
*G06Q 10/10* (2012.01)
*G06F 16/93* (2019.01)

(52) U.S. Cl.
CPC ........... *G06Q 10/103* (2013.01); *G06F 16/93* (2019.01); *G06Q 10/101* (2013.01)

(58) Field of Classification Search
None
See application file for complete search history.

(56) References Cited

U.S. PATENT DOCUMENTS

| | | | |
|---|---|---|---|
| 6,618,852 B1 | 9/2003 | van Eikeren et al. | |
| 2003/0120933 A1* | 6/2003 | Taylor | G06K 9/00154 713/186 |
| 2003/0222905 A1 | 12/2003 | Wierenga et al. | |
| 2004/0143834 A1* | 7/2004 | O'Rourke | G05B 15/02 718/100 |
| 2004/0220897 A1* | 11/2004 | Bernhart | G01N 27/44717 |

(Continued)

FOREIGN PATENT DOCUMENTS

| | | | | |
|---|---|---|---|---|
| WO | WO 0108036 A2 * | 2/2001 | ............ | G06F 17/00 |
| WO | WO-2001008036 A2 | 2/2001 | | |

(Continued)

OTHER PUBLICATIONS

Nelson et al. "Lab Key Server: An open source platform for scientific data integration, analysis and collaboration" BMC Bioinformatics 2011, 12:71 http://www.biomedcentral.com/1471-2105/12/71 (Year: 2011).*

(Continued)

*Primary Examiner* — Kathleen Palavecino
*Assistant Examiner* — Lance Y Cai
(74) *Attorney, Agent, or Firm* — Gabriel & Pelaez, PLLC; Michael G. Gabriel

(57) ABSTRACT

Described are computer-based methods and apparatuses, including computer program products, for designing assays. A database stores a set of user-selectable element data objects, a set of user-selectable operation data objects, and a set of validation rules for the one or more assays that can be used to determine whether an assay is valid. Data is received that is indicative of selecting, for a candidate assay specification, a first set of element data objects and a first set of operation data objects. The candidate assay specification is generated based on the received data. The candidate assay specification is validated. An assay data file is generated for the candidate assay specification that includes the first set of element data objects and the first set of operation data objects, such that the assay data file can be shared among a set of users.

19 Claims, 45 Drawing Sheets

(56) References Cited

U.S. PATENT DOCUMENTS

| | | | |
|---|---|---|---|
| 2008/0177612 A1* | 7/2008 | Starink | G06Q 10/06 |
| | | | 705/7.26 |
| 2008/0201159 A1* | 8/2008 | Gabrick | G06F 17/30011 |
| | | | 705/1.1 |
| 2009/0132285 A1 | 5/2009 | Jakobovits | |
| 2010/0324722 A1* | 12/2010 | Fritchie | G01N 35/00732 |
| | | | 700/214 |
| 2011/0022331 A1 | 1/2011 | Clinton et al. | |

FOREIGN PATENT DOCUMENTS

| | | |
|---|---|---|
| WO | W002066961 A1 | 8/2002 |
| WO | WO-2009132285 A1 | 10/2009 |

OTHER PUBLICATIONS

International Search Report and Written Opinion for International Application No. PCT/US13/53453 dated Dec. 20, 2013. 8 pages.
State Intellectual Property Office of the People's Republic of China Search Report for Chinese Application No. 201380050169.1 and Notification of the First Office Action dated May 15, 2017, 15pages.
European Search Report and European Search Opinion for EPO Application No. 13826416.3-1958 dated Feb. 9, 2016, 8 pages.
European Examination Report for Application No. 13826416.3-1958 dated Oct. 27, 2016, 8 pages.

\* cited by examiner

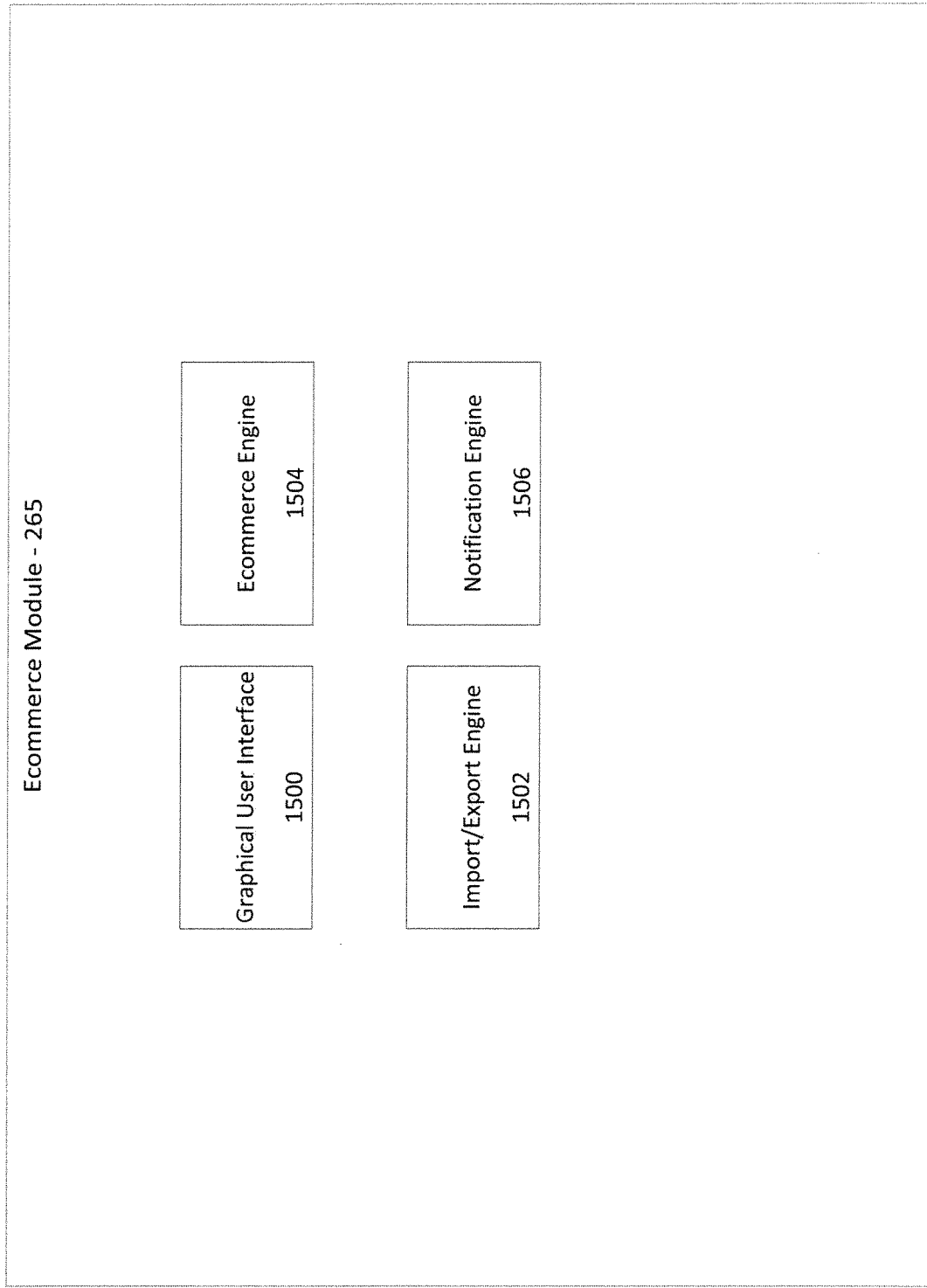

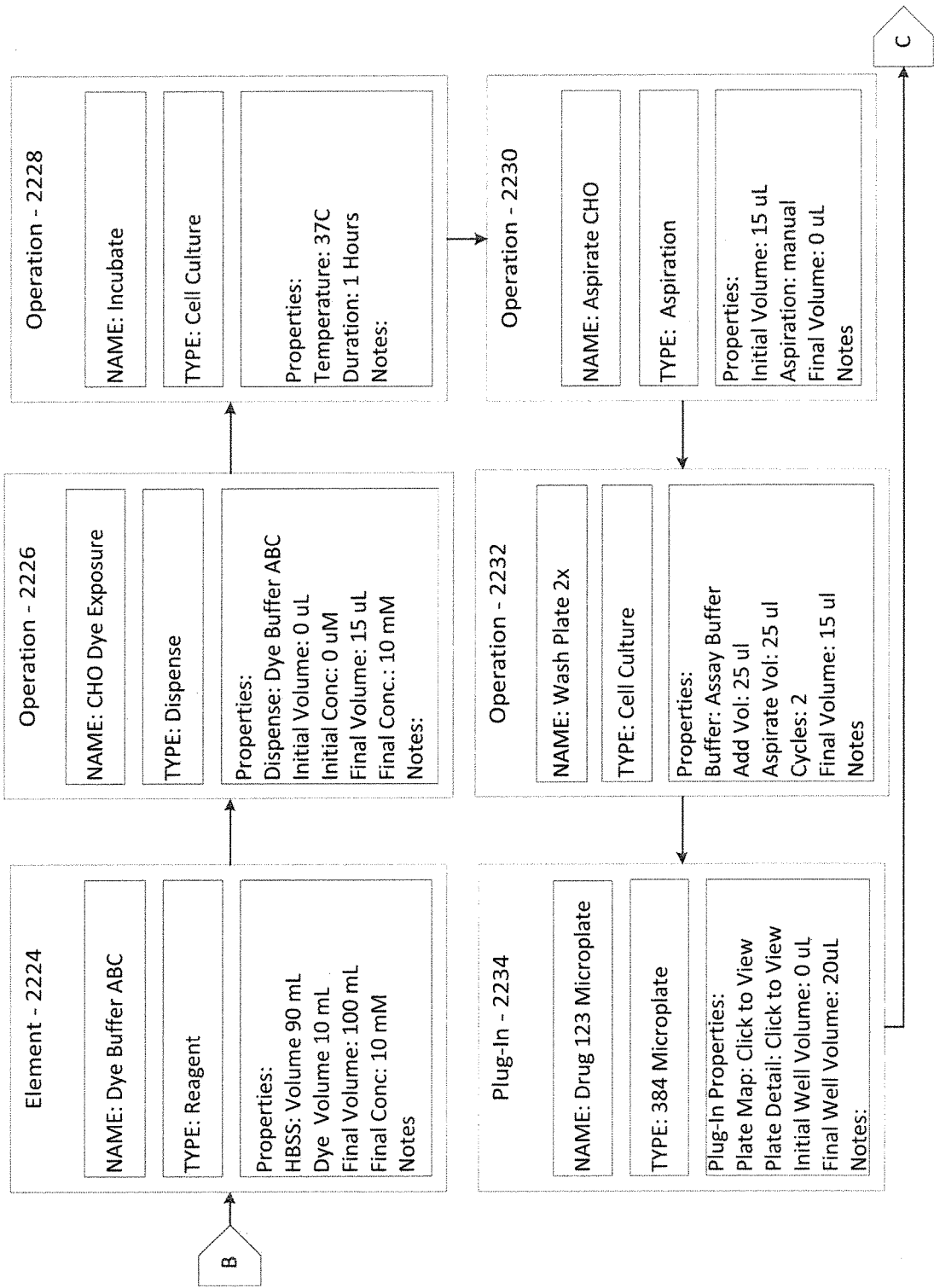

Fig. 25A

User: John Doe
Time: 15:37
Date: 21JAN2975

Element:
NAME: Culture Flask
TYPE: Consumable
Properties:
Manufacturer
Model Number
Volume Capacity
Initial Volume
Notes:

Element:
Name: Culture Media
TYPE: Reagent
Properties:
HBSS: Volume 89ML
FBS: Vol 10mL
Pen/Strep: Vol 1mL
Final Volume: 100ML
Notes Element:
NAME: CHO Cells
TYPE: Biologics
Properties:
Cell Type: CHO
Passage Number: 4
Condition: Frozen Aliquot
Notes

Fig. 25B

Operation
NAME: Warm Media
TYPE: Cell Culture
Properties:
Temperature: 37C
Duration: 20 min
Notes:

Operation
NAME: Cell Transfer
TYPE: Cell Cuture
Properties:
Cell Volume: 1mL
Media Volume: 49mL
Final Volume: 50mL
Notes:

Operation
NAME: Cell Count
TYPE: Cell Culture
Properties:
Counter Type:
Counter Model:
Volume Tested: 1 mL
Count: 200,000 cells/mL
Notes:

Fig. 25C

Operaton
NAME: Dilution
TYPE: Cell Culture
Properties:
Initial Volume:
Initial Concentration:
Final Volume:
Final Concentration:
Notes:

Plug-In
NAME: Cell Microplate
TYPE: 384 Microplate
Plug-In Properties:
Plate Map: Click to View
Plate Detail: Click to View
Initial Well Volume: 0 uL
Final Well Volume: 20uL
Notes:

Operation
NAME: Incubate
TYPE: Cell Culture
Properties:
Temperature: 37C
Duration: 24 Hours
Notes:

Fig. 25D

Operation
NAME: CHO Confluence
TYPE: Cell Observation
Properties:
Type: Microscopy
Settings: 100x
Notes: Appear to be 95% confluent.

Operation
NAME: Aspirate CHO
TYPE: Aspiration
Properties:
Initial Volume: 20uL
Aspiration: manual
Final Volume: 0 uL
Notes Operation
NAME: Wash Plate 2x
TYPE: Cell Culture
Properties:
Buffer: HBSS
Add Vol: 25 ul
Aspirate Vol: 25 ul
Cycles: 2
Final Volume: 0 ul
Notes

Fig. 25E

Element
NAME: Dye Buffer ABC
TYPE: Reagent
Properties:
HBSS: Volume 90 mL
Dye Volume 10 mL
Final Volume: 100 mL
Final Conc: 10 mM
Notes Operation
NAME: CHO Dye Load
TYPE: Dispense
Properties:
Dispense: Dye Buffer ABC
Initial Volume: 0 uL
Initial Conc: 0 uM
Final Volume: 15 uL
Final Conc.: 10 mM
Notes:

Operation
NAME: Incubate
TYPE: Cell Culture
Properties:
Temperature: 37C
Duration: 1 Hours
Notes:

Fig. 25F

Operation
NAME: Aspirate CHO
TYPE: Aspiration
Properties:
Initial Volume: 15 uL
Aspiration: manual
Final Volume: 0 uL
Notes Operation
NAME: Wash Plate 2x
TYPE: Cell Culture
Properties:
Buffer: Assay Buffer
Add Vol: 25 ul
Aspirate Vol: 25 ul
Cycles: 2
Final Volume: 15 ul
Notes Plug-In
NAME: Drug 123 Microplate
TYPE: 384 Microplate
Plug-In Properties:
Plate Map: Click to View
Plate Detail: Click to View
Initial Well Volume: 0 uL
Final Well Volume: 20uL
Notes:

Fig. 25G

Element
NAME: Reader ABC
TYPE: Hardware
Properties:
Device Make/Model:
Read: 350 nM
Interval: 1 sec
Reads: 30
Notes: Baseline read.

Operation
NAME: Drug Addition
TYPE: Plate/Plate Addition
Properties:
Source Plate: Drug 123
Initial Volume: 20 uL
Initial Conc: 20 mM
Destination Plate: Cell
Final Volume: 30 uL
Final Conc.: 10 mM
Transfer Volume: 15uL
Notes:

Element
NAME: Reader ABC
TYPE: Hardware
Properties:
Device Make/Model:
Read: 350 nM
Interval: 1 sec
Reads: 30
Notes: Post-Addition read.

Fig. 25H

Operation
NAME: CHO Cells Data
TYPE: Raw Data Export
Properties:
File Type: ASCII
Parser: Reader 123
Notes Plug-In
NAME: CHO Cells Result
TYPE: Reader 123 Plot
Properties:
Graph Type: Click to View
Notes:

Save/Signature
NAME: CHO Cells Assay
TYPE: Save Assay
Properties:
Save Assay: Complete
Share Assay: Click to Edit
Signature: John Doe
Date: 21JAN1975

SYSTEMS AND METHODS FOR DESIGNING, DEVELOPING, AND SHARING ASSAYS

TECHNICAL FIELD

The present invention is generally directed to the design, development, execution, analysis, and sharing of experimental assays. More specifically, the present techniques described herein provides a system by which scientists and engineers can create assays using a software platform that allows for development, execution, and analysis using a graphical user interface. The files may be shared using the software to allow collaboration, documentation, and improved productivity.

BACKGROUND

Many laboratory and healthcare personnel currently conduct assays (experiments) using paper notebooks and generic office software. Unfortunately, the current systems employed do not allow for a unified system to design, develop, evaluate, execute, optimize, analyze, and share assays.

Many scientists store their protocols using a combination of methods and rely heavily on paper documents to create protocols and share results. This creates several problems in cases where a notebook is lost, a file is missing, and the notes are misinterpreted by others. Furthermore, strict regulatory guidelines require audits where it may be difficult, if not impossible, to locate particular protocols as there is no search capability for hand-written documents.

As scientists design and develop their assays they often search the available literature via local libraries and the World Wide Web. They must often read through large volumes of protocols, in an attempt to build their own assay protocol. This process is time intensive, and once an assay is developed, simple math errors result in unreliable data. Furthermore, assay variation can result from lack of documenting all required parameters.

SUMMARY

The techniques disclosed herein allow users to rapidly design and develop assays on a unified platform that is completely amenable to user customization, yet provides a system which allows uniform and reliable documentation of all protocols, procedures, and components. A system which is comprised of a library of elements and operations which can be displayed through a graphical user interface (GUI) and customized by adding various properties, parameters, and custom plug-ins. Elements, operations, and plug-ins are available from a library of components either provided with the software or created by the user. These library components can also be provided by other users or technology providers to allow user to easily implement their assay protocols or integrate components into the user's new protocol. Furthermore, previously used components can be added to the new assay design via a drag-drop GUI interface where the properties are updated without the need for repetitive documentation. This creates tremendous efficiency for the user.

Disclosed subject matter includes a computerized method for electronically defining and validating an assay so the assay can be easily shared among a set of users. The computerized method includes storing, by a computing device, in a database (1) a set of user-selectable element data objects, each element data object defining a physical component that can be used in one or more assays, (2) a set of user-selectable operation data objects, each operation data object defining an action that can be performed for one or more element data objects from the set of element data objects for the one or more assays, and (3) a set of validation rules for the one or more assays that can be used to determine, for each assay of the one or more assays, whether an associated set of element data objects from the set of element data objects and an associated set of operation data objects from the set of operation data objects define a valid assay. The computerized method includes receiving, by the computing device, data indicative of selecting, for a candidate assay specification (1) a first set of element data objects from the set of element data objects, and (2) a first set of operation data objects from the set of operation data objects, each operation data object from the first set of operation data objects defining an action to perform on one or more of the element data objects from the first set of element data objects. The computerized method includes generating, by the computing device, the candidate assay specification based on the received data, the candidate assay specification comprising the first set of element data objects and the first set of operation data objects. The computerized method includes validating, by the computing device, the first set of element data objects and the first set of operation data objects for the candidate assay specification to determine the candidate assay specification is valid. The computerized method includes generating, by the computing device, an assay data file for the candidate assay specification that includes the first set of element data objects and the first set of operation data objects, such that the assay data file can be shared among a set of users.

In some embodiments, the computerized method includes generating step-by-step execution instructions for the candidate assay specification, each step listing one or more physical components from the first set of element data objects, and one or more actions, from the set of operation data objects, to perform on the one or more physical components. The computerized method includes displaying a first step from the step-by-step execution instructions, receiving data indicative of a completion of the first step, and recording a completion timestamp of the first step.

In some embodiments, generating the assay data file includes receiving data indicative of a request to share a subset of the candidate assay specification. The computerized method includes generating an abbreviated assay data file that includes a subset of element data objects from the first set of element data objects, the subset of element data objects being associated with the subset of the candidate assay specification, and a subset of operation data objects from the first set of operation data objects, the subset of operation data objects being associated with the subset of the candidate assay specification.

In some embodiments, generating the assay data file includes receiving data indicative of a request to share the assay data file based on one or more user profile attributes, generating a collaboration group based on the one or more user profile attributes, sharing the assay data file with the collaboration group, and storing a number of views of the assay data file by one or more group members in the collaboration group.

In some embodiments, data indicative of a request to purchase a physical component defined by an element data object is received, wherein the element data object includes data indicative of a vendor of the physical component, and an order request is transmitted to the vendor for the physical component.

In some embodiments, generating the candidate assay specification comprises converting a graphical representation of the selected first set of element data object and the first set of operation data objects to a text-based assay data file.

In some embodiments, data indicative of a request to load a second assay data file is received, and a graphical representation of the second assay data file is generated.

In some embodiments, the techniques described herein allow for rapid documentation where linked elements, operations, and plug-in properties are updated by the user and generate a full-detail report via a transaction log file.

In some embodiments, the techniques described herein allow the user to instantly create full assay transaction files of the procedures performed, components used, and attach relevant data. Digital signatures and witness signatures can also be enabled for the purpose of maintaining regulatory compliance or intellectual property (IP) protection.

Furthermore, this transaction file allows the user or administrator to search for all assays based on query parameters. For example, if a certain reagent was found to be contaminated, a simple query can retrieve all assays which may have been impacted. It can provide the names of the users involved, time performed, locations, and additional specific information. These potential benefits can serve to identify and address potentially inaccurate data.

For example, if members of a global team are experiencing anomalous results, the search module can be used to determine if common components are being used by these users to isolate a potential root cause.

In addition, in some embodiments the techniques described herein allow users to share the full assay designs, protocols, data, and results over a network where other group members can download protocols and repeat them or modify them for their own purposes. The network can be on a corporate intranet, or on the World Wide Web to share with users globally.

The user can select which components of the assay he/she wishes to share such that only desired portions are shared with others. In some cases, a supervisor or administrator's approval can be required for sharing.

Users and technology providers can collaborate effectively and create custom library components allowing them to share new protocols, reagents, and also device drivers for new laboratory equipment which can be operated by the software using plug-ins and API modules.

In some embodiments, the techniques described herein can be used on a plurality of devices including desktop, laptop, server, mobile and tablet devices. This allows users to design their assay at their desk, and complete their assay in the lab from a tablet device (for example). This prevents cross-contamination resulting from current laboratory notebooks which move from office to lab and back to office providing opportunity for contamination.

Generally, the software can create an ecosystem and social collaboration network for scientists, engineers, technicians, and healthcare providers by creating a universal tool for assay design, development, execution, data management, storage, and sharing. This benefits 3 main types of users: the User, the organization (local community), and the global community.

The software defines assays as including elements, operations, plug-ins, and/or data. It defines an element as being a thing (e.g.: flask, cells, device, consumable, etc) and operations as being performed on these elements (e.g.: dispense, aspirate, incubate, etc). Notes/observations, intermediate results, and final results constitute data. Furthermore all elements and operations have properties which can be pre-defined or updated and customized by the user. Plug-ins include customized objects which may require additional parameters and can also be stored as templates (e.g.: a microplate template). The combination of elements, operations, and plugins allow for the creation of data.

BRIEF DESCRIPTION OF THE DRAWINGS

FIG. 15 is an exemplary architectural block diagram of the ecommerce module of certain embodiments;

FIG. 22C illustrates an exemplary process and assay workflow using the example assay described in FIGS. 21A and 21B, of certain embodiments;

FIG. 25A illustrates a portion of an exemplary transaction log file, of certain embodiments;

FIG. 25B illustrates a portion of an exemplary transaction log file, of certain embodiments;

FIG. 25C illustrates a portion of an exemplary transaction log file, of certain embodiments;

FIG. 25D illustrates a portion of an exemplary transaction log file, of certain embodiments;

FIG. 25E illustrates a portion of an exemplary transaction log file, of certain embodiments;

FIG. 25F illustrates a portion of an exemplary transaction log file, of certain embodiments;

FIG. 25G illustrates a portion of an exemplary transaction log file, of certain embodiments;

FIG. 25H illustrates a portion of an exemplary transaction log file, of certain embodiments;

DETAILED DESCRIPTION

Figure 1:
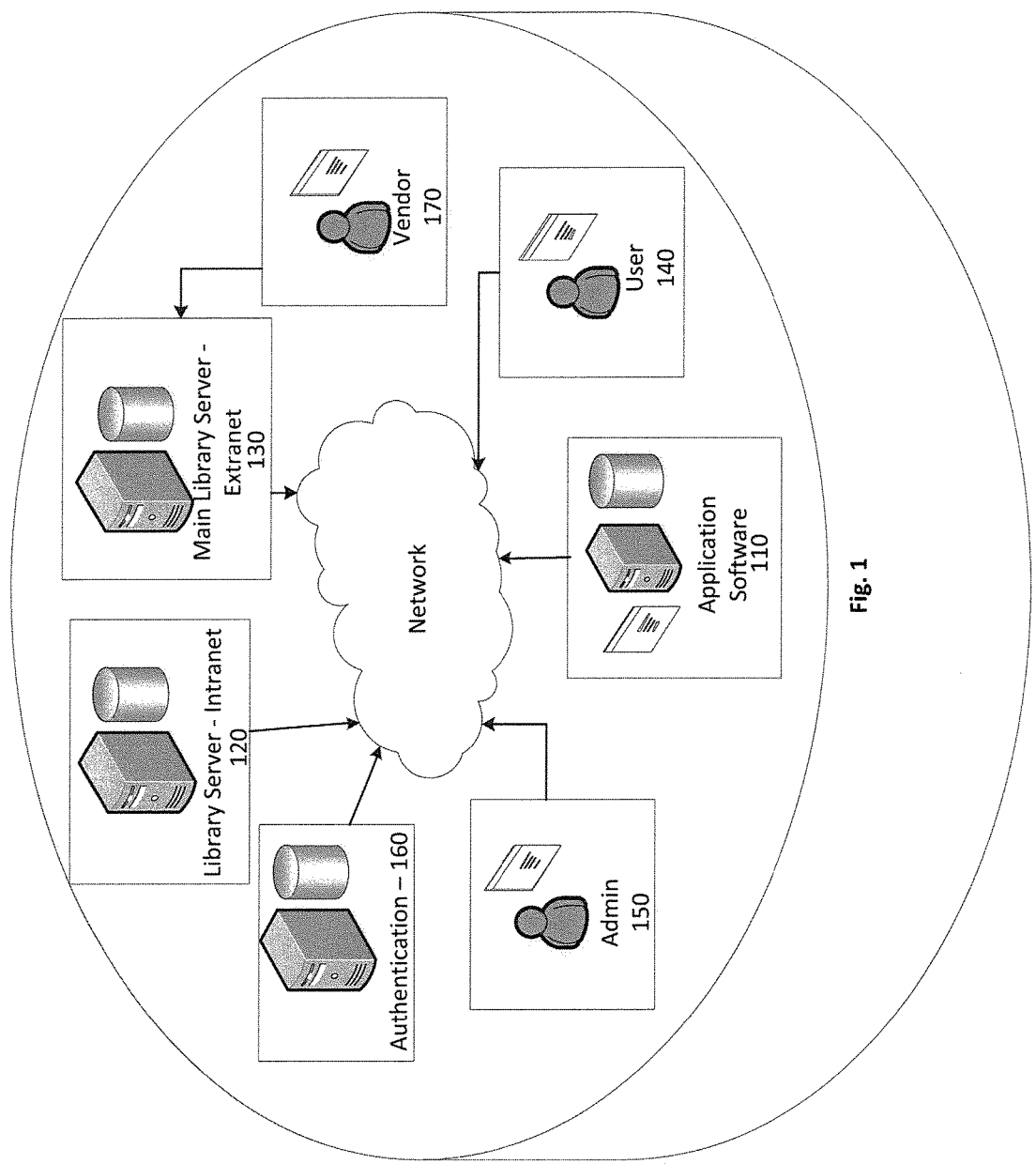
FIG. 1 is an exemplary block diagram of an example network architecture for designing assays, of certain embodiments.

FIG. 1 is a block diagram of an example network architecture that can provide the ability to design, develop, evaluate, execute, optimize, analyze, and/or share assays as an overview of the current techniques described herein. The system includes the Application Software (110), Library Server Intranet (120), Main Library Server Extranet (130), User (140), Administrator (150), Authentication server (160), and Vendor (170) interacting through a wide area network and local area network. The Application Software (110) gives the User (140) the ability to design, evaluate, execute, analyze, and share assays and data. The Admin (150) is able to manage the User (140), set permissions, rules, and review the assays generated by the User (140). Authentication (160) allows control over how the User (140) can interact with various networks and associated servers. The Library Server Intranet (120) allows the User (120) to upload and download various assays with other users in a group. The Main Library Server Extranet (130) allows the User to upload and download various assays with other users in a global community. The Vendor (170) may be a commercial provider of assays and components which may be notified should the User (140) desire to request or purchase assays or components through a notification system that may include e-commerce functionality.

The techniques described herein can be implemented as a software application (110) as part of a stand-alone device or alternatively, attached to an intranet network server (120), and may also be attached to the World Wide Web (130). User(s) can use the software installed on their own device or remotely via the network. This allows for a user to use the software on a device at one location (e.g.: home or office), and access the software on another device in a separate location (e.g.: laboratory). This also allows for users to share assay components which are stored on their intranet (120) servers or share them globally with other users via the World Wide Web using the Main Library Server (130) allowing for global collaboration. The Main Library Server (130) allows for collaboration and also contains commercial components which users can view, download, or request to purchase. The technology provider and Vendor (170) can add assays and other components to the Main Library Server (130) and make them available to users either for purchase or at no cost. The Main Library Server (130) also allows for protection from unauthorized use of the software via a licensing system should the software be lost or stolen. The administrator version of the software (150) can control the user, rights, and privileges of the user (140) allowing or prohibiting access to group intranet (120) and can alternatively contact the main server administrator (130) should the software be lost or stolen. Furthermore, the Main Library Server (130) may provide statistical information such as downloads and/or reviews of assays to creators and/or users. Additionally, the creator of an assay may specify those which may be able to view and/or download it. For example, a person sharing an assay with the global community may be able to specify sharing privileges with certain individuals, groups, or entities. Moreover, each user may create a user profile containing attributes specified by the user for use in search relevance.

Figure 2:
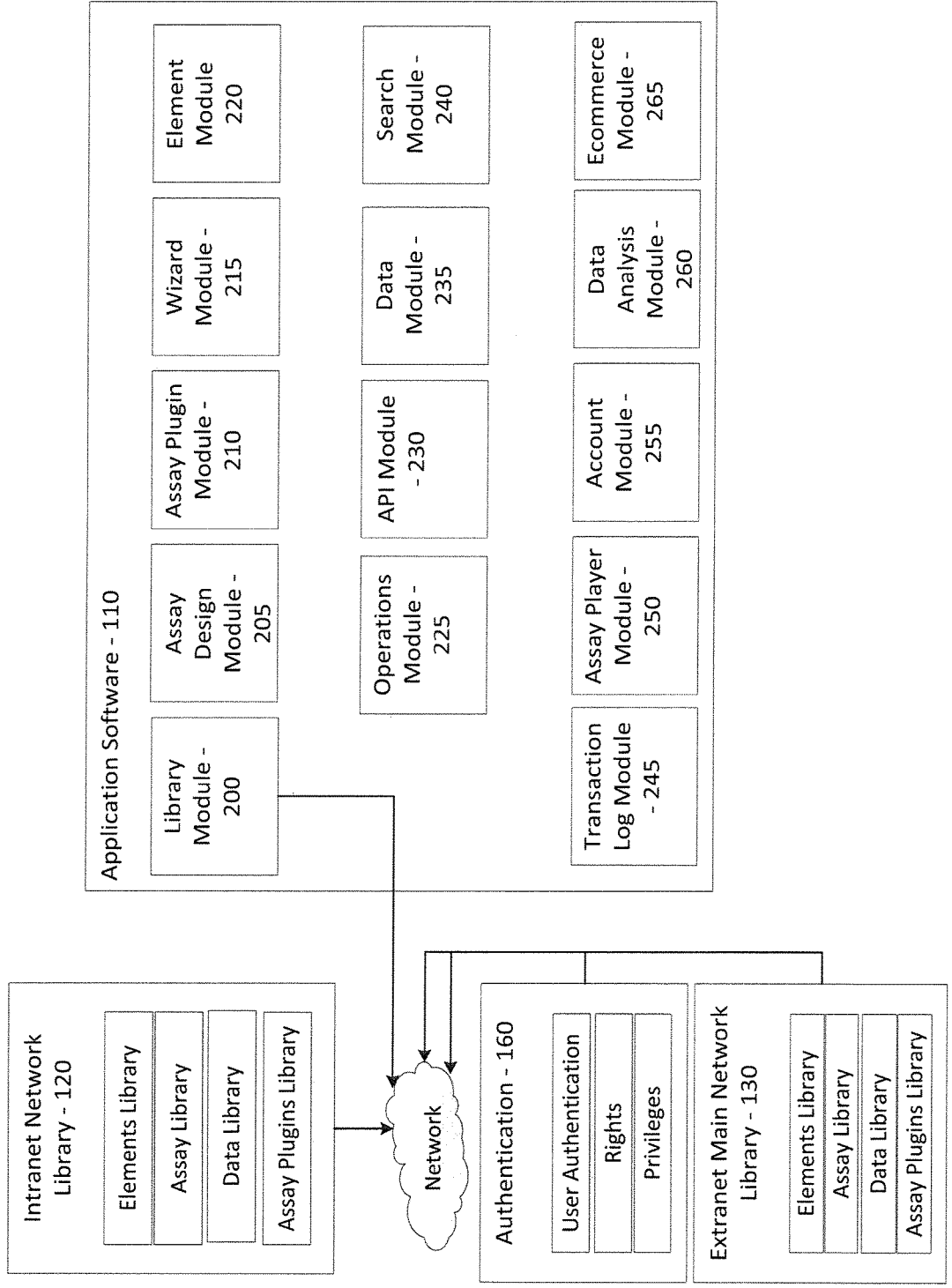
FIG. 2 is an exemplary architectural block diagram of the application software for designing assays, of certain embodiments.

FIG. 2 is an architectural block diagram of the Application Software (110) containing the Library Module (200), the Assay Design Module (205), Assay Plugin Module (210), Wizard Module (215), Element Module (220), Operation Module (225), API Module (230), Data Module (235), Search Module (240), Transaction Log Module (245), Assay Player Module (250), Account Module (255), Data Analysis Module (260), and Ecommerce Module (265). The Application Software Module (110) may be in a networked environment with logical connections to a remote computer such as the Intranet Network Library (120), Authentication (160), and the Extranet Main Network Library (130). The Intranet Network Library (120) may contain an elements library, assay library, data library, and assay plugins library. The Authentication (160) includes user authentication, rights, and privileges. The Extranet Main Network Library (130) may contain an elements library, assay library, data library, and assay plugins library.

The application software (110) consists of several modules including a Library Module (200) which serves as a repository. Assay software templates, components, and data files are stored in the Library Module (200). Assay components include elements, operations, plugins, and data. This is shown in greater detail in FIG. 3.

The Assay Design Module (205) allows the creation of assay designs by copying and loading components including elements, operations, plugins, and data from the Library Module (200). Alternatively, existing assays can be copied and imported into the Assay Design Module (205) and modified to develop new assays. Additionally, an assay can be designed, stored in the library, and then be retrieved and performed at a later time at which point data files can be added. More detail is provided in FIG. 4. The Assay Design Module (205) has a graphical user interface (GUI) providing a drag-and-drop interface which allows for rapid assay design where the user can use pre-defined parameters which can then be updated for the specific assay. More detail is provided in FIG. 4. Furthermore, the Assay Design Module (205) allows for the use of plug-ins.

The Assay Plugin Module (210) allows for the interaction of plugins with the system. Plugins are copied from the Library Module (200), loaded into the Assay Design Module (205), and updated via the Assay Plugin Module (210). Plugins may be created for a variety of assays and components (see FIG. 5) including but not limited to: microplate templates, DNA gel electrophoresis, Western blot, instrument control interfaces, and more. Plug-ins also allow for the direct interaction between the assay design and the actual experiment performed.

The Wizard Module (215) provides error-checking of assay parameters. The Wizard Module (215) can also be used for stand-alone operation independent of an assay being loaded. For example, a user may invoke the software and use the Wizard Interface to perform on-demand calculations such as amount of solvent to add to a solute to achieve a desired concentration, review rules for conducting certain assays, and so forth. This can be performed in the absence of an assay design. Moreover, at any point in an assay design, a user may choose to invoke the Wizard Module (215). This module pulls in properties from specific elements, operations, and plug-ins (if needed) to determine whether assay parameters are correct. For example, adding 10 uL of a buffer to a well containing a volume of 10 uL of a 20 uM concentration of a substance results in 20 uL final volume with a concentration of 10 uM (and therefore assays that do not preserve this most likely contain one or more errors). The Wizard Module (215) contains a math engine and/or other related software that compares elements before and after associated operations to determine if the desired assay parameters are met. The Wizard Module (215) can also contain custom parameters, such as rules, to validate an assay. For example, a user may choose to prevent cells with a cell passage number greater than 10 from being used in an assay. If a user enters a cell passage number greater than 10, the Wizard Module (215) would display a response that the cell passage number used is greater than the limit set. This avoids costly miscalculations and poor experimental design which can render experimental results inaccurate. More detail about the Wizard Module is provided in FIG. 6.

The Element Module (220) defines element names and element properties. It can also be used to create new elements with specific properties and add them to the Library Module (200). An element may be a component in an assay upon which operations are performed. For example, a cell culture flask may be an element. The properties of this element could include parameters such as flask volume, manufacturer, model number, and more. More detail about the Element Module (220) is provided in FIG. 7. Elements may be combined with operations, plugins, and data files to create assay projects.

The Operations Module defines operation names and operation properties. It can be used to create new operations with specific properties and add them to the Library Module (200). Operations are tasks such as dispensing liquid, incubation, and more. Operations can be performed on elements, plugins, and data. Operations may have specific properties such as dispensing a certain volume of a liquid or incubation for a certain time at a certain temperature. More detail about the Operations Module (225) is provided in FIG. 8.

The API Module (230) allows the software to interact with other software. API calls can be made which send or receive commands to and from other software. Alternatively, the API module (230) can allow the assay software to get responses from other software. One example would be a device operating in a lab which sends back a response after completing a certain task as determined by the software. The API module allows for integration of the software with other existing software and devices.

The Data Module (235) allows the user to load data, such as intermediate and/or experimental results, into the software. Data may be in many forms and the software may parse the data, and store it to the Library Module (200). Intermediate data, such as data generated at any point in the assay may be integrated. More information about the Data Module (235) is provided in FIG. 9. After data has been added, it can then be manipulated for analysis via the Data Analysis Module (260).

Figure 10:
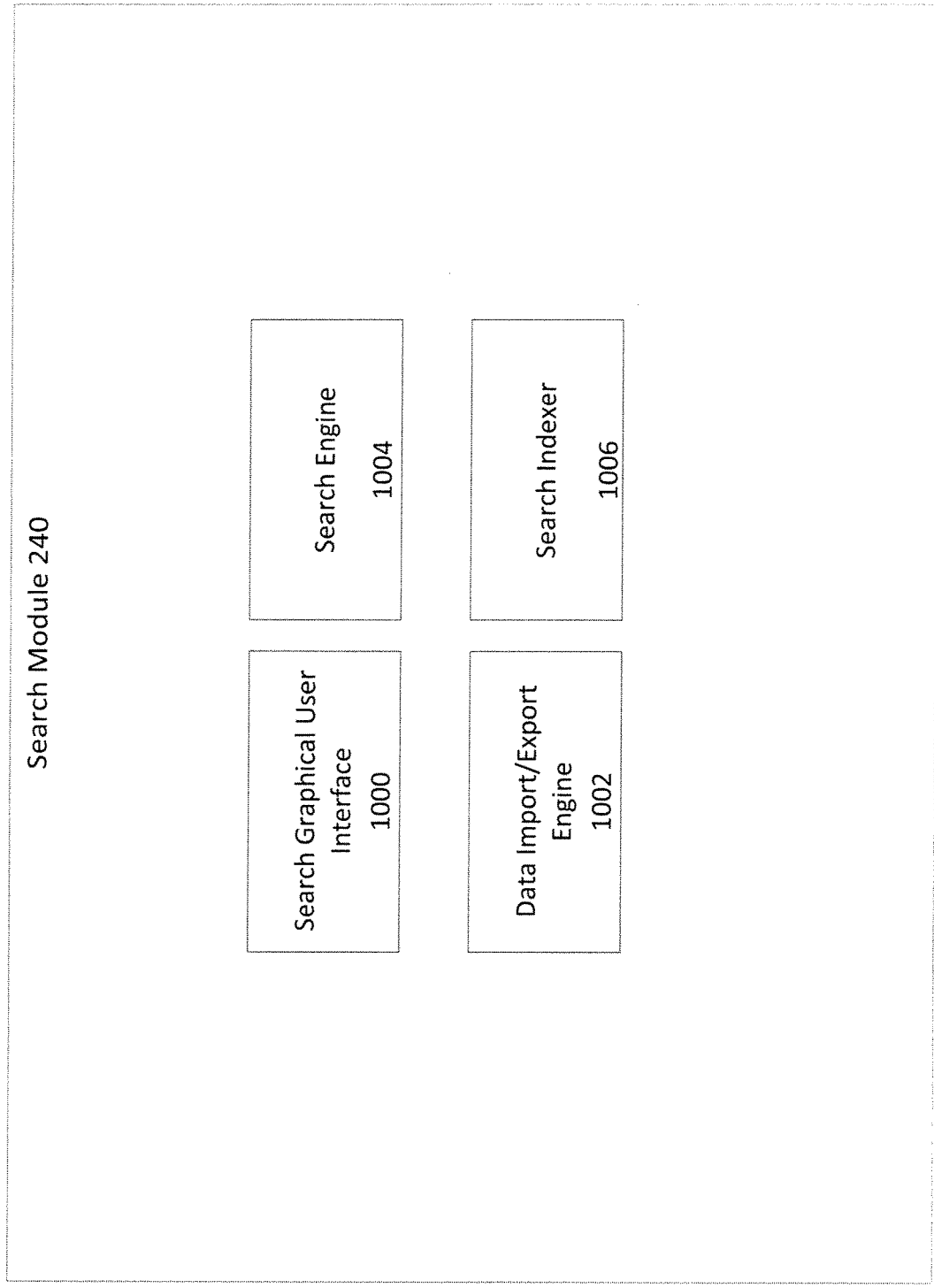
FIG. 10 is an exemplary architectural block diagram of the search module of certain embodiments.

The Search Module (240) allows for search within the Library Module (200) or can alternatively allow for searching in external libraries on the network such as the Intranet Network Library (120) and the Extranet Main Network Library (130). The Search Module (240) can also be used by an administrator for a variety of purposes such as to determine the number of assays employing a particular element, operation, plugin, or data. For example, if an element (e.g.: a reagent) is found to be contaminated, the Search Module (240) can provide list of assays, users, data, timestamps, and more which could have been impacted by the use of a particular reagent. More information about the Search Module (240) is shown in FIG. 10. The Search Module (240) also indexes the Transaction Log Files generated by the Transaction Log Module (245) to provide specific user and assay information.

The Transaction Log Module (245) logs all steps, assays, procedures, and more performed by the user. The log contains (but is not limited to) lists of elements, operations, properties, plug-ins, data, and data analysis performed. The Transaction Log Module (245) also contains a timestamp, user signature, and witness countersignature which may be critical for Good Laboratory Practice (GLP) and documentation. The Transaction Log Module (245) is shown in greater detail in FIG. 11 and one possible example is shown in FIG. 25.

Figure 12:
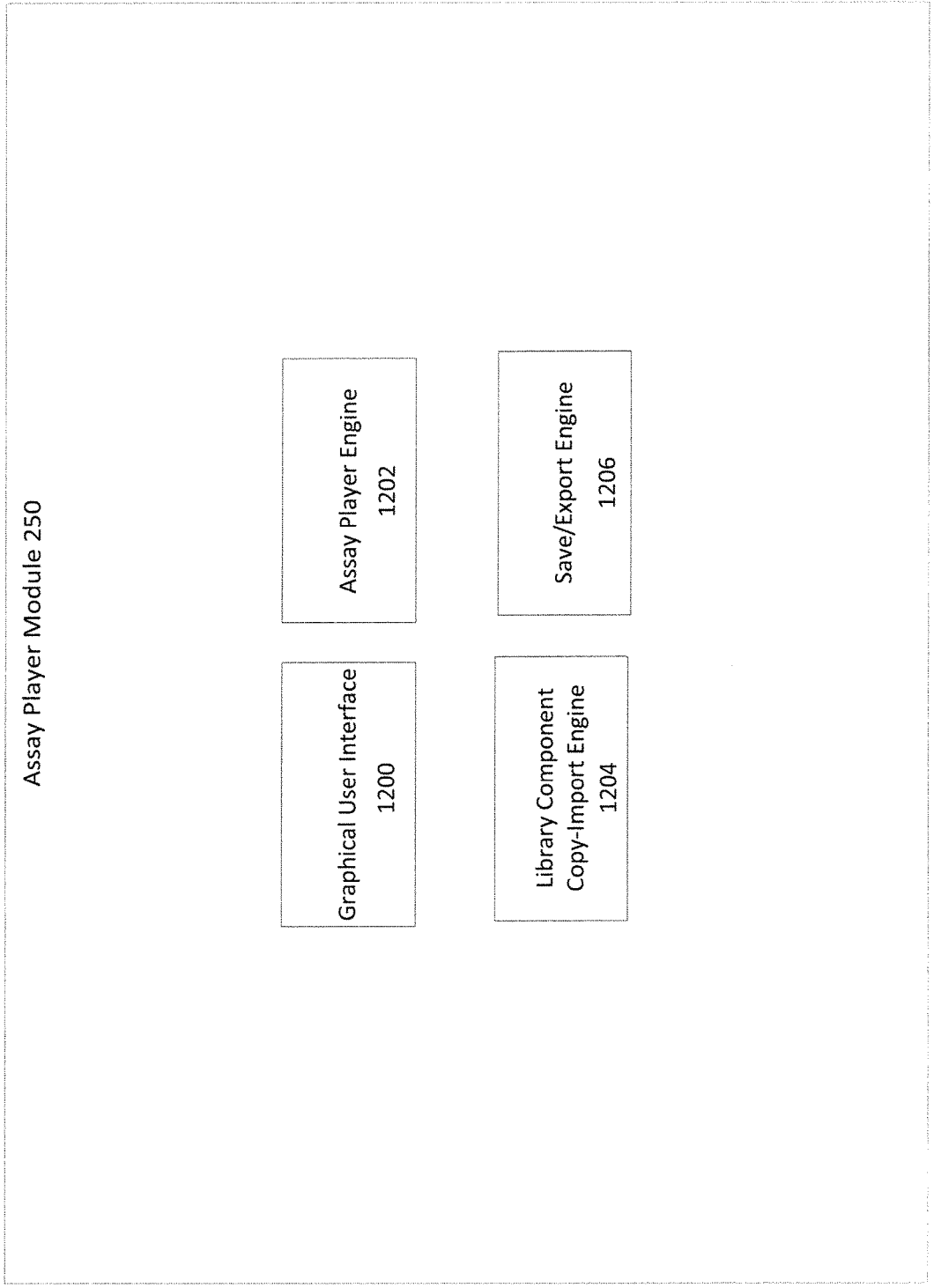
FIG. 12 is an exemplary architectural block diagram of the assay player module of certain embodiments.

The Assay Player Module (250) is a step-by-step playback of an assay design as created in the Assay Design Module (205). An assay can be designed at the desk, and then be taken to the laboratory and a single user can use the Assay Player Module (250) to perform the assay step-by-step, with notes and timestamps added with each step (e.g., once the user clicks from one step to another). More detail about the Assay Player Module (250) is shown in FIG. 12.

Figure 13:
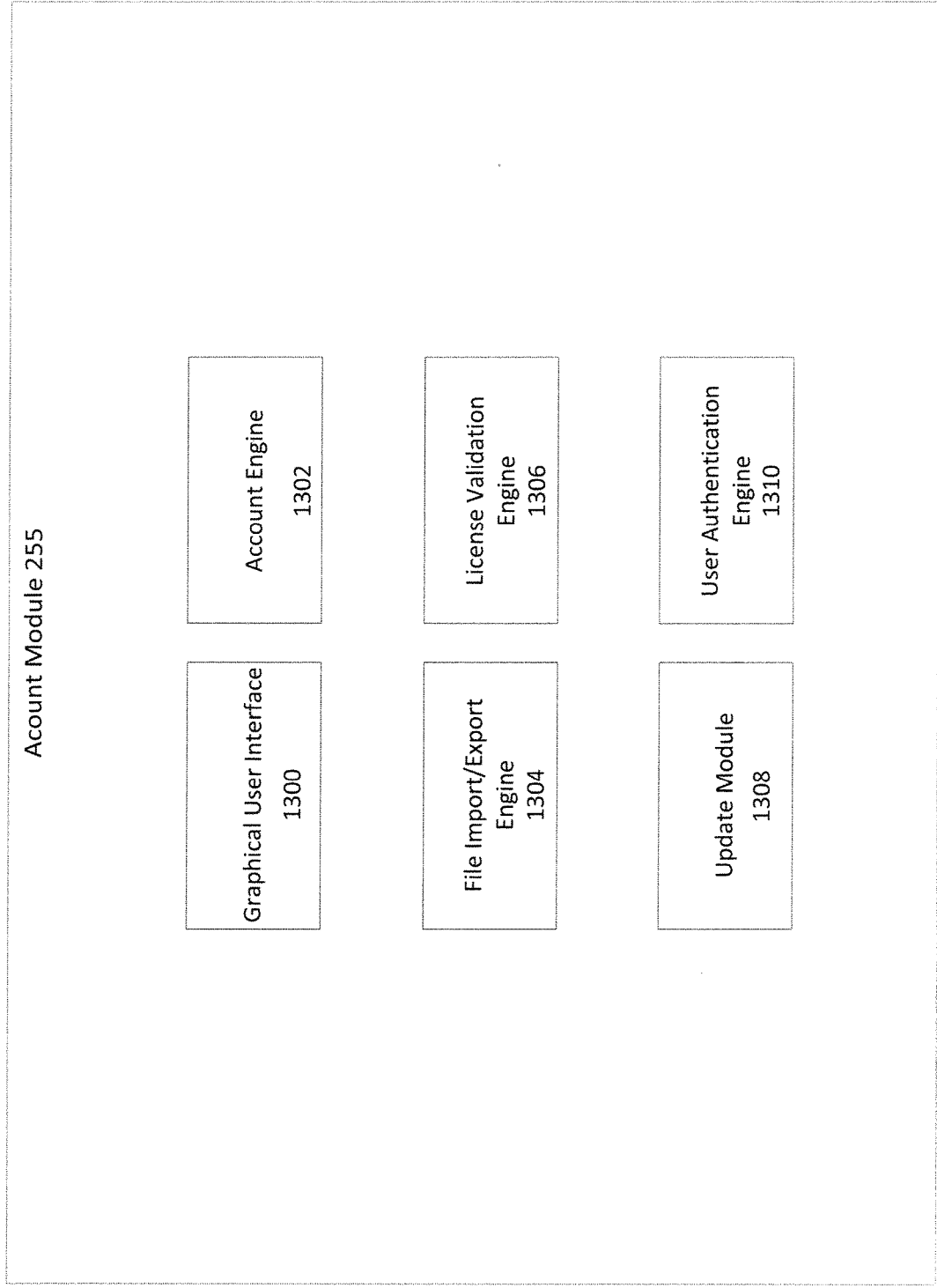
FIG. 13 is an exemplary architectural block diagram of the account module of certain embodiments.

The Account Module (255) stores critical information about the user, license, software version, and updates. The Account Module (255) uses this information to include in authentication, transaction log files, and system updates. More detail about the Account Module (255) is shown in FIG. 13.

The Data Analysis Module (260) uses the raw data from the Data Module (235) and provides data analysis functions (e.g.: graphing, plotting, etc). Using information from the assay, the Data Analysis Module (260) can perform certain tasks such as subtracting negative control values form data points, graphing experimental responses against a scale dictated by the positive controls, and more. Routine analysis functions can be stored to the library and invoked for analysis by the user from the Data Analysis Module (260). More detail about the Data Analysis module is provided in FIG. 14.

The Ecommerce Module (265) allows the user to interact with vendors of particular assay components. Since elements, operations, and plug-ins are available from the External Main Network Library (130) on the World Wide Web (WWW), vendors may be able to list their products in the library making them available to users. As users design their assay, they can integrate components from vendors, send sample and purchase requests, and/or complete the purchase through the system. More information about the Ecommerce Module (265) is provided in FIG. 15.

Figure 3:
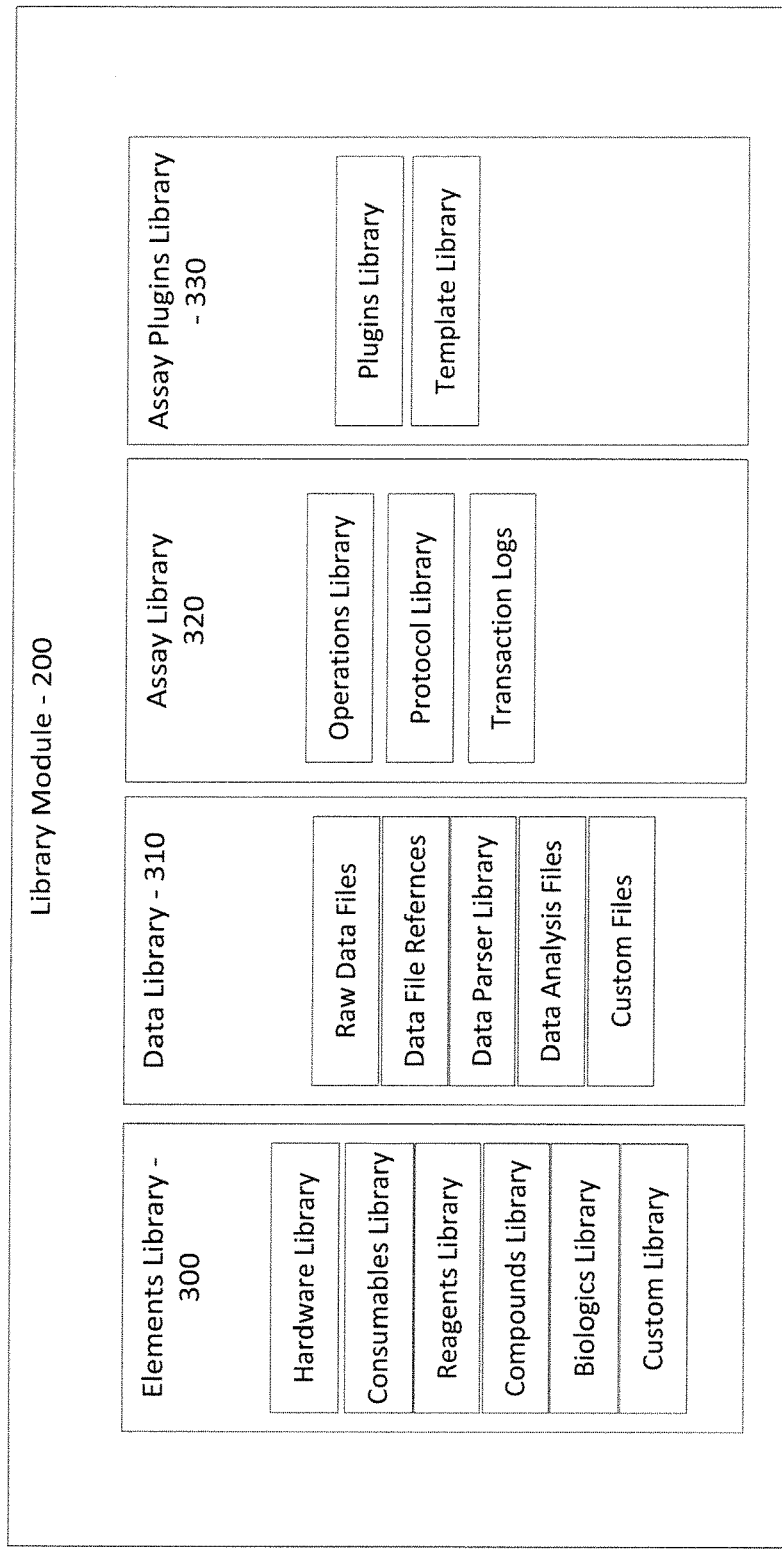
FIG. 3 is an exemplary architectural block diagram of the library module of certain embodiments.

FIG. 3 is an architectural block diagram of the Library Module (200) and includes the Elements Library (300), the Data Library (310), the Assay Library (320), and the Assay Plugins Library (330). While the Library Module (200) is available on the local device, it is also connected via a network to an Intranet Library (120) and the Main Extranet Network Library (130). Each assay may contain the following components: Elements (e.g.: hardware, consumables, reagents, etc), Operations (e.g.: aspirate, dispense, incubate, etc), Plugins (e.g.: microplate plugin), Data (e.g.: ASCII files, photographs, etc) and each of these components are stored in the Library Module (200). While these components can also be stored elsewhere, the function of the Library Module (200) is to provide a repository of components for designing, executing, and storing assays, data, and data analysis.

The Library Module (200) stores each component by type. The Elements Library (300) contains libraries of the Element type, which are user-selectable element data objects. For example, each element data object defines a physical component that can be used in one or more assays. The hardware library may contain elements such as pH meters, microplate readers, and pipettors. The consumables library contains elements such as tissue culture plates, pipette tips, and flasks. The reagents library may contain elements such as buffers, salt solutions, and culture media. The compounds library may contain compounds used in assays such as small molecules. The biologics library may contain items such as cell lines, proteins, and antibodies. The custom library is also available for storing custom elements. The structure of the library can be modified by the user, however a default set of common components can allow the user to get started quickly with common elements. The Library Module (200) may also function as a tool to search for elements needed for an assay. For example, if a user needs a low volume culture flask, the user can search the library for such an element by property or other value.

Furthermore, commercial and sample products can be included in this library such that vendors of technology products could pay for inclusion into these libraries. Software updates could also update the Library Module (200) to include new items. The Library Module (200) also allows the user to share Elements, Data, Operations, and Assay Plugins. Depending on the software version, the user permissions set by the Administrator may control permissions to enable or disable sharing and other functionalities with the Intranet Network Library (120) or with the Extranet Main Network Library (130). Some versions may not require permission controls for these functions.

The Data Library (310) may include Raw Data Files which may be stored in the Library Module (200). Data File References are references to Data Files stored elsewhere. The Data Parser Library contains a set of parsers for different data types. Parsers can be used for data extraction and manipulation. The Data Analysis Files include items such as graphs, plots, and more where the data has been manipulated to provide information. Custom files may also be stored in the Data Library (310) enabling the user to have flexibility with storing data. Custom files may include photographs, images, and more.

The Assay Library (320) is also part of the Library Module (200). The Assay Library (320) may contain the Operations Library which includes user-selectable operations data objects that define the set of operations (or actions) that may be performed in an assay (e.g., for one or more element data objects). The Protocol Library may include the set of Elements, Operations, and Plugins used in a given assay. The Protocol Library allows a user to load an assay previously performed, and add, edit, or delete certain components to create a new assay. The Protocol Library can also be shared to the Intranet Network Library (120) to be shared within a group or organization or with the Extranet Main Network Library (130) to be shared with users globally. Optionally, a freeware version of the software may allow for viewing of certain files with limited functionality. The Assay Library (320) also contains the Transaction Logs which are files including all elements, operations, plugins, and properties of a given experiment performed by a user. Optionally, the Transaction Log may include data. These files may also contain the signature, witness signature, timestamp information, and other information. These Transaction Log files can be also be queried by the user using the Search Module (240) or Administrator to find certain assays performed by a user, containing a certain element, or certain operation.

The Assay Plugins Library (330) contains a Plugins Library and Template Library. The Plugins Library is a repository of Plugins which allow the user to work with predefined and also custom plugins. Plugins can be, for example, customized elements, operations, or data tools that can be added to the system. For example, the plugins can have specialized properties, can provide specialized abilities or features to the system, and/or can have their own interface within the software. Plugins provide customized functionality with the software. Plugins can vary widely such as instrument control plugins, microplate plugins, and can also be developed via the Plugin Module (210) to create custom plugins. One example of a plugin would be the microplate plugin which includes a microplate properties interface for specifying specific wells, volumes, and details for a microplate. Microplate layouts can also be stored as templates in the Template Library such that the user can select the microplate template whenever an assay is performed saving the user time. Moreover, as with all other components, the Template Library can be shared with users via the Intranet Network Library (120) to be shared within a group or organization or with the Extranet Main Network Library (130) to be shared with users globally.

All modules within the Application Software (110) can interact with the Library Module (200) to provide the user access to assays and assay components locally, via the Intranet Network Library (120) to be shared within a group or organization, or with the Extranet Main Network Library (130) to be shared with users globally.

Figure 4:
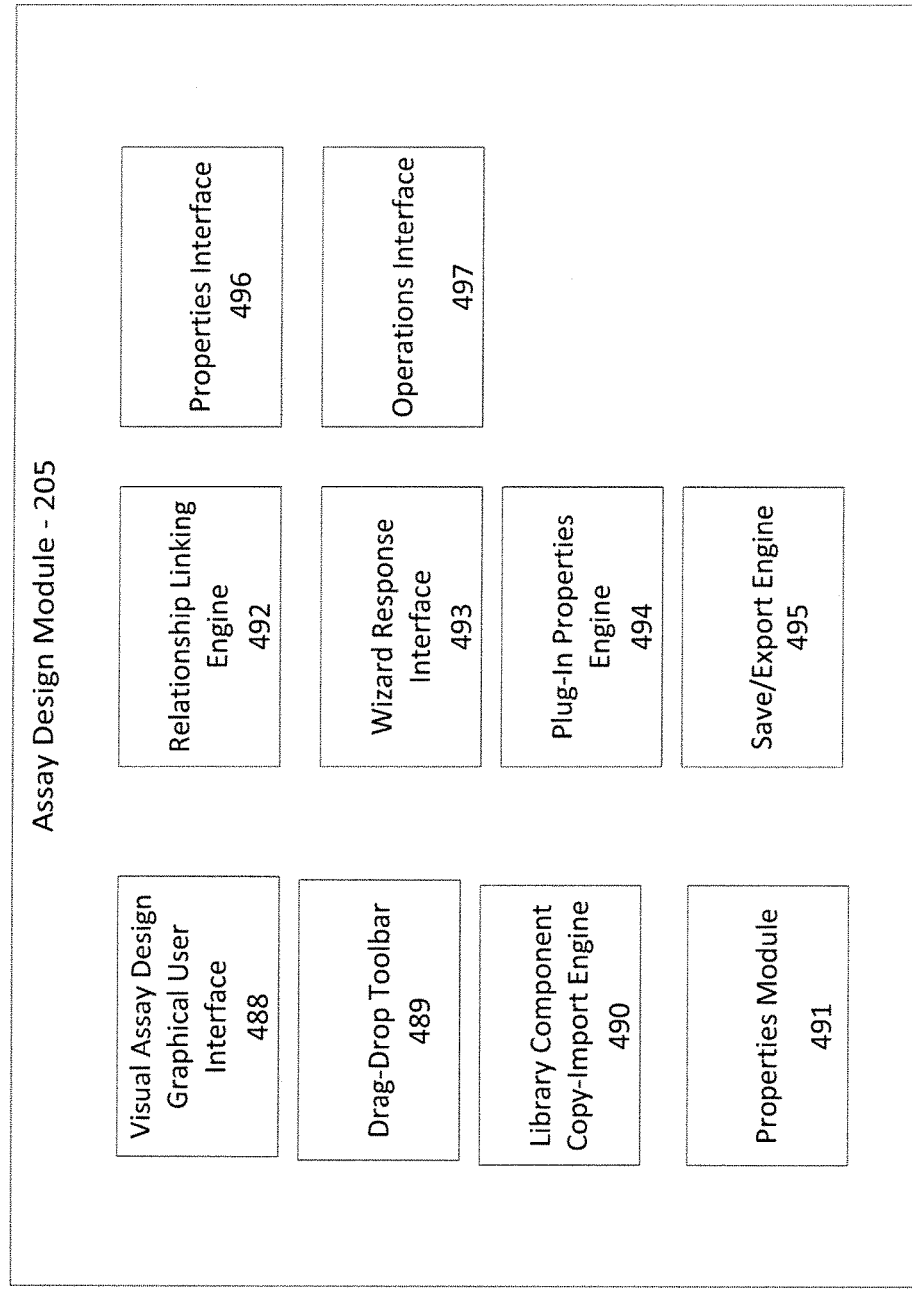
FIG. 4 is an exemplary architectural block diagram of the assay design module of certain embodiments.

FIG. 4 is an architectural block diagram of the Assay Design Module (205) which includes the Visual Assay Design Graphical User Interface (488), Drag-Drop Toolbar (489), Library Component Copy-Import Engine (490), Properties Module (491), Relationship Linking Engine (492), Wizard Response Interface (493), Plugin Properties Engine (494), Save/Export Engine (495), Properties Interface (496), and Operations Interface (497).

The Visual Assay Design Graphical User Interface (488) allows the user to interact with the software and create, modify, edit, and save the assay files. The Drag-Drop Toolbar (489) allows the user to select an element, operation, plugin or other component using icons. An icon can be dragged to the workspace from the library using the Library Component Copy-Import Engine (490). The properties of the elements can then be updated using the Properties Module (491) which has a Properties Interface (496), the operation properties can be updated using the Operations Interface (497), or the Plugin properties can be updated using the Plugin Properties Engine (494). The elements, operations, plugins, and data are linked using the Relationship Linking Engine (492) which creates relationships between components in a visual representation. The Wizard Response Interface (493) provides an interface for the result from the Wizard Module (215). The Save/Export Engine (495) allows the user to save and share all or part of the assay. The user may desire to share certain items with or without data and the Save/Export Engine allows the user to share all or part of the project with others. FIG. 27 provides more details surrounding Assay Design Logic.

Therefore, in some examples, the assay design module allows a user to define the elements, operations, and plug-ins for a candidate assay specification (e.g., an assay that has not yet been validated using the wizard module 215). The defined components can include a set of element data objects from the set of element data objects stored in the Elements Library 300, and a set of operation data objects from the set of operation data objects stored in the Operations Library of the Assay Library (320). The included operation data objects can define action(s) to perform on one or more of the element data objects of the assay. The candidate assay specification is generated based on the data received from a user.

Figure 5:
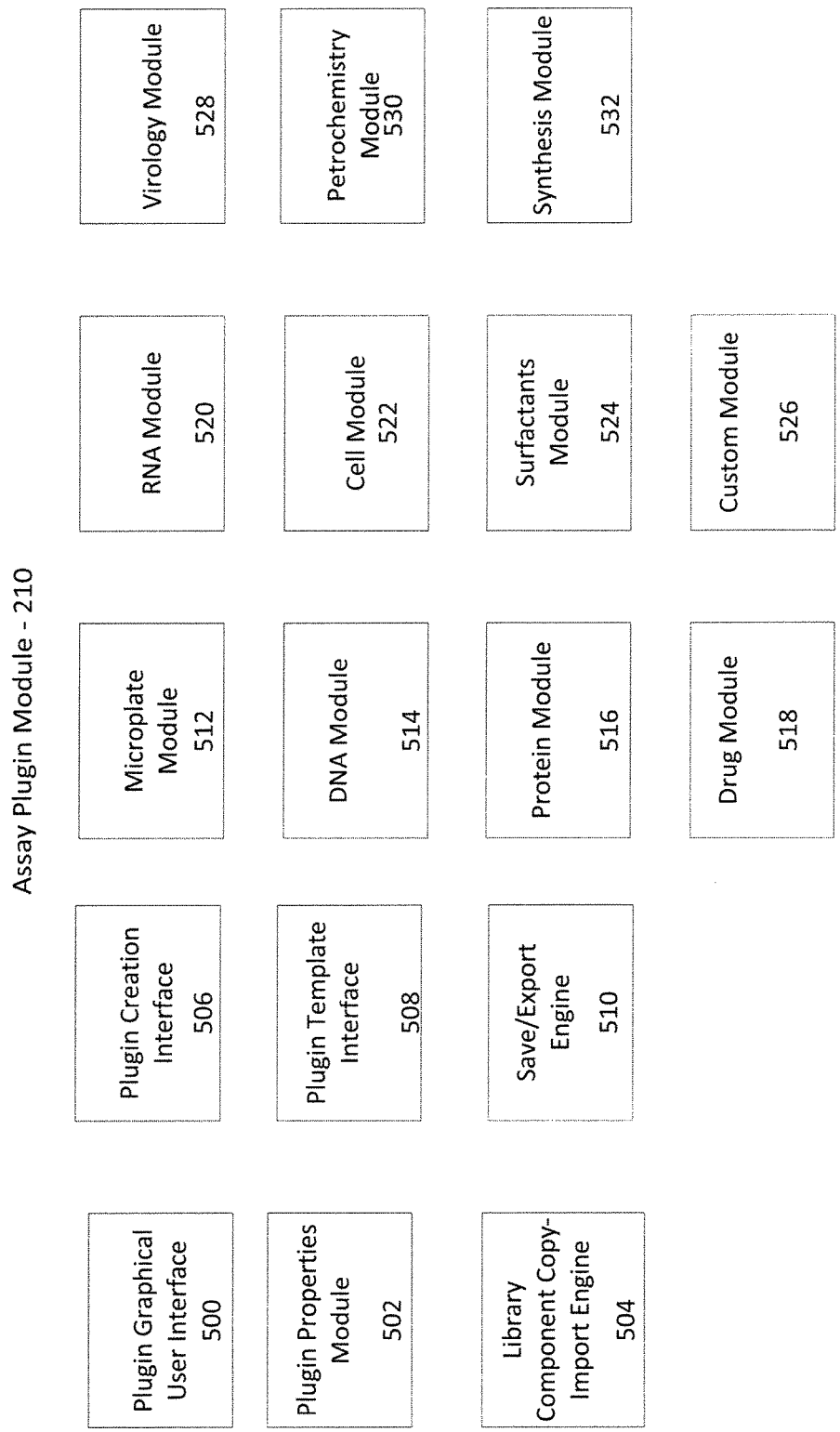
FIG. 5 is an exemplary architectural block diagram of the assay plugin module of certain embodiments.

FIG. 5 is an architectural block diagram of the Assay Plugin Module (210) which may include the Plugin Graphical User Interface (500), Plugin Properties Module (502), Library Component Copy/Import Engine (504), Plugin Creation Interface (506), Plugin Template Interface (508), Save/Export Engine (510), Microplate Module (512), DNA Module (514), Protein Module (516), Drug Module (518), RNA Module (520), Cell Module (522), Surfactants Module (524), Custom Module (526), Virology Module (528), Petrochemistry Module (530), and Synthesis Module (532).

The Assay Plugin Module (210) has a Plugin Graphical User Interface (500) which allows the user to interact with the software. For example, as described above plugins can be customized elements, operations, or data tools which have specialized properties, can provide specialized abilities, and/or can have their own interface within the software. Plugins provide customized functionality with the software. The Plugin Properties Module (502) allows the user to edit and update plugin properties. The Plugin Creation Interface (506) allows the user to create new plugins. The Plugin Template Interface (508) allows the user to interact with plugin templates (e.g.: microplate template). There may be a variety of possible plugins which are preloaded in the software to allow use with a variety of specific assays. The Microplate Module (512) is specifically designed for assays involving microplates. The DNA Module (514) is designed for use with DNA assays (e.g.: DNA Sequencing). The Protein Module (516) is designed for assays involving proteins (e.g.: Western Blot). The Drug Module (518) is designed for use with small molecule and drug assays. The RNA Module (520) is for use with assays involving RNA. The Cell Module (522) is for use with assays involving cells. The Surfactants Module (524) is for assays involving surfactants. The Virology Module (528) is for use with virology assays. The Petrochemistry Module (530) is for use with assays in petrochemistry. The Synthesis Module (532) is for use with assays in synthesis. Custom plugins can also be created using the Custom Module (526). These modules may be developed for specific purposes such as operating devices or specialized assays. The Library Component Copy/Import Engine (504) allows the user to import Assay Plugin Components from the library. The Save/Export Engine (510) allows the user to save, export, and share Assay Plugin components.

Figure 6:
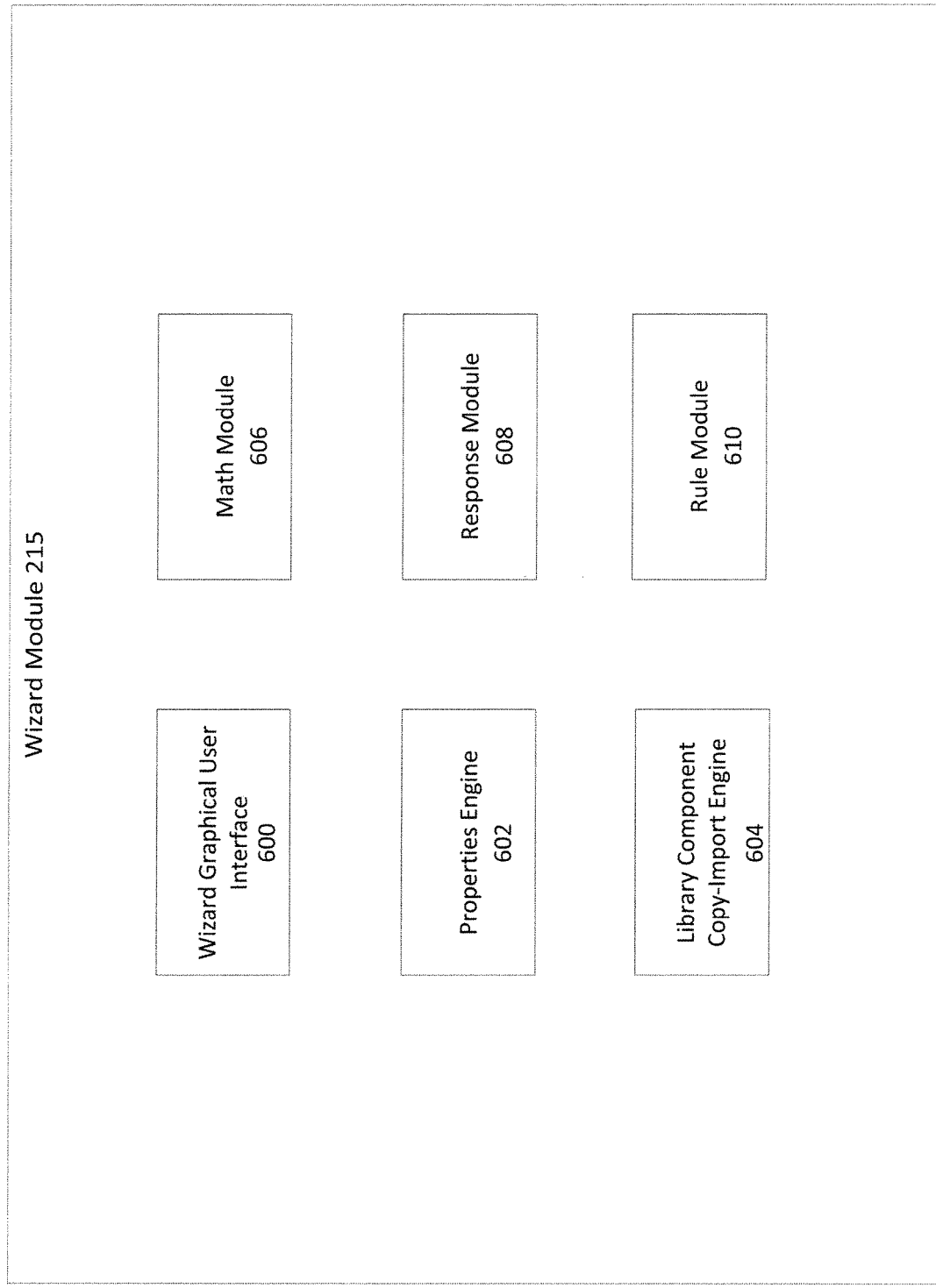
FIG. 6 is an exemplary architectural block diagram of the wizard module of certain embodiments.

FIG. 6 is an architectural block diagram of the Wizard Module (215) which may include the Wizard Graphical User Interface (600), Properties Engine (602), Library Component Copy-Import Engine (604), Math Module (606), Response Module (608), and Rule Module (610).

The Wizard Graphical User Interface (600) allows the user to access the module in a stand-alone mode enabling calculations when needed. Additionally, the Wizard Module (215) interfaces with the Assay Design Module (205) to evaluate a full assay designed in the Assay Design Module (205). As is further described below, the Wizard Graphical User Interface (600) stores a set of validation rules for assays that can be used to determine whether the element data objects and operation data objects for a particular assay define a valid assay.

The Math Module (606) performs mathematical operations. Mathematical operations can include, for example, common assay calculations such as molarity, molality, volume, concentration, dilution volume, mass, density, and cell counting. The Properties Engine (602) compares properties between elements, operations, and plugins. The Rule Module (610) allows the user or admin user to set up rules for evaluation such as maximum cell passage number for use in an assay. Additional example rules may include maximum wash cycles, minimum dispense height, maximum dispense speed, number of freeze-thaw cycles, lot numbers to exclude, incubation times, and any rules set by the user and/or administrator. Rules can be used to set guidelines for assays performed by an individual or group. The Response Module (608) provides results from the evaluation. The Library Component Copy-Import Engine (604) allows the system to import library components.

The Wizard Module (215) evaluates the properties of elements, operations, and plugins to validate experimental parameters. For example, 10 uL transferred from a source well to a destination well containing 10 uL results in 20 uL final volume in the destination well. In this example, if the user has entered a different value for the volume in the destination well, such as 22 uL, the Wizard may alert the user of the error.

Figure 7:
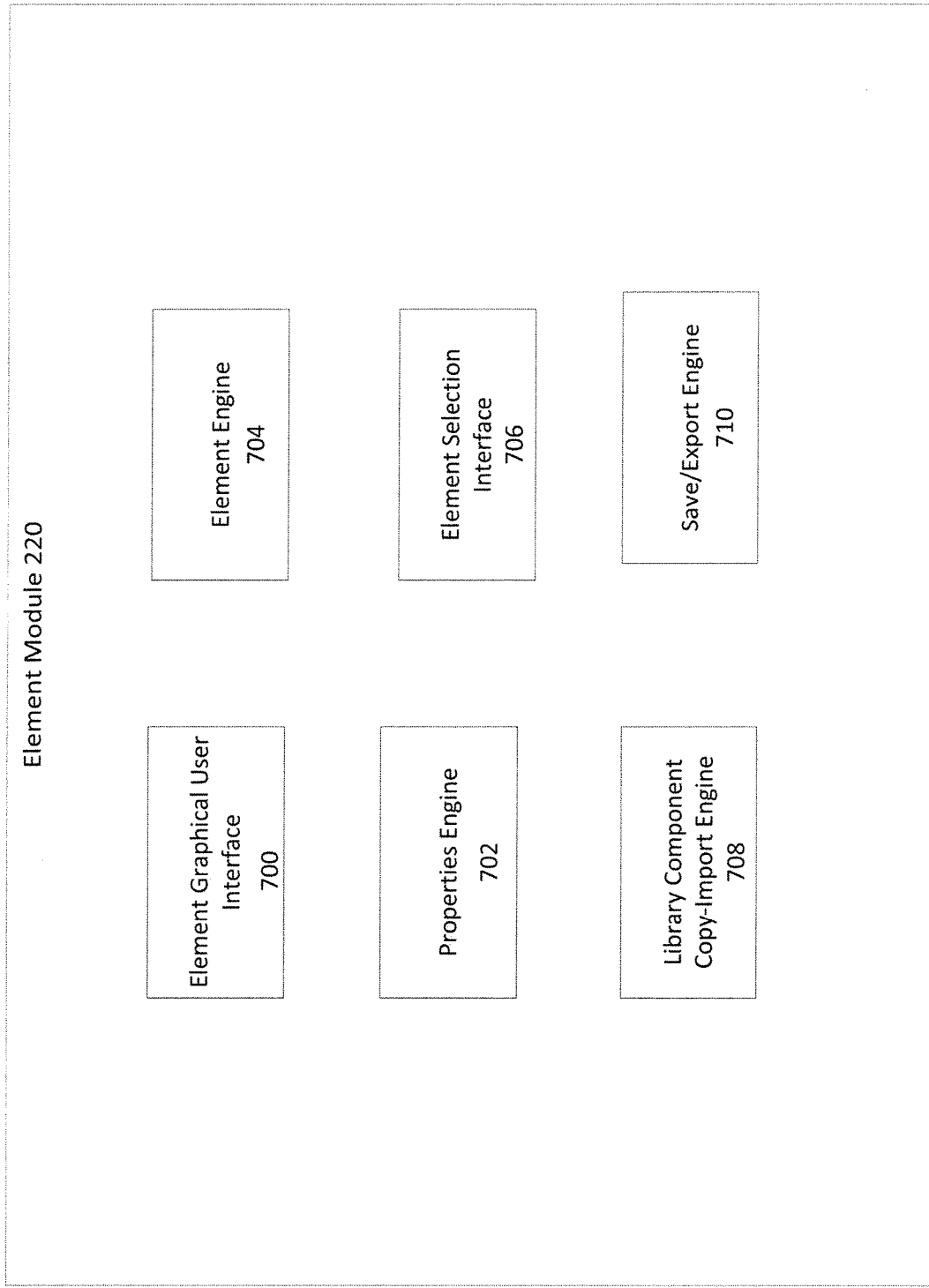
FIG. 7 is an exemplary architectural block diagram of the elements module of certain embodiments.

FIG. 7 is an architectural block diagram of the Elements Module (220) which includes the Element Graphical User Interface (700), Properties Engine (702), Element Engine (704), Element Selection Interface (706), Library Component Copy-Import Engine (708), and the Save/Export Engine (710).

The Elements Module (220) contains an interface for working with elements called the Element Graphical User Interface (700). There is an Element Engine (704) which creates and modifies elements (e.g., stored as element data objects) and a Properties Engine (702) which creates, modifies, and associates property data objects with the element data objects. The Element Selection Interface (706) allows the user to select elements which can be copied into the interface from the library via the Library Component Copy-Import Engine (708). Elements can also be saved and exported using the Save/Export Engine (710).

Figure 8:
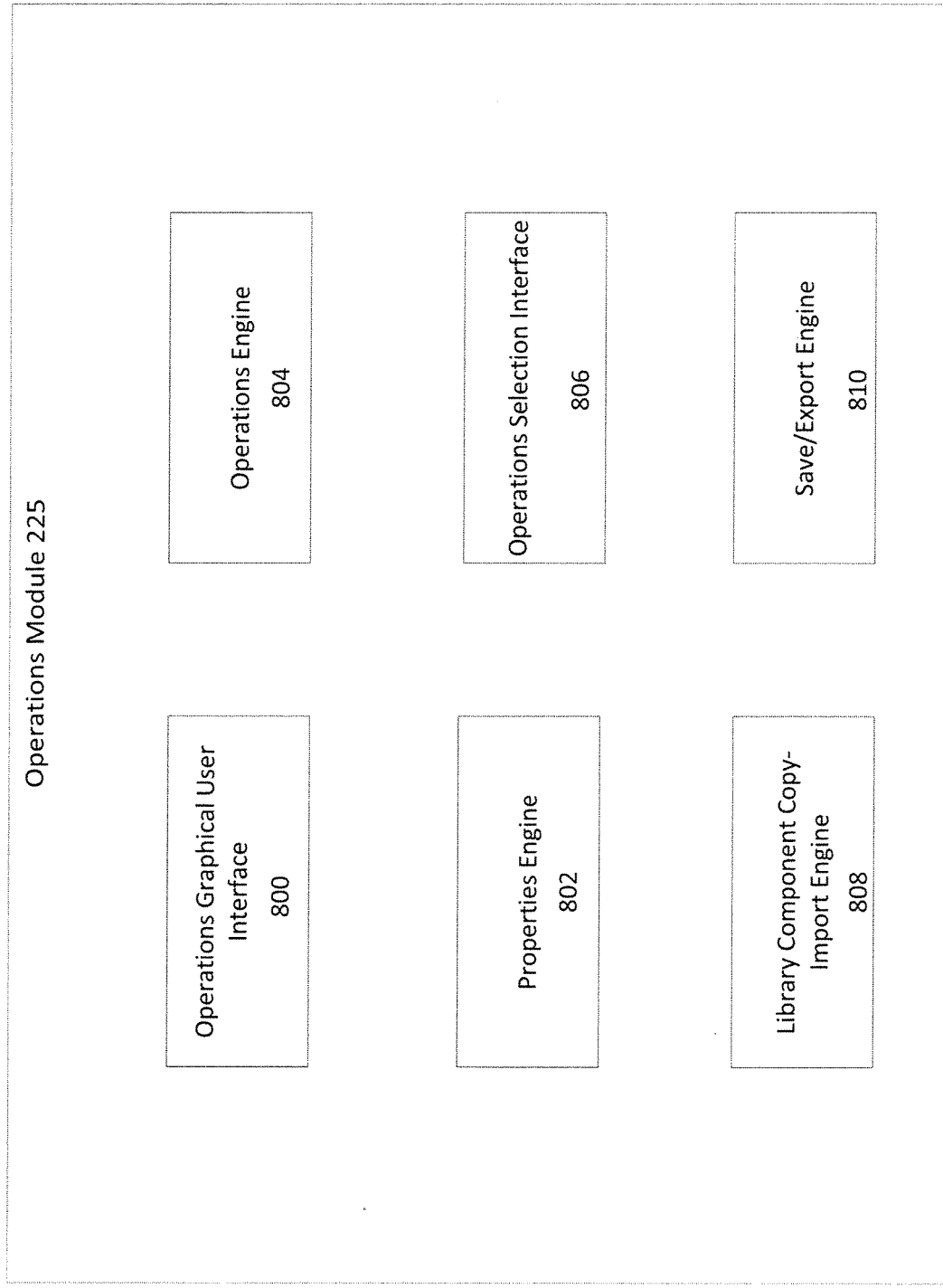
FIG. 8 is an exemplary architectural block diagram of the operations module of certain embodiments.

FIG. 8 is an architectural block diagram of the Operations Module (225) which includes the Operations Graphical User Interface (800), Properties Engine (802), Operations Engine (804), Operations Selection Interface (806), Library Component Copy-Import Engine (808), and the Save/Export Engine (810).

The Operations Module (225) contains an interface for working with operations called the Operations Graphical User Interface (800). The Operations Engine (804) creates and modifies operations and the Properties Engine (802) creates, modifies, and associates properties with the operations (e.g., stored as operation data objects). The Operations Selection Interface (806) allows the user to select operations which can be copied into the interface from the library via the Library Component Copy-Import Engine (808). Operations can also be saved and exported using the Save/Export engine (810).

Figure 9:
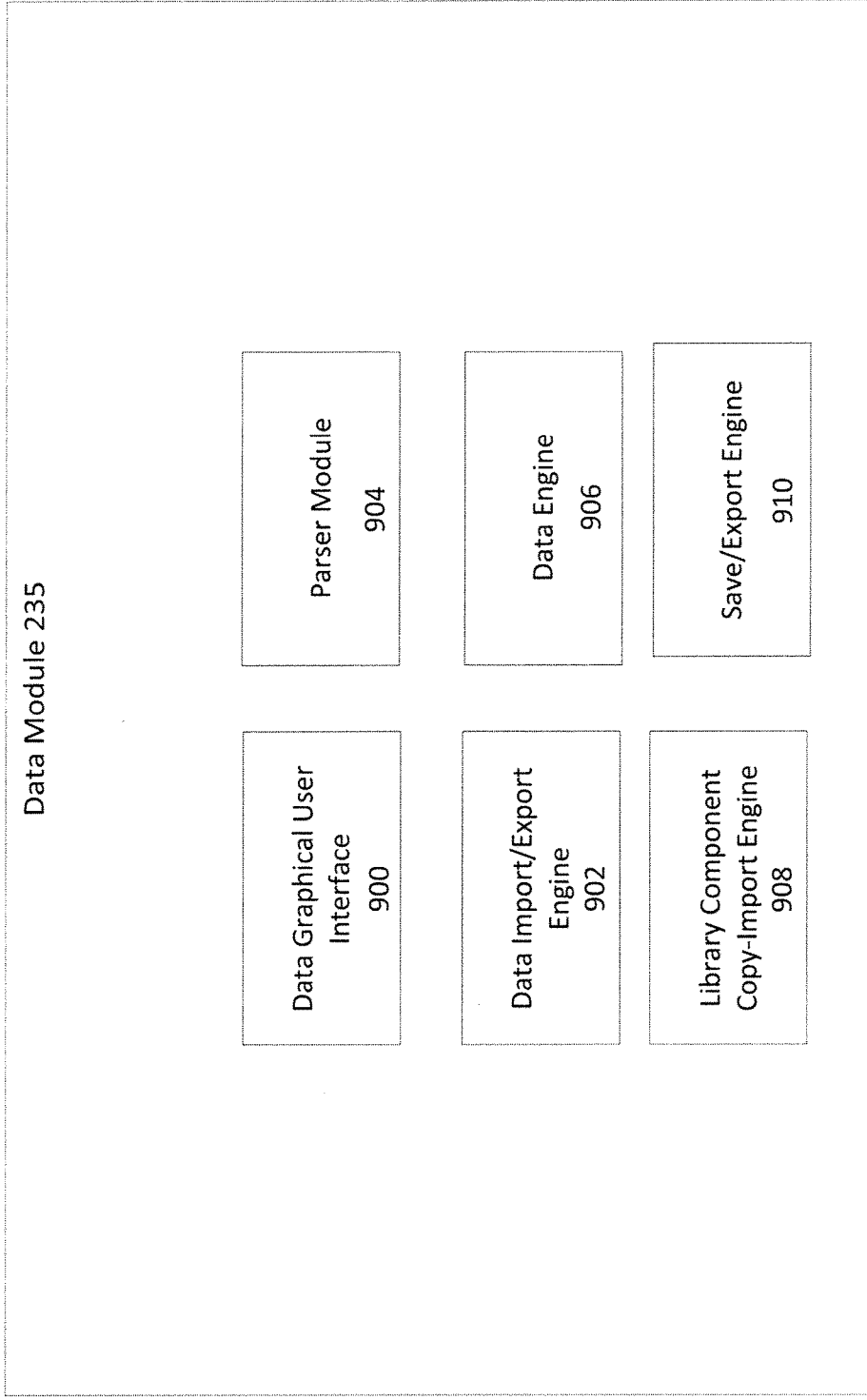
FIG. 9 is an exemplary architectural block diagram of the data module of certain embodiments.

FIG. 9 is an architectural block diagram of the Data Module (235) which includes the Data Graphical User Interface (900), Data Import/Export Engine (902), Parser Module (904), Data Engine (906), Library Component Copy-Import Engine (908), and the Save/Export Engine (910).

Data Module (235) allows the user to import data into the assay project. The user interacts with the Data Module (235) via the Data Graphical User Interface (900). The Data Import/Export Engine (902) allows the user to pull data into the Data Module (235). The raw data file can be parsed by the Parser Module (904) and processed by the Data Engine (906). Parsers may vary depending on the type of data file (e.g.: ASCII, image, text, etc) created and the device which generates the data (e.g.: reader devices). The Parser Module (904) also allows the user to create parsers. Alternatively, various parser files can be imported from the Library Module via the Library Component Copy-Import Engine (908). Data files and parsers can also be saved back to the library via the Save/Export Engine (910). Technology providers may also provide parsers for their products and make them available for the user to use with the software.

FIG. 10 is an architectural block diagram of the Search Module (240) which includes the Search Graphical User Interface (1000), Data Import/Export Engine (1002), Search Engine (1004), and Search Indexer (1006). The Search Graphical User Interface (1000) allows the user to search for files including assays, assay components, and transaction log files in the Library Module (200). It also allows for searching the Intranet Library Network (120) depending on the rights of the user as permitted by the Authentication module (160). The search module may also allow the user to search the Main Extranet Network Library (130) for assays, components such as specialized plugins, elements, operations, and assays shared with the global community. An administrator may wish to search all assays performed by a user, or perhaps search for all instances in which a certain element or operation was performed. The Search Graphical User Interface (1000) provides the user with search parameters for entering their search query. It also provides a results interface based on the query. The Search Engine (1004) performs the search based on the user's query. The Search Indexer (1006) contains an index of searchable records (1006). The Data Import/Export Engine allows the user to import search results and also export search results for the purpose of reporting (1002). Depending on user authentication, it may be important to create transaction log files of the search performed by the user. For example, an administrator with multi-site, multi-team level access may run queries and generate results which are confidential in nature. As such, the Transaction Log Module (245) may generate transaction log files recording these queries, results, user, date, and time performed.

Figure 11:
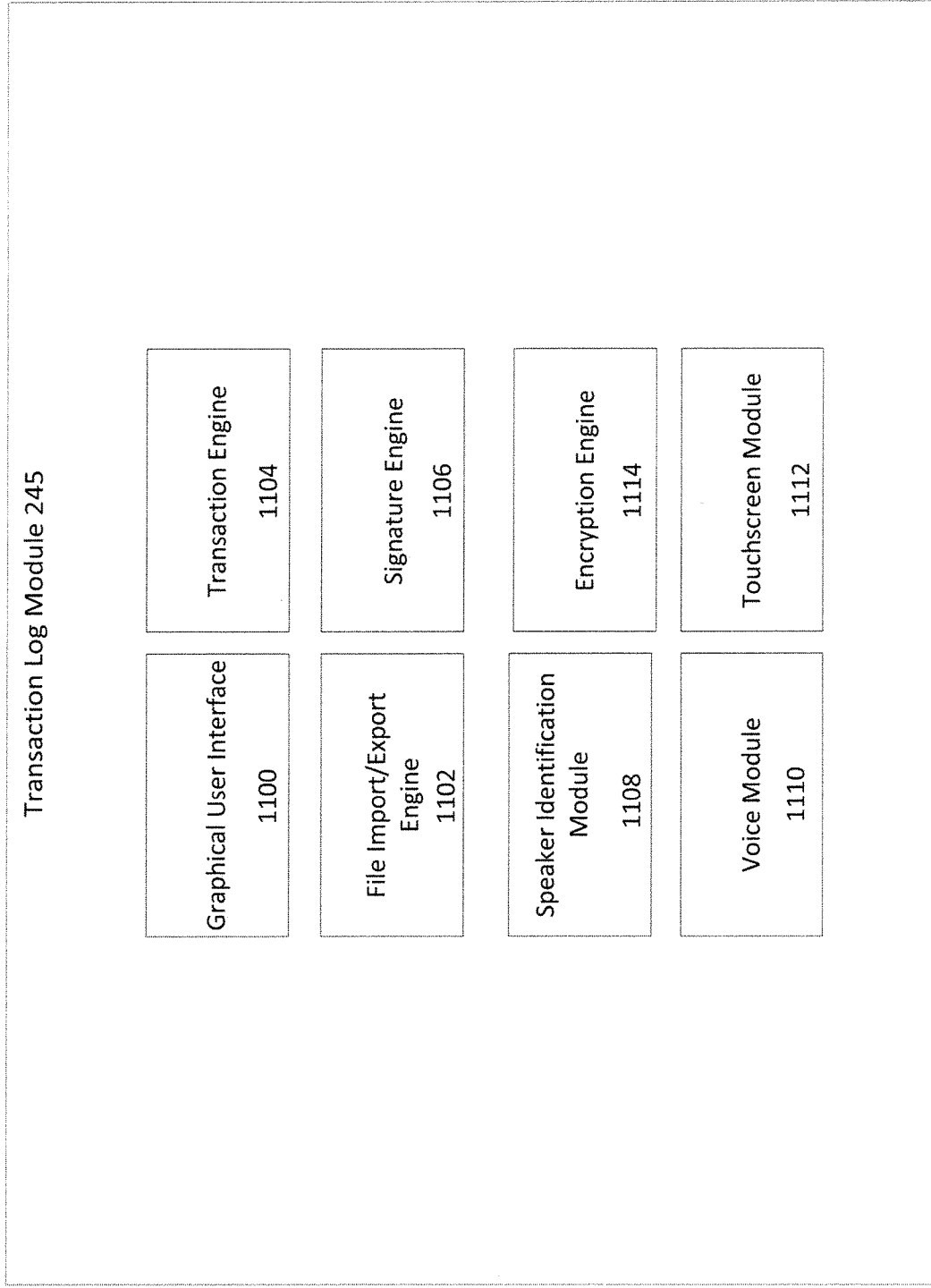
FIG. 11 is an exemplary architectural block diagram of the transaction log module of certain embodiments.

FIG. 11 is an architectural block diagram of the Transaction Log Module (245) which includes a Graphical User Interface (1100), File Import/Export Engine (1102), Transaction Engine (1104), Signature Engine (1106), Speaker Identification Module (1108), Voice Module (1110), Touchscreen Module (1112), and Encryption Engine (1114).

The Transaction Log Module (245) generates files which define assays that can be performed by a user. Additionally, they may record non-assay activities such as search queries and results of assays carried out by users (as described in FIG. 10). The Transaction Log Module (245) contains a Graphical User Interface (1100) for accessing transaction logs file. The Transaction Engine (1104) assembles the entire list of elements, operations, plugins and respective properties sequentially performed in an assay. The file may be signed using the Signature Engine (1106) which uniquely identifies the user. A variety of methods may be employed to identify the user such as username and password, voice recording, speaker identification, and touchscreen signature. The voice recording may be performed by the Voice Module (1110) storing the users voice with the transaction file. The Speaker Identification Module (1108) may identify the user by voice and act as the user signature. A Touchscreen Module (1112) can also be used, such as that found on a tablet device, mobile device, or peripheral device wherein the user would use their finger (or stylus) to stroke a signature stored with the file. The transaction log file can also be encrypted for security purposes via the Encryption Engine (1114). The File Import/Export Engine (1102) allows transaction files to be saved to the Library Module (200) or retrieved to be viewed by the user. Transaction log files may be valuable for documentation of assays and activities performed by a user. They may also be required in legal matters. Furthermore, the file may contain user information, timestamp, and signature and additional information. In some embodiments, the Transaction Log Module (245) may interact with the Intranet Network Library (120), Authentication (160), and the Extranet Main Network Library (130) or other systems to generate unique values including user and timestamp information.

FIG. 12 is an architectural block diagram of the Assay Player Module (250) which includes a Graphical User Interface (1200), Assay Player Engine (1202), Library Component Copy-Import Engine (1204), and Save/Export Engine (1206). The Assay Player Module (250) Graphical User Interface (1200) allows the user to access the assay. The Library Component Copy-Import Engine (1204) allows the stored assay to be imported into the module. The Assay Player Engine (1202) allows the user to add notes, update properties, and add data as the assay is performed. The Save/Export Engine (1206) allows the user to save the file back to the Library Module (200) or to be shared via the Intranet Network Library (120) or the Extranet Network Library (130).

The Assay Player Module (250) is a system which allows the assay designed in the Assay Design Module (205) to be performed at a later time or viewed in a step-by-step format. Each step lists one or more physical components from the set of element data objects for the assay step, and one or more actions from the associated operation data objects for the step.

For example, the user may choose to design the assay in one location, and then perform the assay elsewhere at later time. The assay player can import the Elements, Operations, and Plugins along with their respective properties for a given assay and prompt the user step-by-step with "Next" and "Previous" type navigation to switch among the steps of the assay. The player allows the user to graphically view the proposed properties of each item and update them as they perform the assay. It is possible for a special version of the software to be designed for tablet devices or mobile devices such that a user may enter a lab or medical facility with a tablet device and use the Assay Player Module to perform the assay, record the actual results, notes, data, and provide signature for the assay using the finger (or stylus) to stroke a signature stored with the transaction file. The Assay player module has the ability to record and note elapsed time between each step of an assay or procedure, such as by recording a completion timestamp for a step, and a total amount of time spent working on the particular step (or combination of steps).

FIG. 13 is an architectural block diagram of the Account Module (255) which includes a Graphical User Interface (1300), Account Engine (1302), File Import/Export Engine (1304), License Validation Engine (1306), Update Module (1308), and User Authentication Engine (1310).

The Account Module (255) stores software and user information. The Graphical User Interface (1300) allows the user and/or administrator to view the software version and setup user permissions. The Account Engine (1302) determines the type of user account. There may be several account types and several users using the same installation of the software. Each user may require a unique user account. In addition, each user may create a user profile containing attributes specified by the user for use in search relevance. The License Validation Engine (1306) validates the software license for a given user. Should a user lose their device, the system can be disabled remotely to prevent unauthorized access via the Authentication Module (160). The User Authentication Engine (1310) exchanges information with the Authentication Module (160) to determine the user authentication, rights, and privileges. Additionally, an Update Module (1308) is included which allows the software to update to new releases, and update the library with newly available elements, operations, plugins, and other components. In some examples, technology providers wishing to add new elements, operations, and plugins to the library pay for inclusion in such updates. The File Import/Export Engine (1304) allows for files to be imported and exported from the software including software application files and library files.

Figure 14:
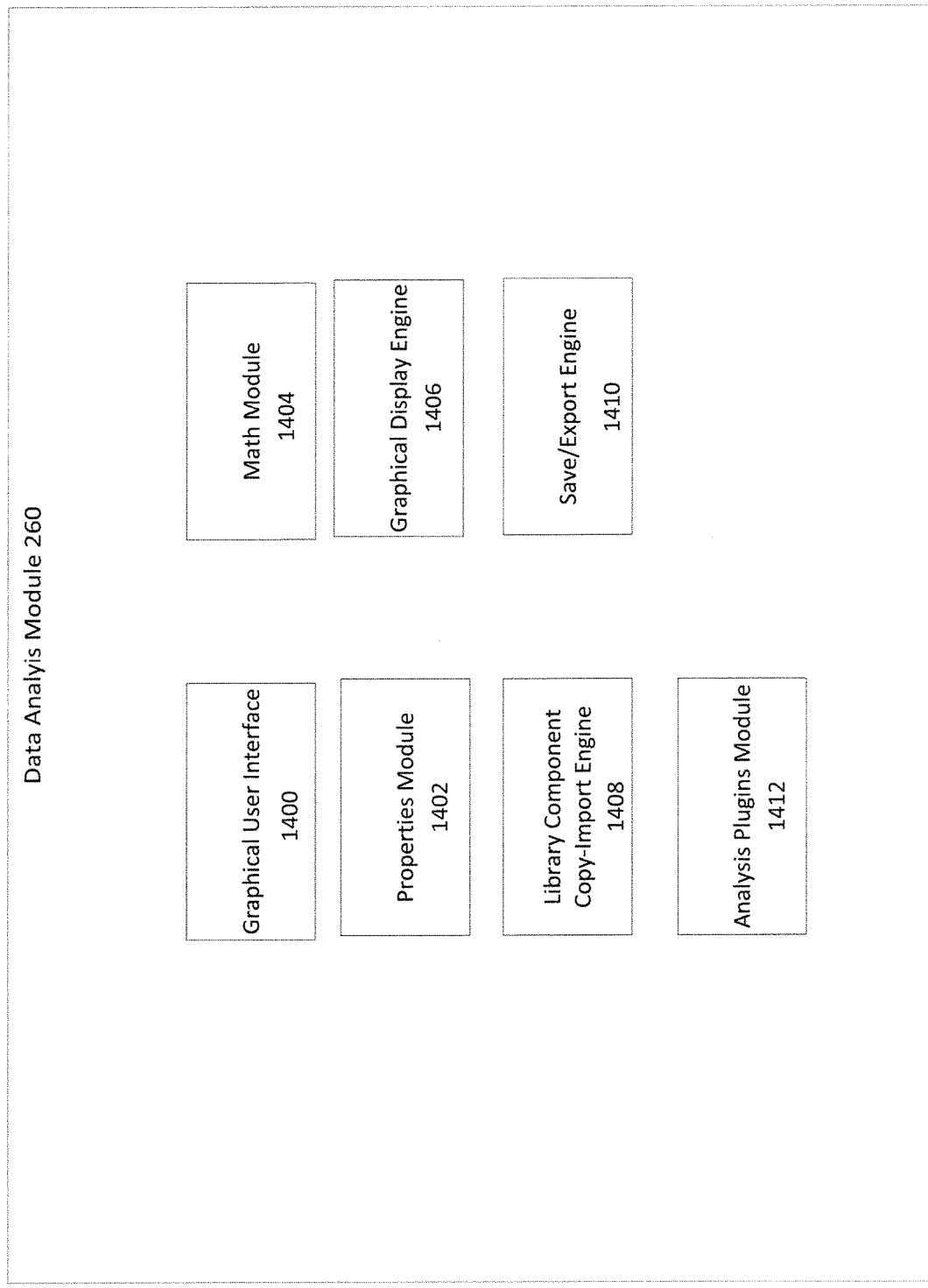
FIG. 14 is an exemplary architectural block diagram of the data analysis module of certain embodiments.

FIG. 14 is an architectural block diagram of the Data Analysis Module (260) which includes a Graphical User Interface (1400), Properties Module (1402), Math Module (1404), Graphical Display Engine (1406), Library Component Copy-Import Engine (1408), Save/Export Engine (1410), and Analysis Plugins Module (1412).

The Data Analysis Module (260) includes a Graphical User Interface (1400) which can be used to perform various data analysis tasks. The Properties Module (1402) allows the Data Analysis Module to interact with the properties of plugins, elements, and operations. The Library Component Copy-Import Engine (1408) allows the Data Analysis Module to import data as well as stored analytical procedures from the Library Module (200). The Math Module (1404) contains mathematical operations for manipulating data (e.g.: subtracting negative well values as described previously). The Graphical Display Engine (1406) allows for the generation of graphs. Data analysis output files and procedures can be saved and/or exported via the Save/Export Engine (1410). The Data Analysis Module (260) can also interface with specialized plugins for analysis via the Analysis Plugins Module (1412) which allows for specialized analytic tools for assays which can also be developed and shared.

The Data Analysis Module (260) allows for the manipulation of data to generate results and reports such as graphs, plots, and more. Once data is generated in an assay, the Data Module (235) is able to import, store, and parse the raw data. The Data Analysis Module (260) can use the properties of elements, operations, and plugins to render reports. One example would include a microplate plugin with properties that define a plate map that designates the negative and positive control wells for an assay. Using the Data Analysis Module (260) the user can normalize values for that assay by subtracting the negative control well values from any or all wells on the microplate, thus reducing background signal. Furthermore, the positive control wells can be used as a relative indicator for the response from the experimental wells. Additionally, if a compound was used in a dose-dependent manner across wells, the individual wells can be plotted versus the concentration of compound used. Since this information is stored in the properties of the plugin module used in that assay, the information can be retrieved from the Assay Plugin Module (210) and data from the Data Module (235) and manipulated in the Data Analysis Module (260) rendering useful information for the user.

FIG. 15 is an architectural block diagram of the Ecommerce Module (265) which includes a Graphical User Interface (1500), Import/Export Engine (1502), Ecommerce Engine (1504), and Notification Engine (1506).

The Ecommerce Module (265) allows users to order assays, elements, operations, plugins, and other components from vendors and technology providers using the software. The Ecommerce Module contains a list of components (elements, operations, and plugins) using the Import/Export Engine (1502) which can be viewed through the Graphical User Interface (1500) which the user can order. The Ecommerce Engine (1504) acts similar to a shopping cart collecting the item lists, quantities, and prices. The purchase can be completed via the network where a secured transaction can occur on the Extranet Network Library (130). The Vendor Notification Engine (1506) can also send vendors order information or alternatively be used to request samples. Vendor Notification Engine (1506) may also send order confirmation information back to the user and may be used as a communication service between the user and vendor. Some users may require authorization for certain ecommerce functionalities.

Figure 16A:
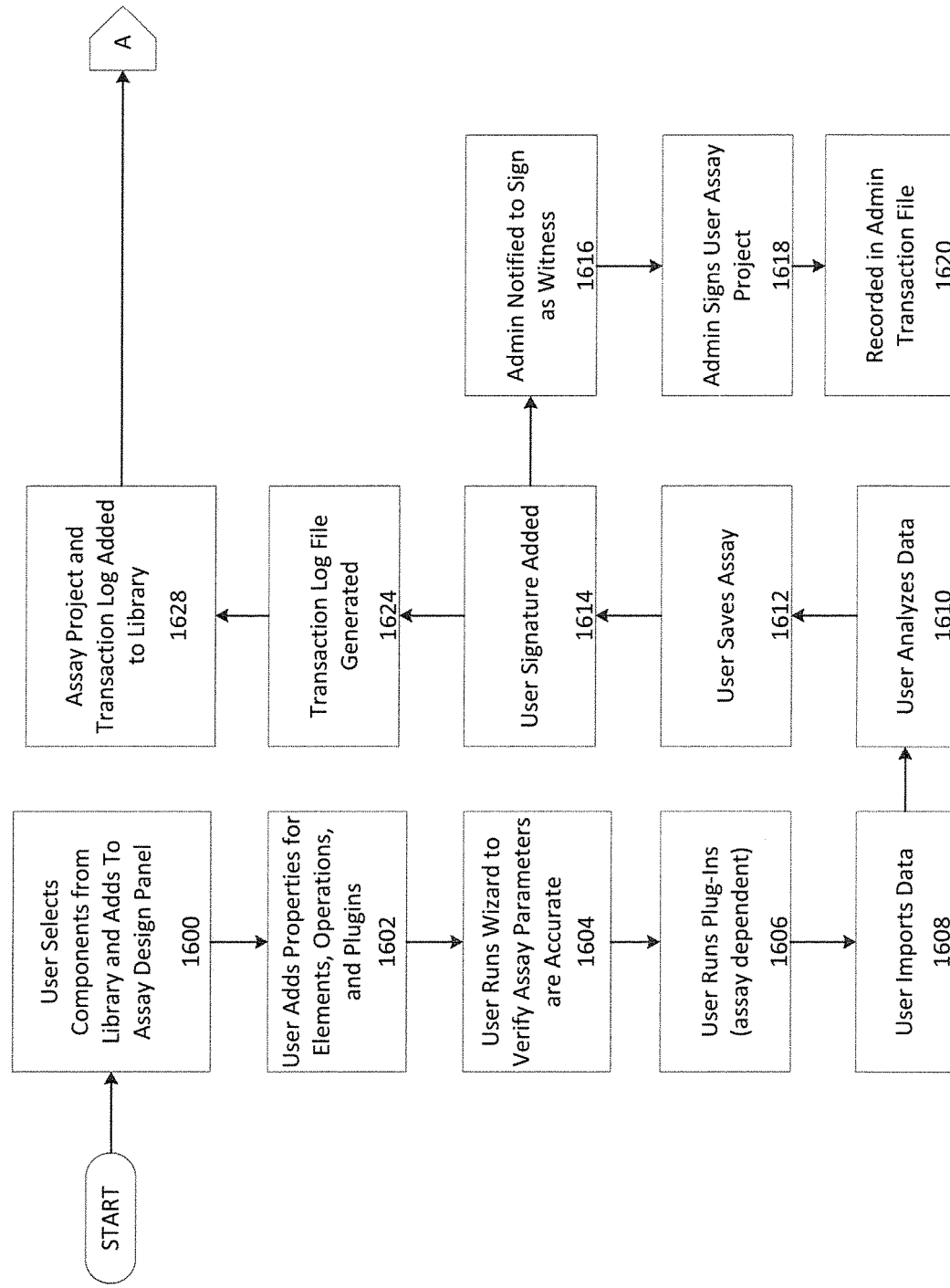
FIG. 16A illustrates an exemplary process for creating a new assay and sharing the new assay with a team or the global community, of certain embodiments.
Figure 16B:
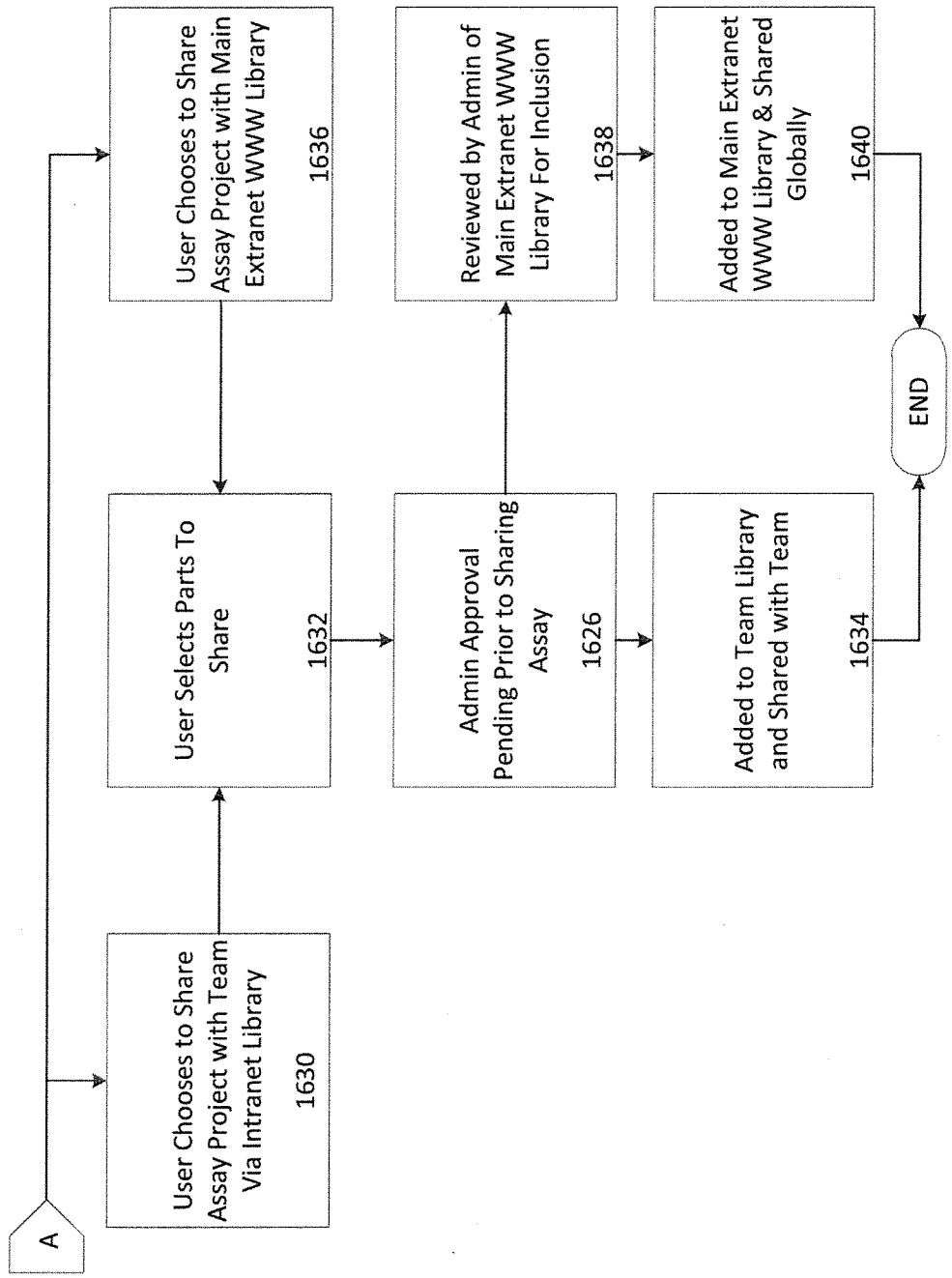
FIG. 16B illustrates an exemplary process for creating a new assay and sharing the new assay with a team or the global community, of certain embodiments.

FIGS. 16A and 16B illustrate an exemplary process is where the user is able to create a new assay using the software and share this assay with a team or the global community. The logical flow is described as follows. The user selects components (e.g., elements, operations, plugins) from the Library and can add them to the Assay Design interface (1600). The user can add and update the properties for each element, operation, and plugin used in the assay (1602). The user can also run the Wizard to verify the assay parameters are valid (1604). The user can also run plugins which may be device controllers to run the experiment that has been designed (1606). It is important to note that device control plugins are not always required for the purpose of conducting the assay as the user may conduct the assay manually. The user can also import that assay data (1608) and include it with the Assay Design at any point such as the end of the assay or report intermediate results during the course of the assay. Additionally, the user can also perform data analysis (1610) using the Data Module (235). The user can save the assay project (1612). Once saving is initialized, the user may add the user's signature to the assay (1614). In some configurations, the administrator (e.g.: supervisor, lab head, manager) may be notified that the user has saved an assay and the admin is notified to sign (1616). This notification can be provided via various methods such as email, however in one embodiment, the administrator version of the software allows for managing other users. The admin is notified to sign as a witness (1616) to the user assay. The admin can sign the user assay project (1618) and the process is recorded to the user Transaction Log File (1624) and the admin Transaction Log File (1620). In other instances the software may be configured such that admin signature is not needed. The assay project and Transaction Log are added to the user library (1628).

Continuing from FIG. 16A to FIG. 16B, the user is able to share the assay project with the team (1630). The user can elect to share the entire assay project, or select parts to share, with the team via the Intranet Library (1632). FIGS. 22A-22D provide detail as to how elements, operations, plugins, and data are converted from a graphical display to a text-based assay data file. Additionally, when the software loads an assay data file, it may be able to convert the data file to a graphical representation of assay. For example, the user can share only a subset of an assay specification, and in response the system can generate an abbreviated assay data file that includes a subset of element data objects and/or a subset of operation data objects associated with the subset of the candidate assay specification. Additionally, the user can share the entire assay project, or select parts to share, with the global community via the Main Extranet WWW Library (1636). In one embodiment, the admin is notified that the user is choosing to share the assay project (or parts thereof) with the team and/or global community. The admin can allow sharing via approving the request (1626) and the project (or parts thereof) is added to the team library (1634). Alternatively, the admin can set the user software to auto-approve sharing with the team by setting the permissions for the user software. The admin approval flow is an optional feature and may not be required in all cases. If the user has chosen to share the assay project (or parts thereof) with the global community the admin of the Main Extranet WWW Library reviews the assay for inclusion (1638) and the assay project (or parts thereof) are added to the Main Extranet WWW Library and shared with the global community (1640). Team users or the global community is able to download the assay project or parts and use the information for their own assays. This may also create a collaborative working environment. See FIG. 19 for downloading assays.

Figure 17A:
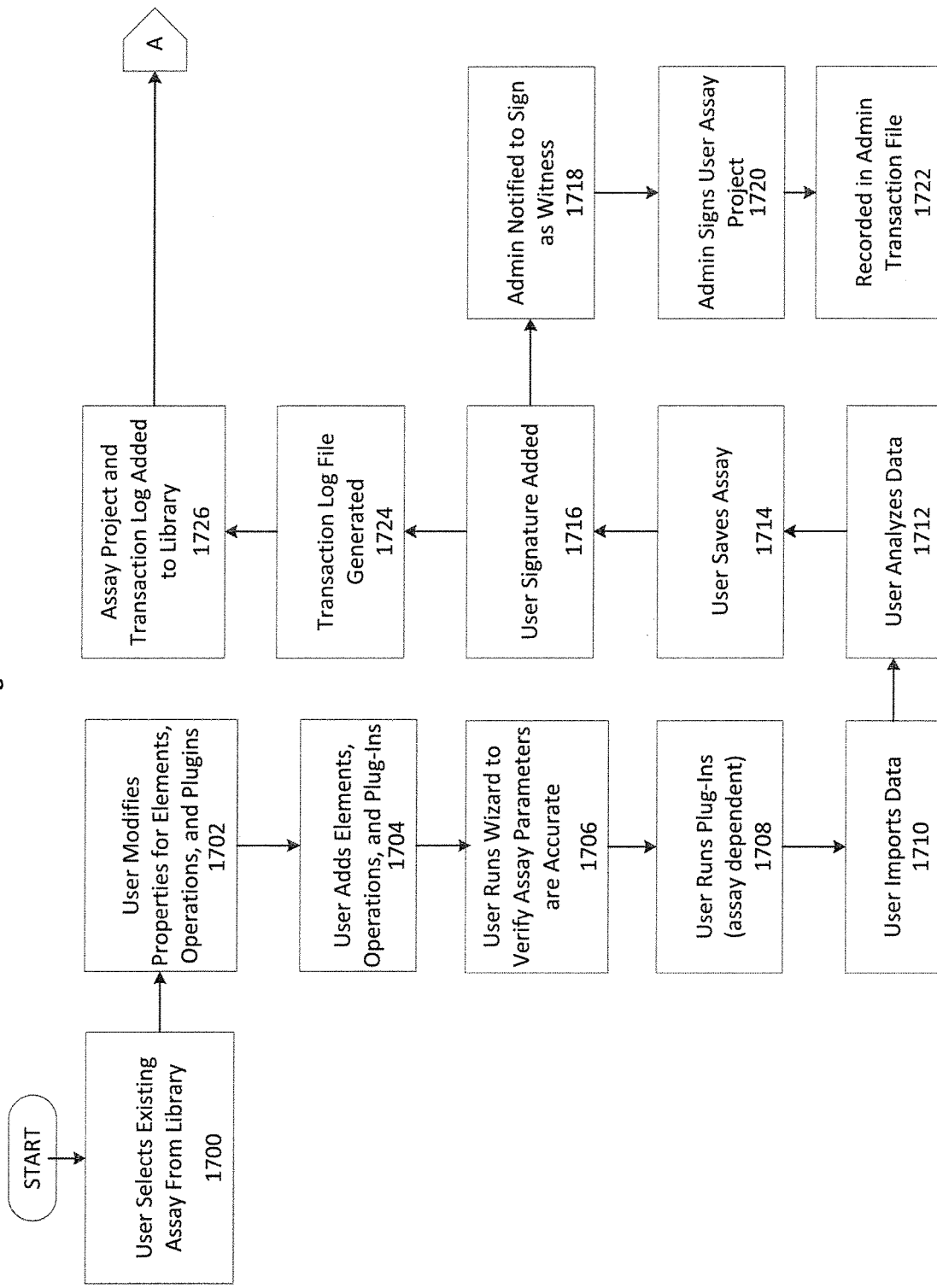
FIG. 17A illustrates an exemplary process for creating a new assay based on an existing assay, and sharing the new assay with a team or the global community, of certain embodiments.
Figure 17B:
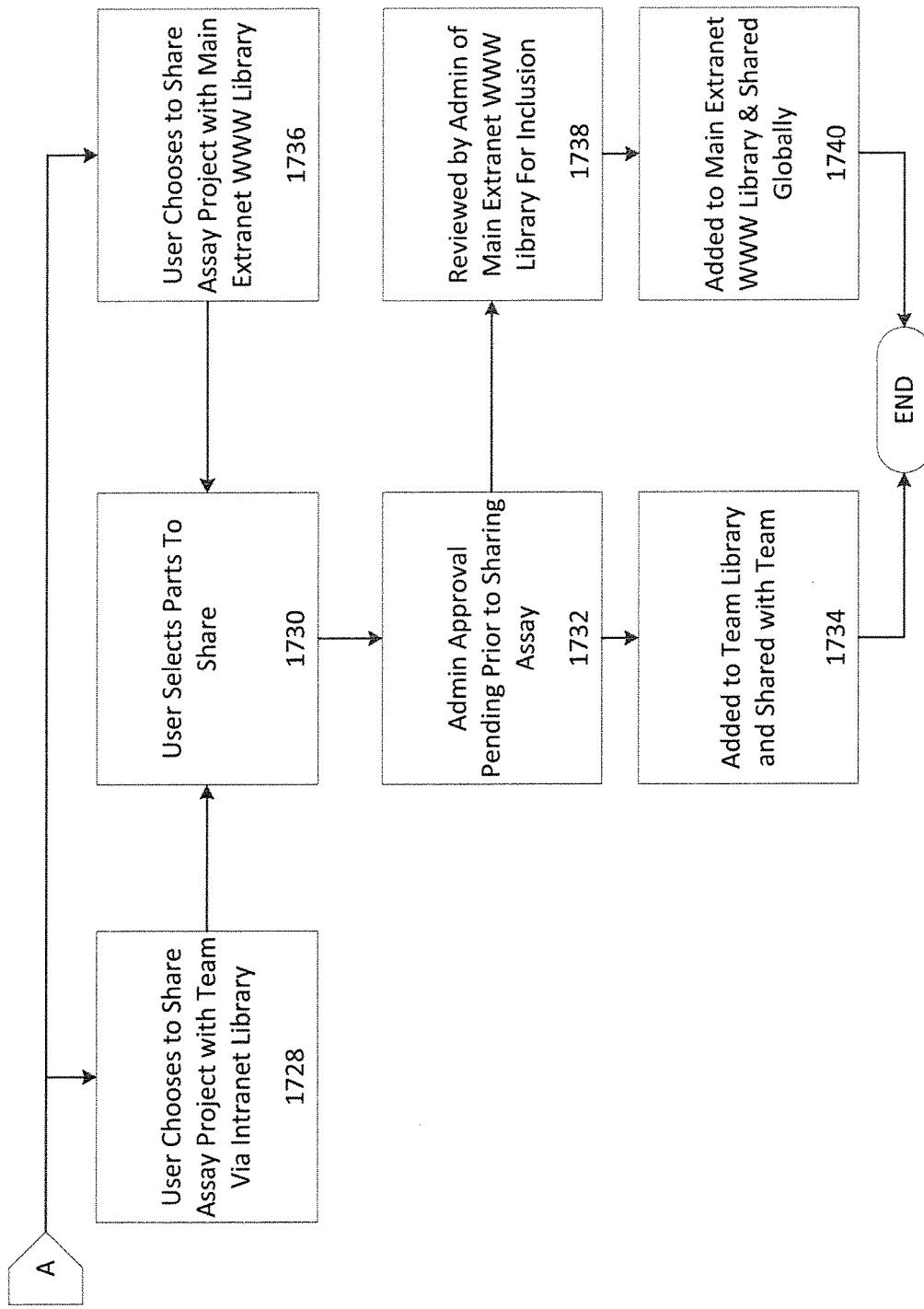
FIG. 17B illustrates an exemplary process for creating a new assay based on an existing assay, and sharing the new assay with a team or the global community, of certain embodiments.

FIGS. 17A and 17B illustrate an exemplary process whereby the user is able to create a new assay using the software based on an existing assay, and share this with the team or the global community. The logical flow is described as follows. The user selects the existing assay from the assay library (1700). The user modifies properties for the elements, operations, and plugins as needed (1702). The user can also remove elements, operation, and plugins as needed. The user can add elements, operations, and plugins as needed (1704). The user can also run the Wizard to evaluate assay properties and parameters (1706). The user can run plugins if needed (1708). The user can import data (1710) as previously described (Step 1608 of FIG. 16A). The user can analyze the data (1712) as previously described (step 1610 of FIG. 16A). The user saves the assay (1714). The user signature is added (1716). In some configurations, the administrator (e.g.: supervisor, lab head, manager) may be notified that the user has saved an assay and the admin is notified to sign (1718). This notification can be provided via various methods such as email, however in one embodiment, the administrator version of the software allows for managing other users. The admin is notified to sign as a witness (1718). The admin signs the user assay project (1720). The admin transaction log file records the admin has signed the user project (1722). The user transaction log file is generated (1724). In other instances the software may be configured such that admin signature is not needed. The assay project and transaction log are added to the library (1726).

Continuing from FIG. 17A to 17B, the user may choose to share the assay project with the team (1728). The user can elect to share the entire assay project or select parts to share (1730) with the team via the Intranet Library. Additionally, the user can share the entire assay project, or select parts to share, with the global community via the Main Extranet WWW Library (1736). The admin is notified that the user is choosing to share the assay project (or parts thereof) with the team and/or global community. The admin can allow sharing via approving the request (1732) and the assay project (or parts thereof) is added to the team library (1734). Alternatively, the admin can set the user software to auto-approve sharing with the team by setting the permissions for the user software. The admin approval flow is an optional feature and may not be required in all cases.

If the user has chosen to share the assay project (or parts thereof) with the global community the admin of the Main Extranet WWW Library reviews the assay for inclusion (1738) and the assay project (or parts thereof) are added to the Main Extranet WWW Library and shared with the global community (1740). Team users or the global community is able to download the assay project or parts and use the information for their own assays. This may also create a collaborative working environment. See FIG. 19 for downloading assays.

Figure 18A:
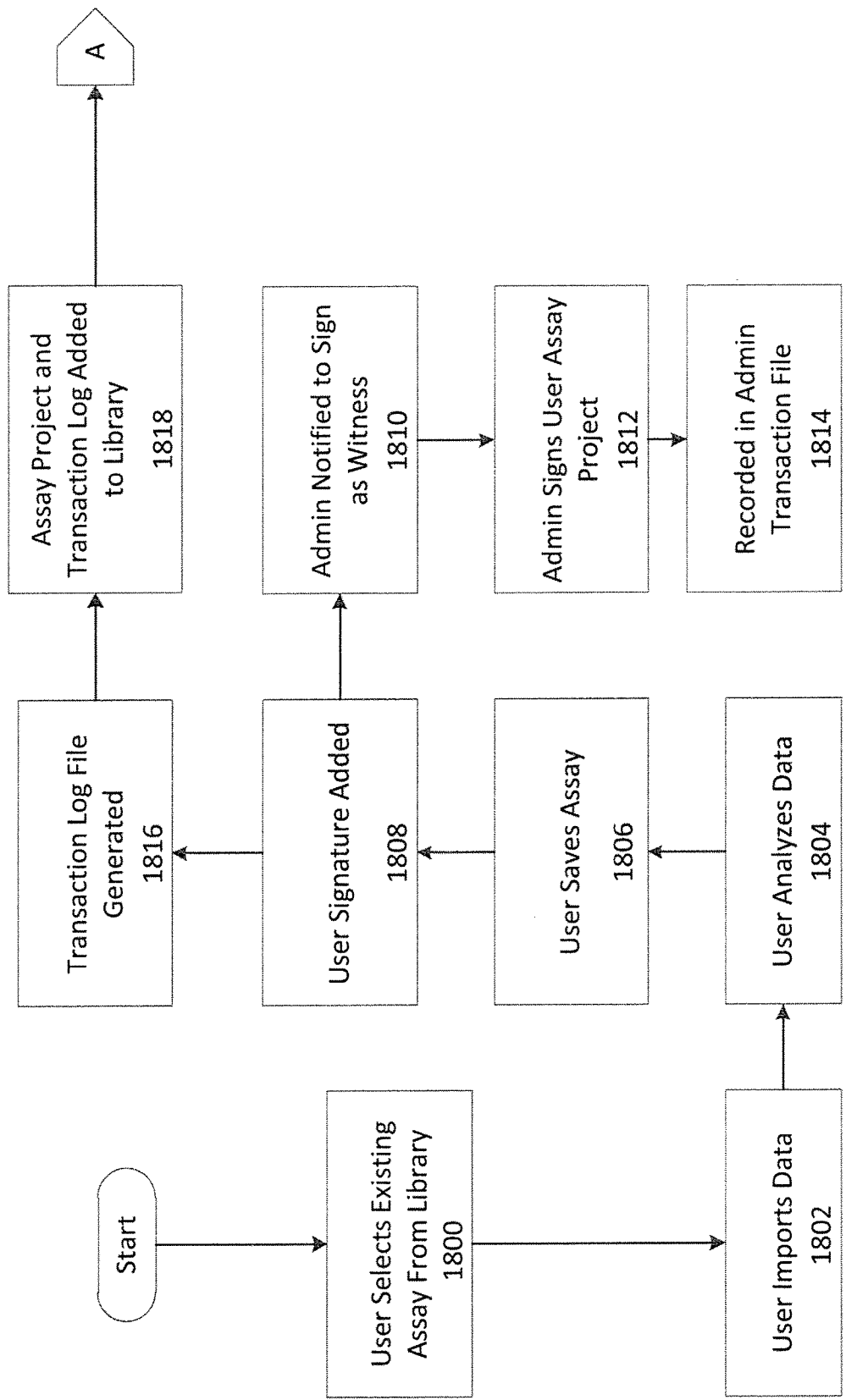
FIG. 18A illustrates an exemplary process for designing an assay at a given time, adding data to the assay project at a later time, and sharing the assay with a team or global community, of certain embodiments.
Figure 18B:
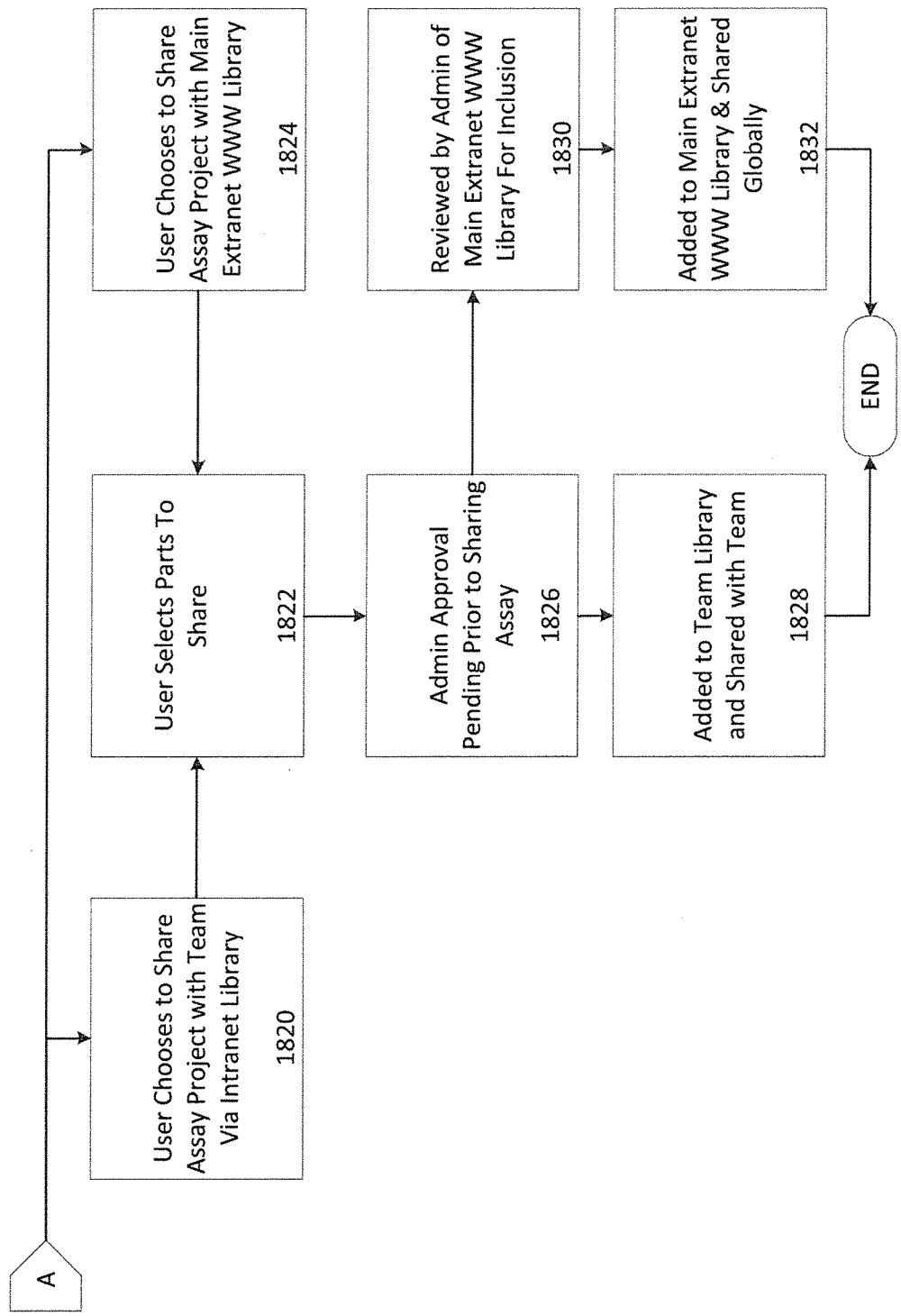
FIG. 18B illustrates an exemplary process for designing an assay at a given time, adding data to the assay project at a later time, and sharing the assay with a team or global community, of certain embodiments.

FIG. 18A and FIG. 18B illustrate an exemplary process whereby a user may choose to design an assay at a given time and add data to the assay project at a later time, and then share the assay with a team or global community. The logical flow is described as follows. The user selects their existing assay from the library (1800). The user imports data (1802), analyzes the data (1804), and saves the assay (1806). The user signature is added (1808) and the admin is notified to sign as witness (1810). In some configurations, the administrator (e.g.: supervisor, lab head, manager) may be notified that the user has saved an assay and the admin is notified to sign (1810). This notification can be provided via various methods such as email, however in one embodiment, the administrator version of the software allows for managing other users. The admin signs the user assay project (1812). The admin transaction log file records the admin has signed the user project (1814). The user transaction log file is generated (1816). In other instances the software may be configured such that admin signature is not needed. The assay project and transaction log are added to the library (1818).

Continuing from FIG. 18A to 18B, the user chooses to share the assay project with the team (1820). The user can elect to share the entire assay project or select parts to share (1822) with the group via the Intranet Library. Additionally, the user can share the entire assay project, or select parts to share, with the global community via the Main Extranet WWW Library (1824). The admin is notified that the user is choosing to share the assay project (or parts thereof) with the team and/or global community. The admin can allow sharing via approving the request (1826) and the project (or parts thereof) is added to the team library (1828). Alternatively, in some examples the admin can set the user software to auto-approve sharing with the team by setting the permissions for the user software. The admin approval flow is an optional feature and may not be required in all cases. If the user has chosen to share the assay project (or parts thereof) with the global community the admin of the Main Extranet WWW Library reviews the assay for inclusion (1830) and the assay project (or parts thereof) are added to the Main Extranet WWW Library and shared with the global community (1832). Team users or the global community is able to download the assay project or parts and use the information for their own assays. This may also create a collaborative working environment. See FIG. 19 for downloading assays.

Figure 19A:
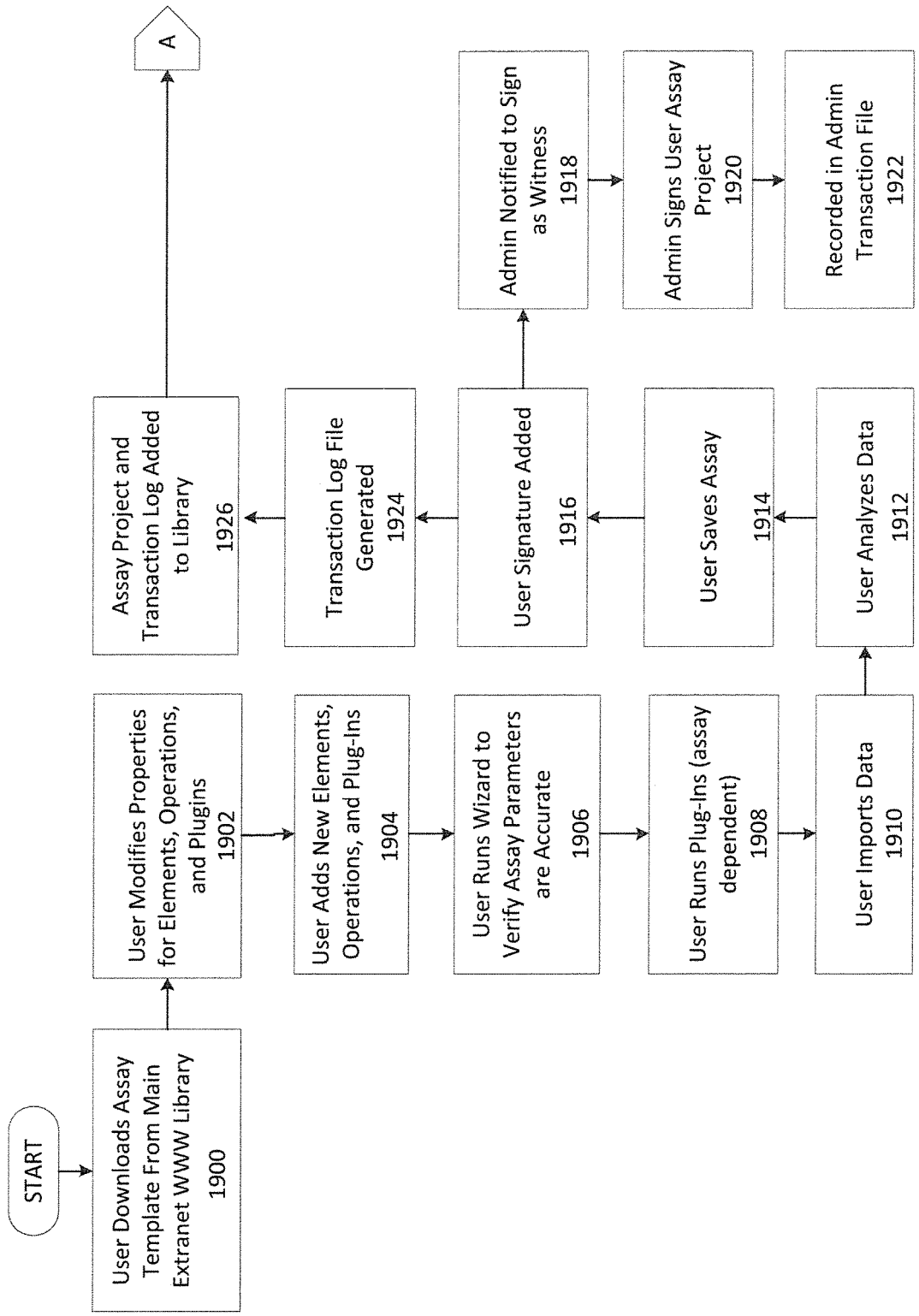
FIG. 19A illustrates an exemplary process for designing and sharing assays, and creating opportunities for other users to download assay projects, templates, or components and build on the downloaded assays, of certain embodiments.
Figure 19B:
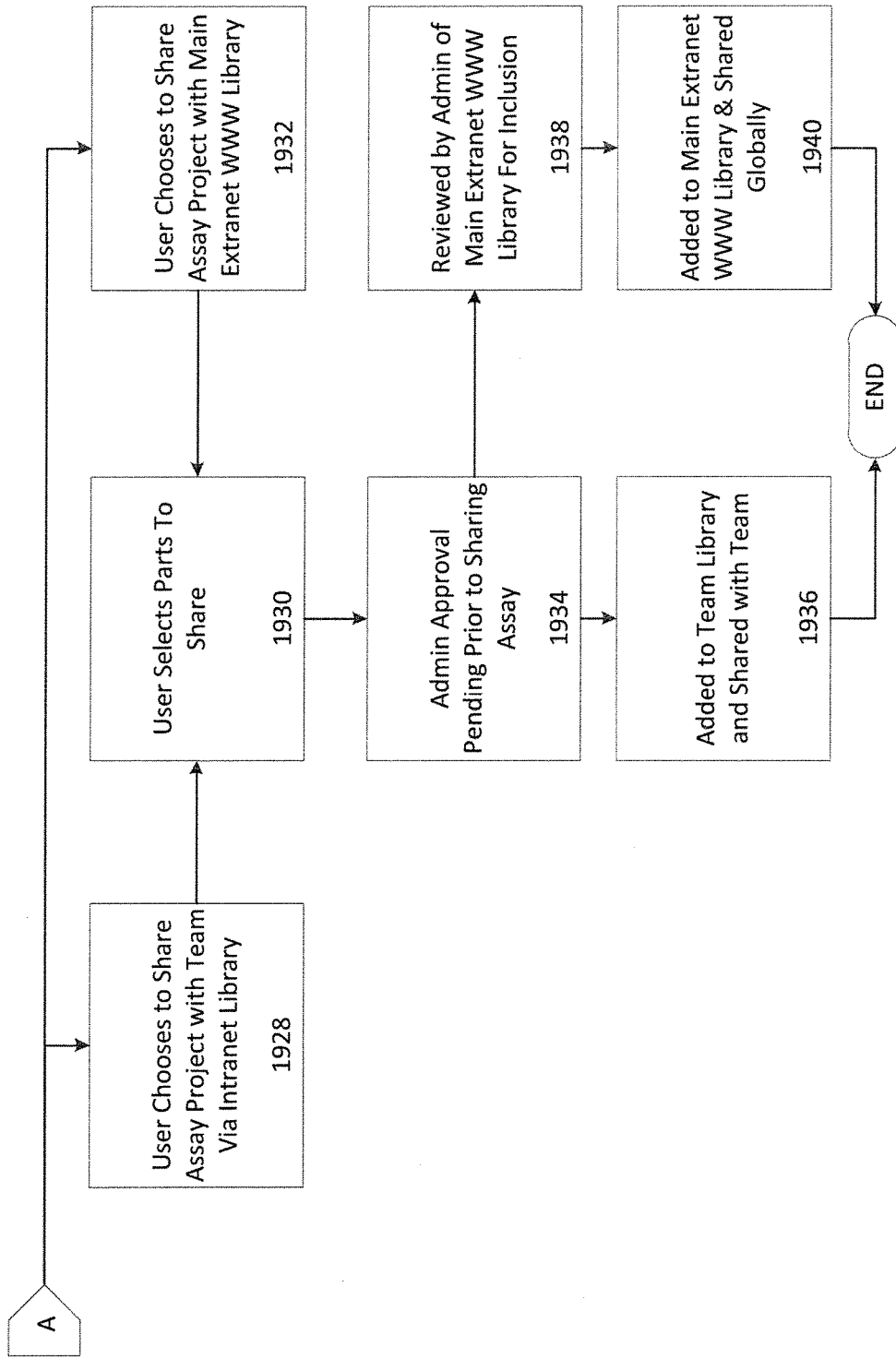
FIG. 19B illustrates an exemplary process for designing and sharing assays, and creating opportunities for other users to download assay projects, templates, or components and build on the downloaded assays, of certain embodiments.

FIGS. 19A and 19B illustrate an exemplary process whereby the software allows users to design and share assays and creates opportunities for other users to download assay projects, templates, or components via the Main Extranet WWW Library (1900) and build on these assays to create new assays which can also be shared. This may also create a collaborative working environment. The logical flow is described as follows. The user downloads the assay template files from the Main Extranet WWW Library (1900). The user can then modify the properties for elements, operations, and plugins as needed (1902). The user can add new elements, operations, and plugins to the assay template (1904). Additionally, the user can delete elements, operations, and plugins from the assay template. The user can run the Wizard to evaluate assay parameters (1906) and run plugins as needed (1908). If data is generated, it can be imported (1910). The user can also analyze data (1912). The user can save this assay and the user signature is added (1916), the admin is notified to sign as witness (1918). In some configurations, the administrator (e.g.: supervisor, lab head, manager) may be notified that the user has saved an assay and the admin is notified to sign (1918). This notification can be provided via various methods such as email, however in one embodiment, the administrator version of the software allows for managing other users. The admin signs the user assay project (1920). The admin transaction log file records the admin has signed the user project (1922). In other instances the software may be configured such that admin signature is not needed. The user transaction log file is generated (1924). The assay project and transaction log are added to the library (1926).

Continuing from FIG. 19A to 19B, the user chooses to share the assay project with the team (1928). The user can elect to share the entire assay project, or select parts to share, with the group via the Intranet Library (1930). Additionally, the user can share the entire assay project, or select parts to share, with the global community via the Main Extranet WWW Library (1932). The admin is notified that the user is choosing to share the assay project (or parts thereof) with the team and/or global community. The admin can allow sharing via approving the request (1934) and the project (or parts thereof) is added to the team library (1936). Alternatively, the admin can set the user software to auto-approve sharing with the team by setting the permissions for the user software. The admin approval flow is an optional feature and may not be required in all cases. If the user has chosen to share the assay project (or parts thereof) with the global community the admin of the Main Extranet WWW Library reviews the assay for inclusion (1938) and the assay project (or parts thereof) are added to the Main Extranet WWW Library and shared with the global community (1940). Team users or the global community is able to download the assay project or parts and use the information for their own assays. This may also create a collaborative working environment.

Figure 20:
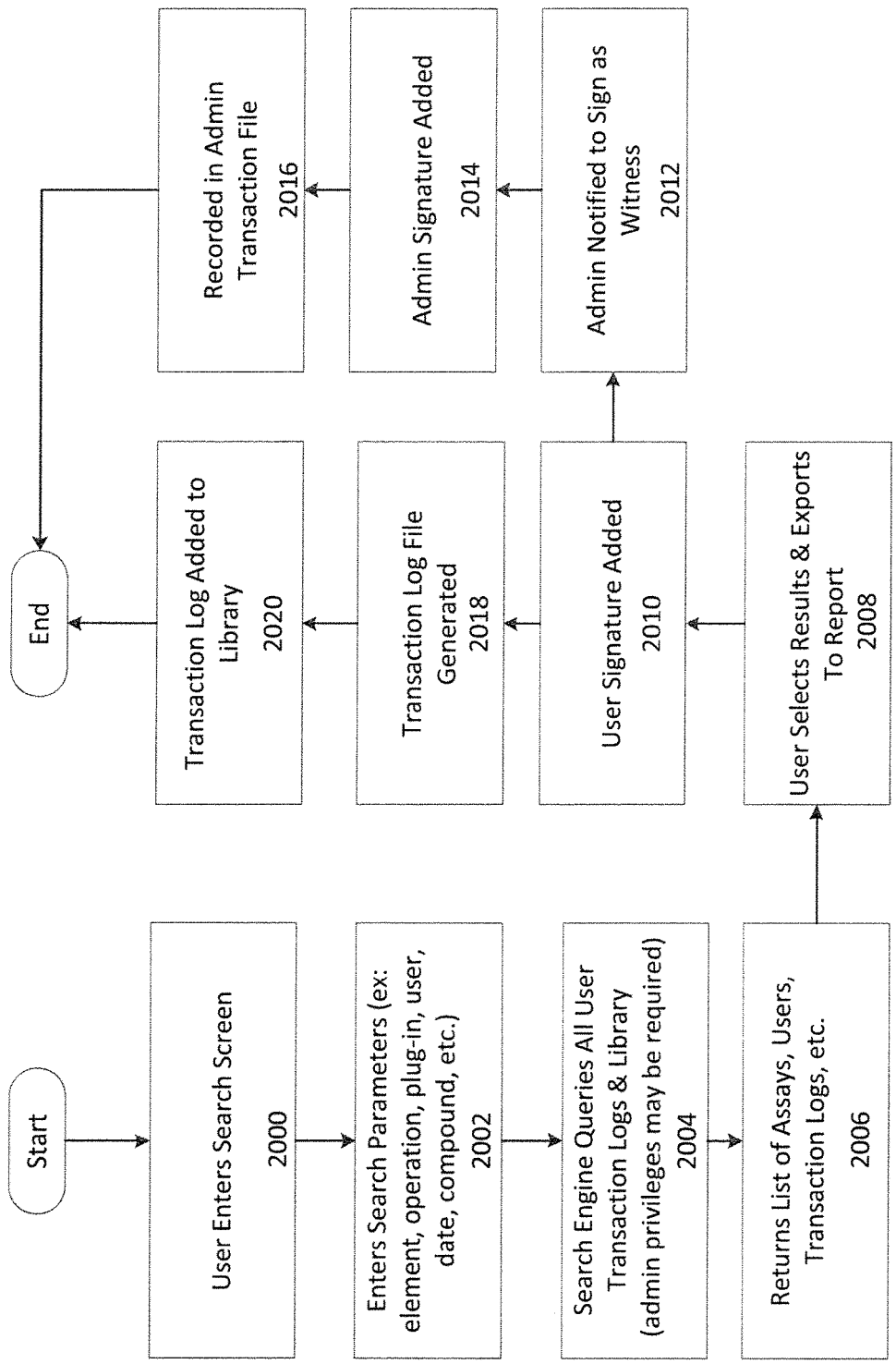
FIG. 20 illustrates an exemplary process for storing assays as projects and components that include elements, operations, and plugins, along with their associated properties, and enabling searches for assays, users, and components based on any query parameter, of certain embodiments.

FIG. 20 illustrates an exemplary process whereby the software is able to store assays as projects and components including elements, operations, and plugins, along with their associated properties and enable the user to search for assays, users, and components based on any query parameter. For example, a user may identify a certain reagent as being contaminated and may want to query for all assays which used that particular reagent and which may offset results. Similarly, an administrator may wish to find the number of users and assays which employed the use of a particular reagent. The logical flow is described as follows. The user enters the search screen (2000). The user can enter a search query and select parameters such as library, transaction logs, elements, operations, plugins, data, user, compound, etc (2002). Certain queries may require admin privileges such as retrieving a list of users or locations. The search engine queries all user transaction logs (2004) and libraries. The result set delivers a list of matching results such as assays, users, transaction logs, etc. (2006). The user can select the results and export the reports (2008). Depending on privileges, the admin may also be able to view the assay performed in full detail. Optionally, the user signature may be added (2010) to the query report and a transaction log file of the query is generated (2018). This may be optional in certain settings and required in others. Furthermore, an admin may need to sign the query transaction log as a witness to another user (2012) and the admin signature is also added (2014) and recorded to the admin transaction file (2016). The search query transaction log file is added to the transaction logs library (2020).

Figure 21A:
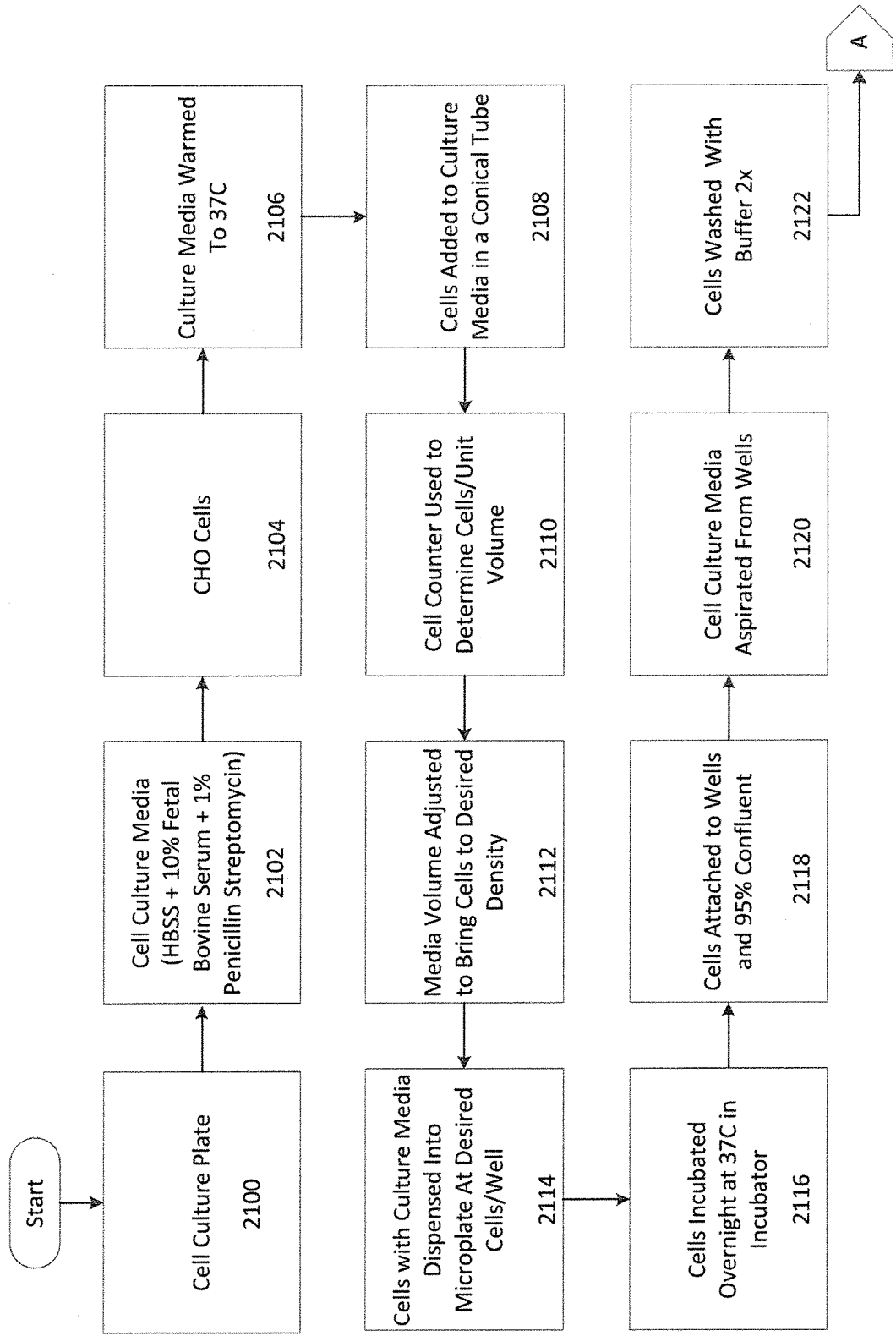
FIG. 21A illustrates an exemplary process whereby a sample cell-based assay workflow entails a variety of steps, of certain embodiments.
Figure 21B:
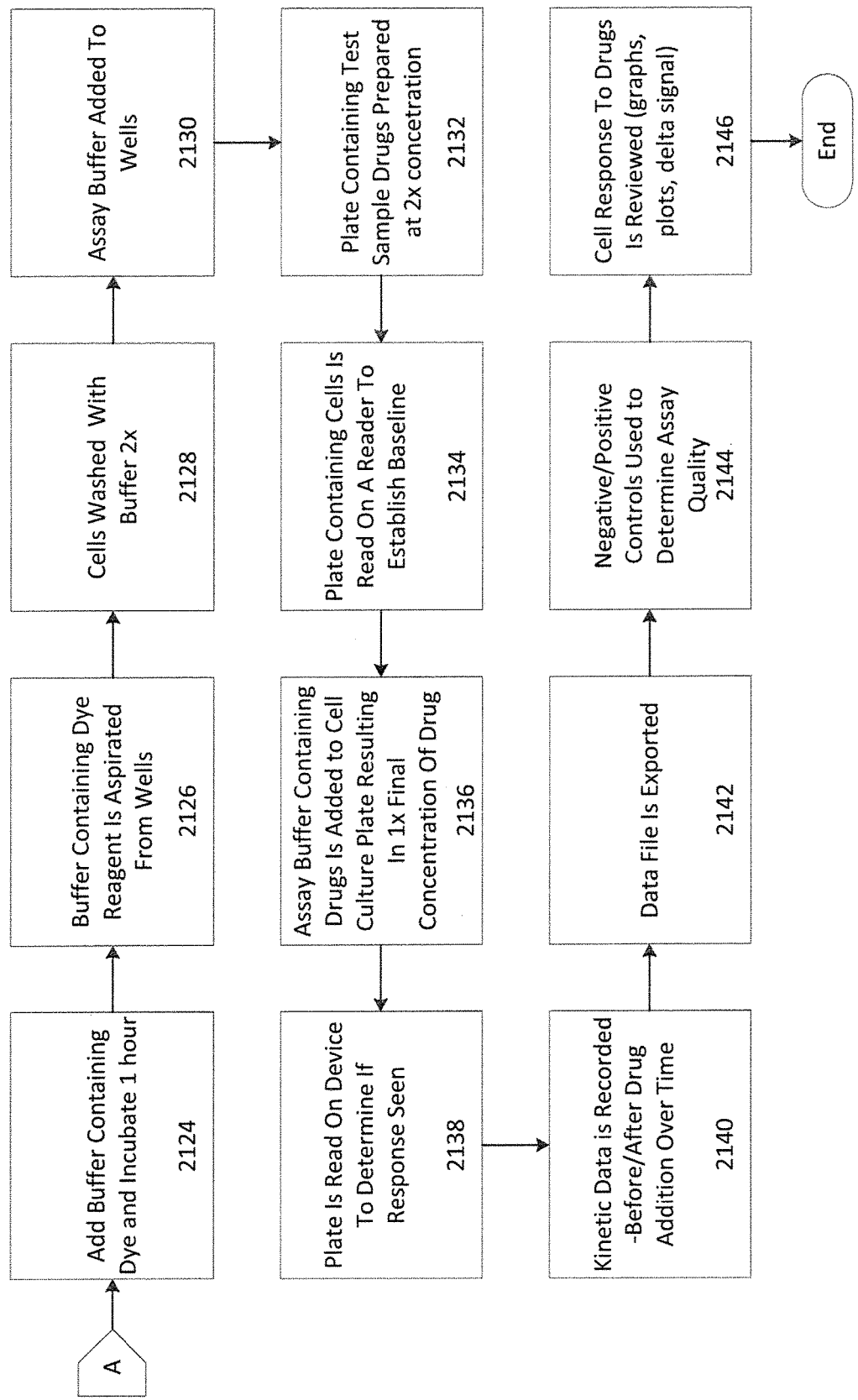
FIG. 21B illustrates an exemplary process whereby a sample cell-based assay workflow entails a variety of steps, of certain embodiments.

FIG. 21A and FIG. 21B illustrates a process whereby a sample cell-based assay typical workflow may entail a variety of steps. The purpose of this figure is to demonstrate the workflow of a traditional cell-based assay. In subsequent figures this example assay can be translated as an assay conducted using the assay software techniques described herein. A cell culture plate is selected for the purpose of growing cells (2100). Cell culture media is prepared containing salt solution, 10% fetal bovine serum, and 1% penicillin/streptomycin (2102). Cells are selected for the assay such as Chinese Hamster Ovarian (CHO) cells (2104). The cell culture media is warmed to 37° C. (2106). The cells are added to the cell culture media in a conical tube (2108). A cell counter device is used to count the number of cells per unit volume media (2110). The media volume is adjusted to bring the cells to the desired cell density (2112). The cells in culture media are dispensed into a microplate to add the desired number of cells to each well (2114). The cells are incubated in an incubator at 37° C. overnight (2116) to allow attachment of the cells to the well bottom. The attached cells are visually inspected to reach 95% confluence (2118). The cell culture media is then aspirated from the well (2120). The cells are washed twice with the appropriate buffer (2122).

Continuing from FIG. 21A to 21B, a buffer containing the dye reagent is added to the wells containing cells and incubated for 1 hour (2124). The buffer containing the dye reagent is then aspirated from the well (2126). The cells are washed with buffer twice more (2128). The assay buffer is added to the wells of the microplate (2130). A second plate containing drugs (e.g.: small molecules) is prepared at twice the desired final concentration (2132). The plate containing cells is read on a reader to establish a baseline measurement (2134). The assay buffer containing the drugs to is added to the cell culture plate at a volume which results in the desired final concentration (2136). The plate is read again on a device to determine if a response is detected (2138) over time in the presence of the drug and dye (2140). The kinetic data over time is recorded (2140). The data file is exported (2142). The data file is then analyzed and assay quality is verified by measuring the response of the negative control wells and positive control wells (2144). The cell response to the drugs is reviewed through a variety of different methods such as graphs, plots, signal subtractions, etc (2146). This high-level view demonstrates the workflow involved in a typical cell-based assay. This assay can now be viewed as elements, operations, and plugins using the assay software techniques described herein, as shown in FIG. 22.

FIGS. 22A, 22B, 22C, and 22D illustrates a process and depicts the assay workflow in the example assay described in FIGS. 21A and 21B, to show how the element data objects, operation data objects, and plugins are encoded in a data file. Here the same assay is viewed as a series of Elements, Operations, and Plugins, each of which have their own properties in the software application. Each element, operation, and plugin can be classified as a type either through a default library setting, or a custom type as determined by the user. Classifying elements, operations, and plugins by type enables the user to more quickly locate the component in the library. Properties may include notes which can be a variety of user inputs such as observations, intermediate results, and more for a given element, operation, or plugin. The user may also customize properties for a given element, operation, or plugin. They may choose to add or remove properties, or create new elements, operations, and plugins with custom properties. A default set of properties may be included in the default set of elements, operations, and plugins.

As elements, operations, plugins, data, and their associated properties are assembled in a graphical representation in the software, information can be assembled to visually represent the assay. The information of each component can also be used to generate a text file with full details of the assay. This allows the user to visually create an assay (e.g., by dragging and dropping) and efficiently document the assay (e.g., via the text file). Additionally, an assay file can be generated using this information which can render (e.g., or re-create) the visual representation of the assay when the assay file is loaded into the software. The drag-and-drop interface (as described in FIG. 23 steps 2304 and 2306) allows the user to create relationships between elements, operations, plugins, and data in a visual representation and add properties information to each. The software can extract the information from each object and generate a text file or assay file enabling visual representation of the assay when loaded in the software.

Figure 22A:
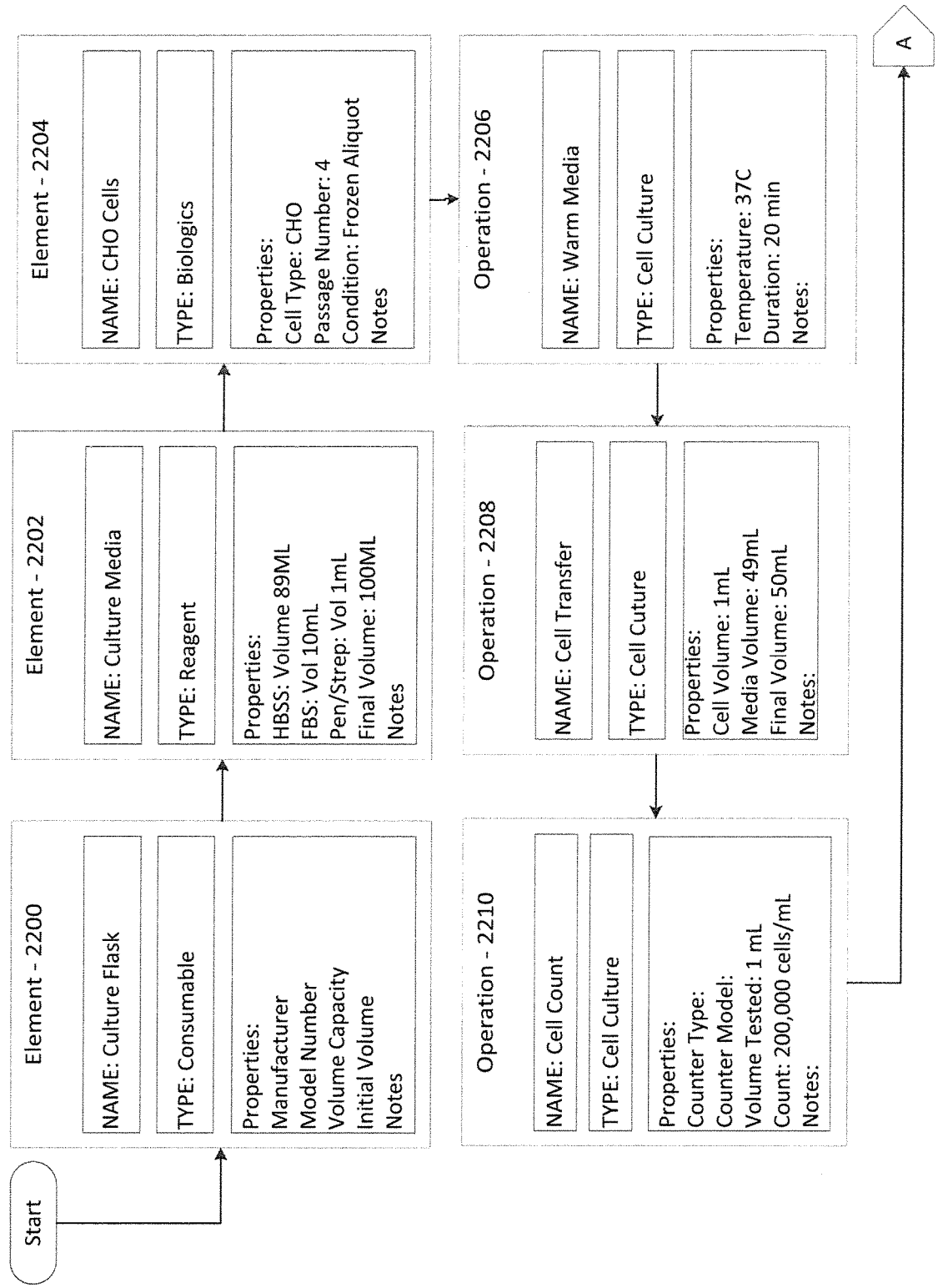
FIG. 22A illustrates an exemplary process and assay workflow using the example assay described in FIGS. 21A and 21B, of certain embodiments.

Beginning with FIG. 22A, the culture flask is an element of type consumable with the properties of manufacturer, model number, volume capacity, initial volume, and notes (2200). The culture media is an element of type reagent with properties which include salt buffer, fetal bovine serum, penicillin/streptomycin, at various volumes, a final volume if 100 mL, and notes (2202). The CHO cells are an element of the type biologics with the properties including cell type, passage number, condition, and notes (2204). Warming the media is an operation of type cell culture with properties including temperature, duration, and notes (2206). Cell transfer is an operation of type cell culture with properties including cell volume, media volume, final volume, and note (2208). Cell count is an operation of type cell culture with properties including counter type, model, volume tested, count value, and notes (2210).

Figure 22B:
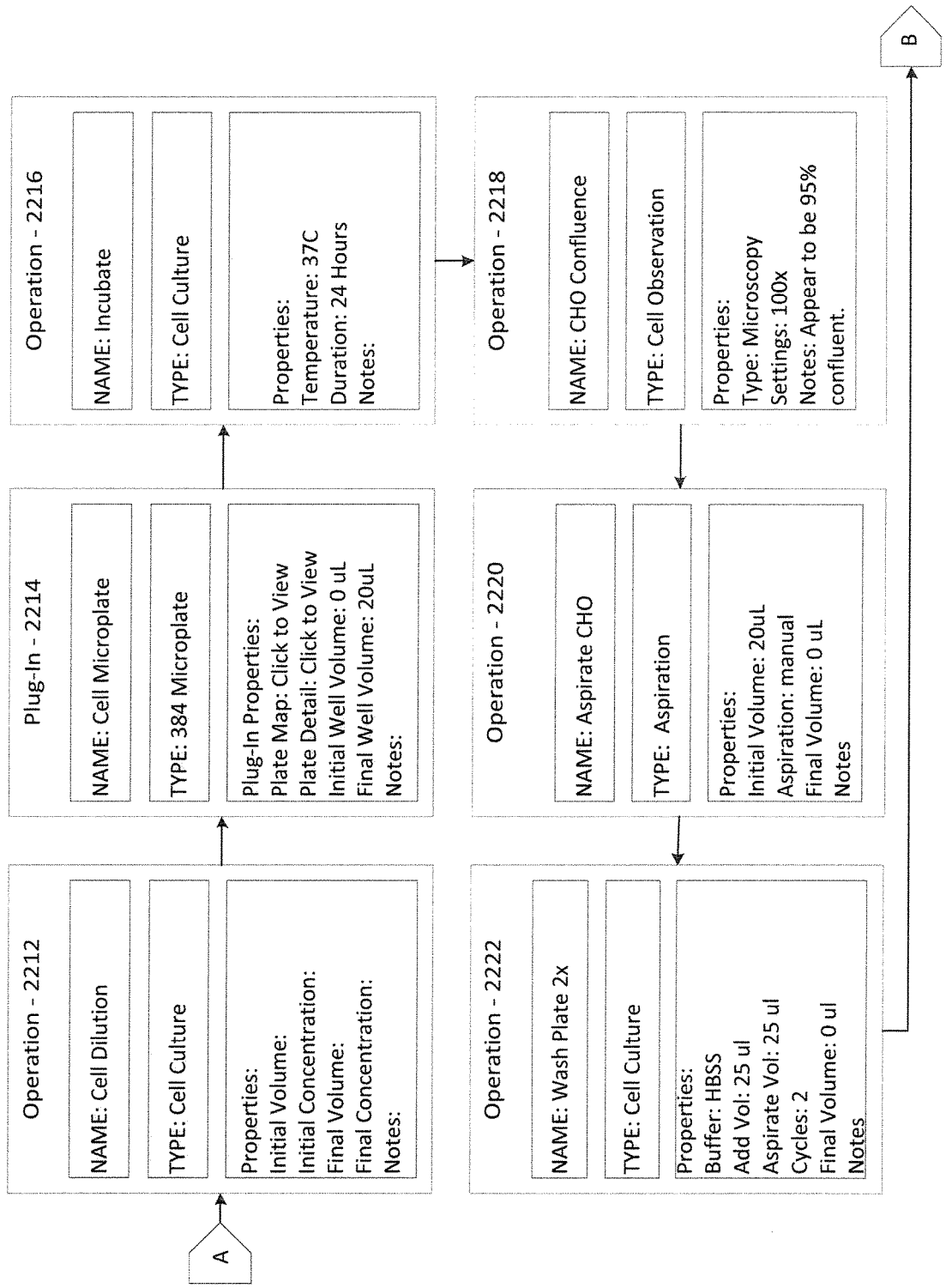
FIG. 22B illustrates an exemplary process and assay workflow using the example assay described in FIGS. 21A and 21B, of certain embodiments.

Continuing from FIG. 22A to FIG. 22B, cell dilution is an operation of the type cell culture with properties including initial volume, initial concentration, final volume, final concentration, and notes (2212). Cell microplate is a plugin of the type 384 microplate with a variety of properties including plate map, plate details, initial well volume, final well volume, and notes (2214). The 384-well microplate contains 384 wells arranged in a matrix of 16 rows and 24 columns. Since this item is a plugin, it has a specific set of properties such as a well plate map and a variety of details. One example plugin for a 384-well microplate is described in detail in FIG. 26. Incubate is an operations of type cell culture with properties including temperature, duration, and notes (2216). Verifying CHO cell confluence is an operation of type cell observation with properties including verification type, settings, and notes (2218). This may be an intermediate result in the assay, and the user may optionally choose to include both written notes and attach a photo of the observation if needed. Aspirate CHO is an operation of type aspiration with properties including initial volume, aspiration method, final volume, and notes (2220). Wash plate twice (2×) is an operation of type cell culture with properties including the buffer used, the addition volume, aspirate volume, number of cycles, final volume and notes (2222).

Figure 26:
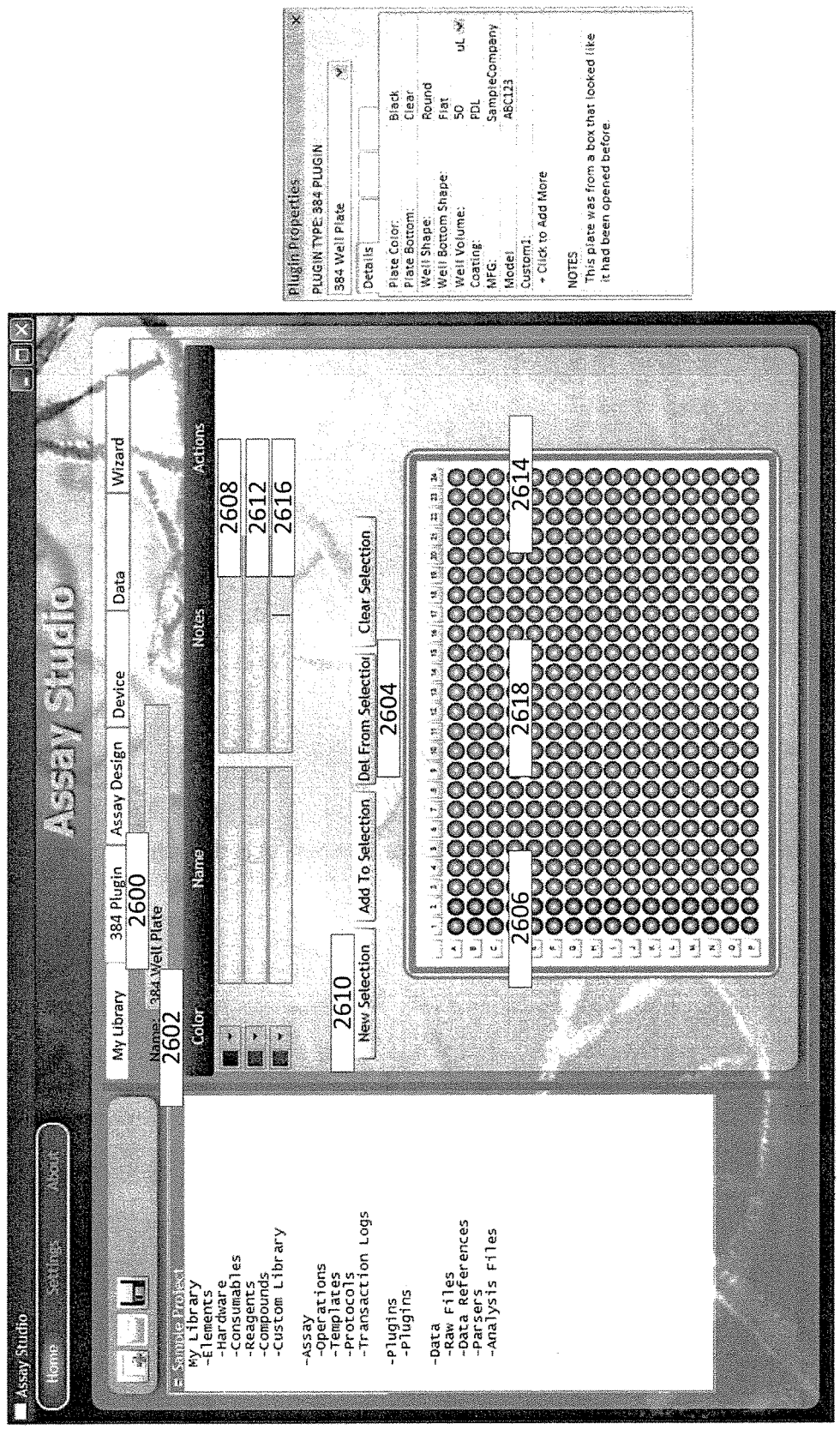
FIG. 26 illustrates an exemplary graphical user interface for generating assays, including the software plugin interface for a plugin, of certain embodiments.
Figure 27A:
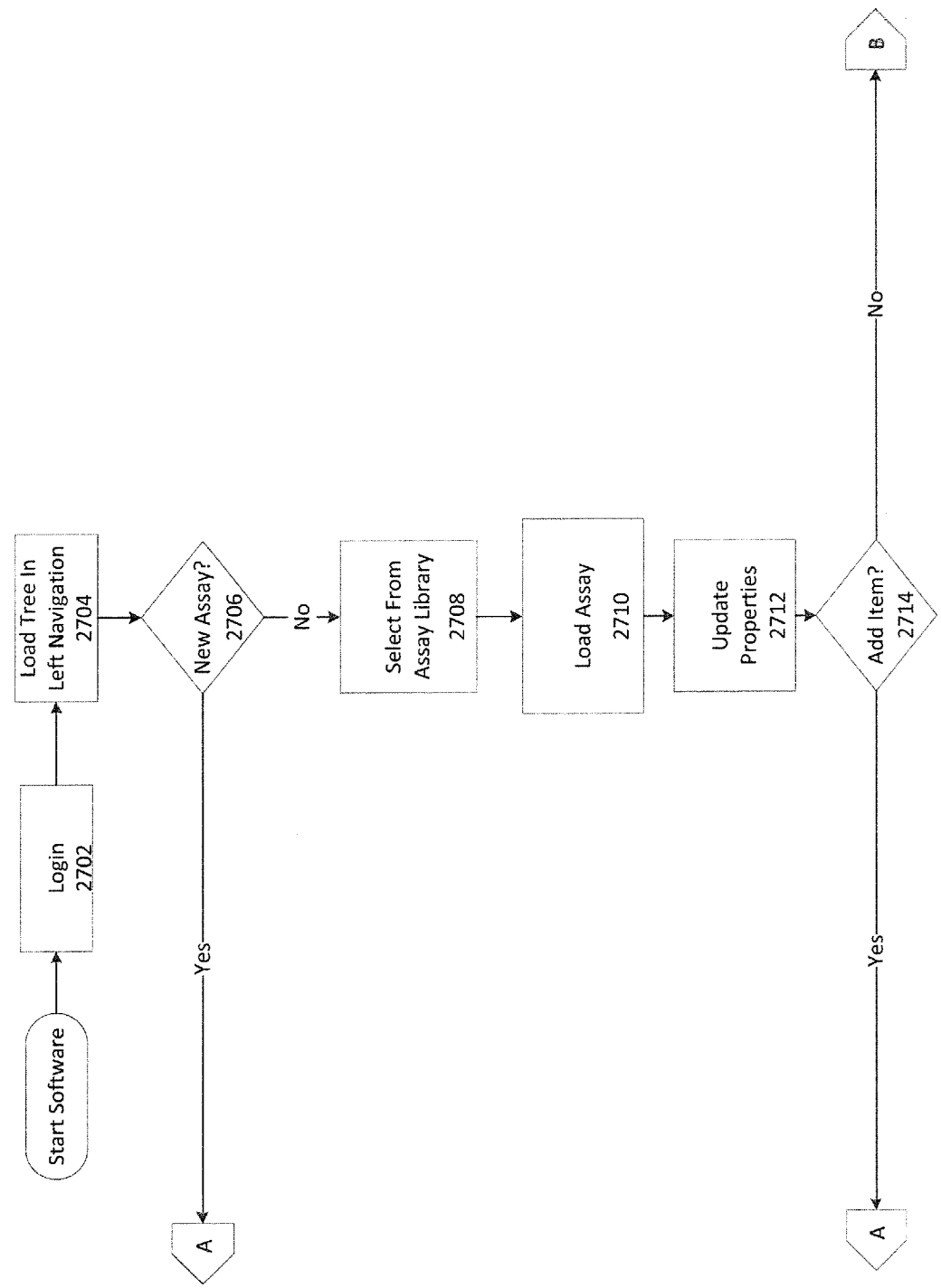
FIG. 27A illustrates an exemplary logical assay workflow, of certain embodiments.
Figure 27B:
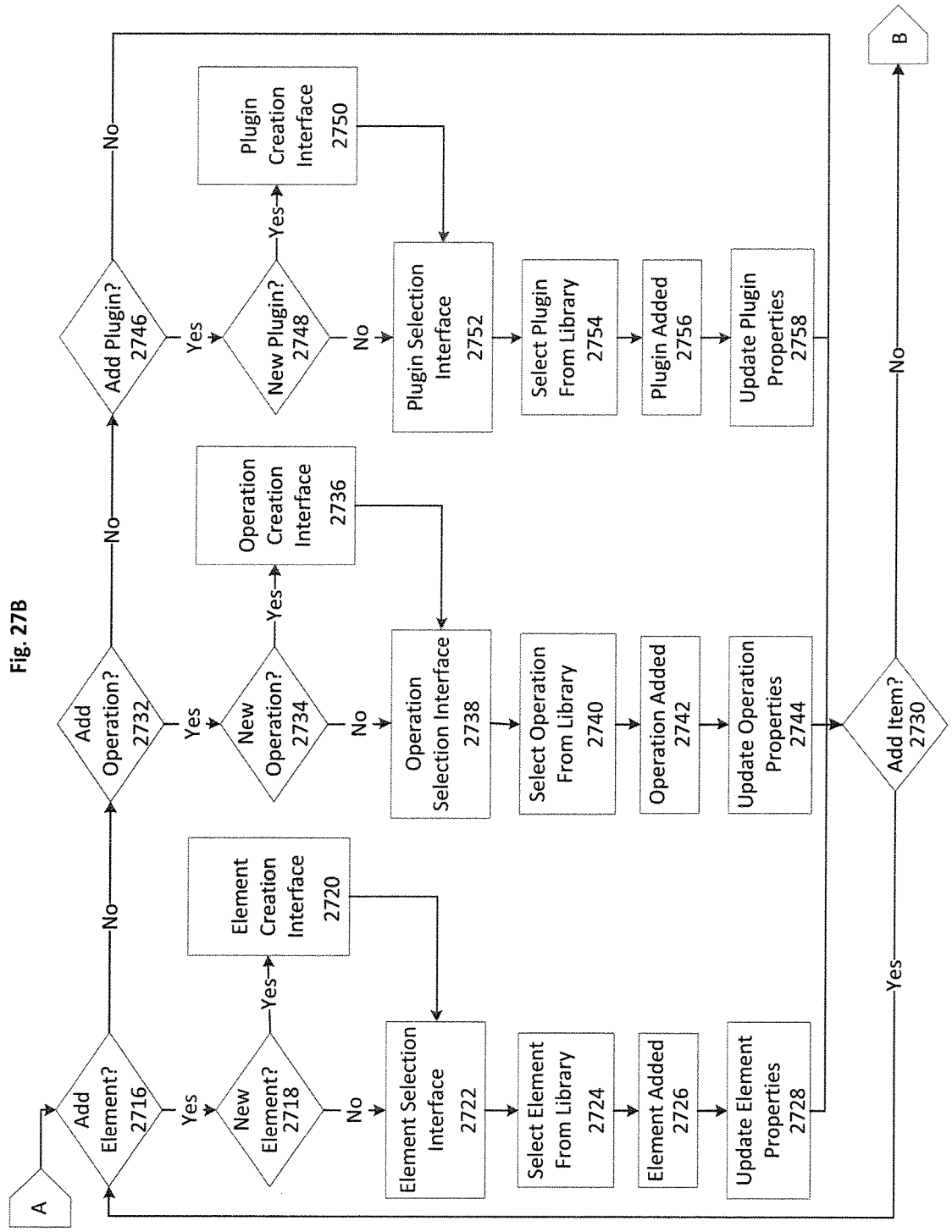
FIG. 27B illustrates an exemplary logical assay workflow, of certain embodiments.
Figure 27C:
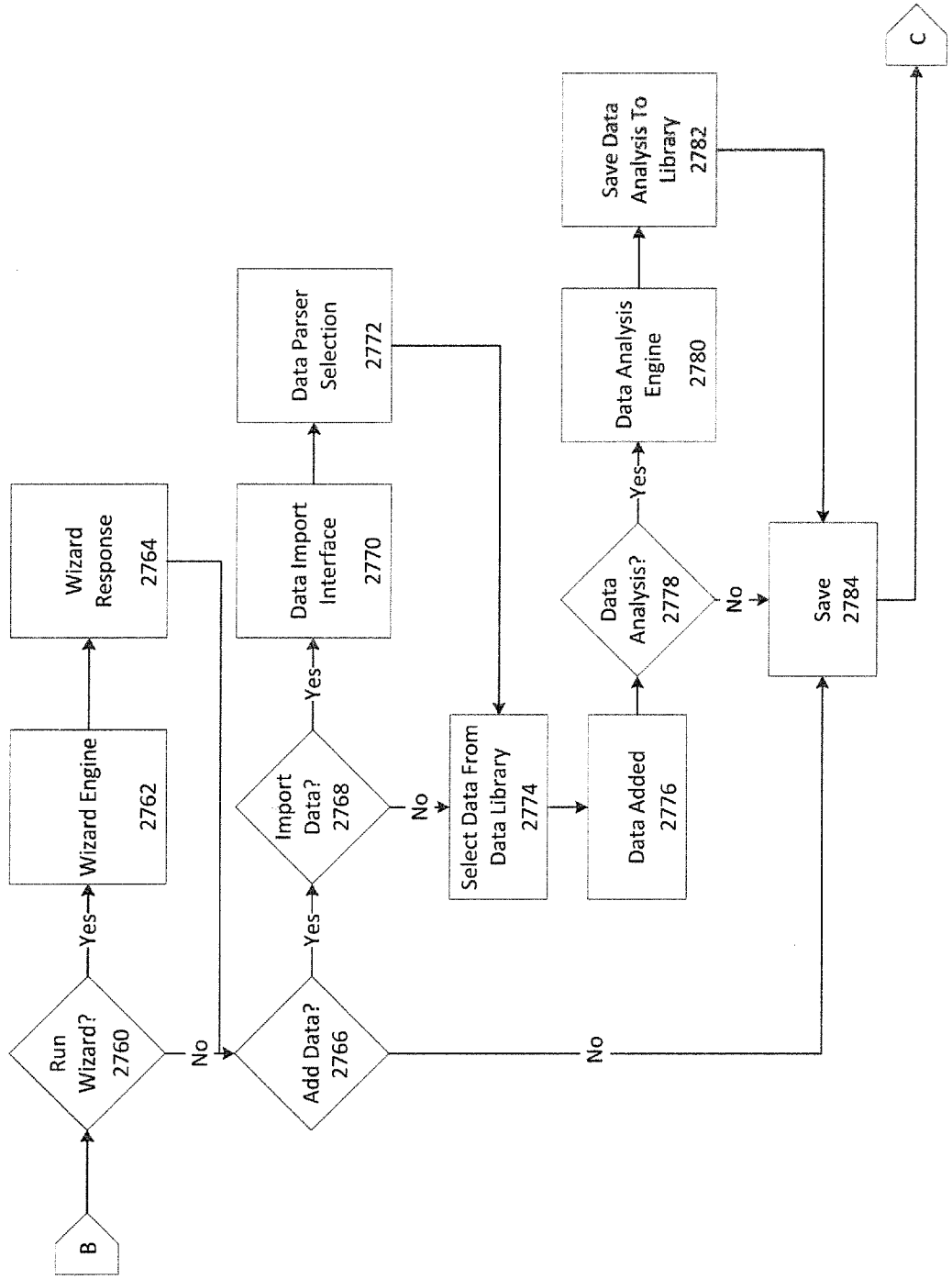
FIG. 27C illustrates an exemplary logical assay workflow, of certain embodiments.
Figure 27D:
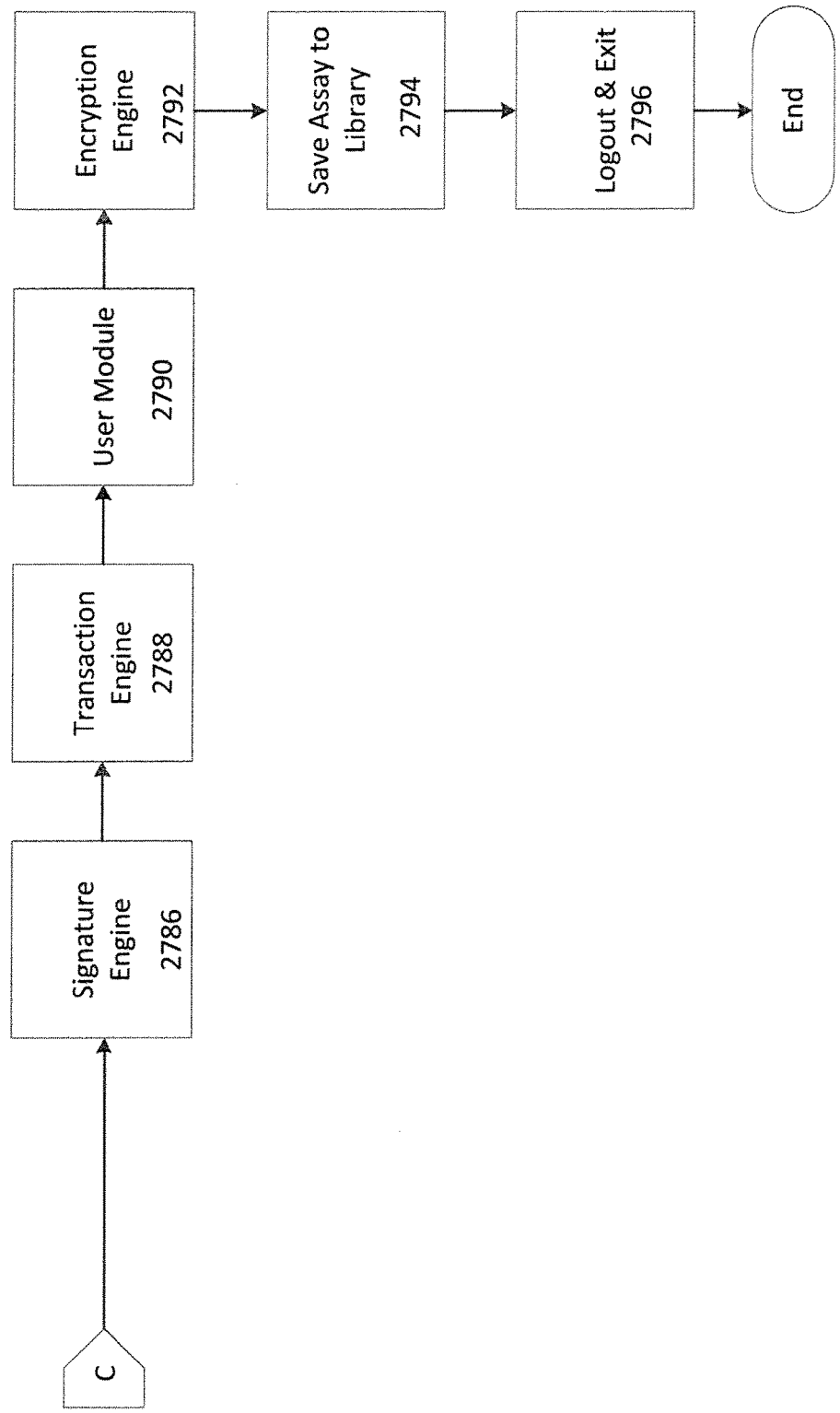
FIG. 27D illustrates an exemplary logical assay workflow, of certain embodiments.

Continuing from FIG. 22B to FIG. 22C, Dye Buffer ABC is an element of type reagent with properties including buffer volume, dye volume, final volume, final concentration, and notes. CHO dye exposure is an operation of type dispense with properties including dispensed material, initial volume, initial concentration, final volume, final concentration, and notes (2226). Incubate is an operation of type cell culture with properties including temperature, duration, and notes (2228). Aspirate CHO is an operation of type aspiration with properties including initial volume, aspiration method, final volume, and notes (2230). Wash plate twice (2×) is an operation of type cell culture with properties including the buffer used, the addition volume, aspirate volume, number of cycles, final volume and notes (2232). Drug 123 Microplate is a plugin of the type 384 microplate with a variety of properties including plate map, plate details, initial well volume, final well volume, and notes (2234). The 384-well microplate contains 384 wells arranged in a matrix of 16 rows and 24 columns. Since this item is a plugin, it has a specific set of properties such as a well plate map and a variety of details. FIG. 26 described an exemplary plugin for a 384-well microplate in detail.

Figure 22D:
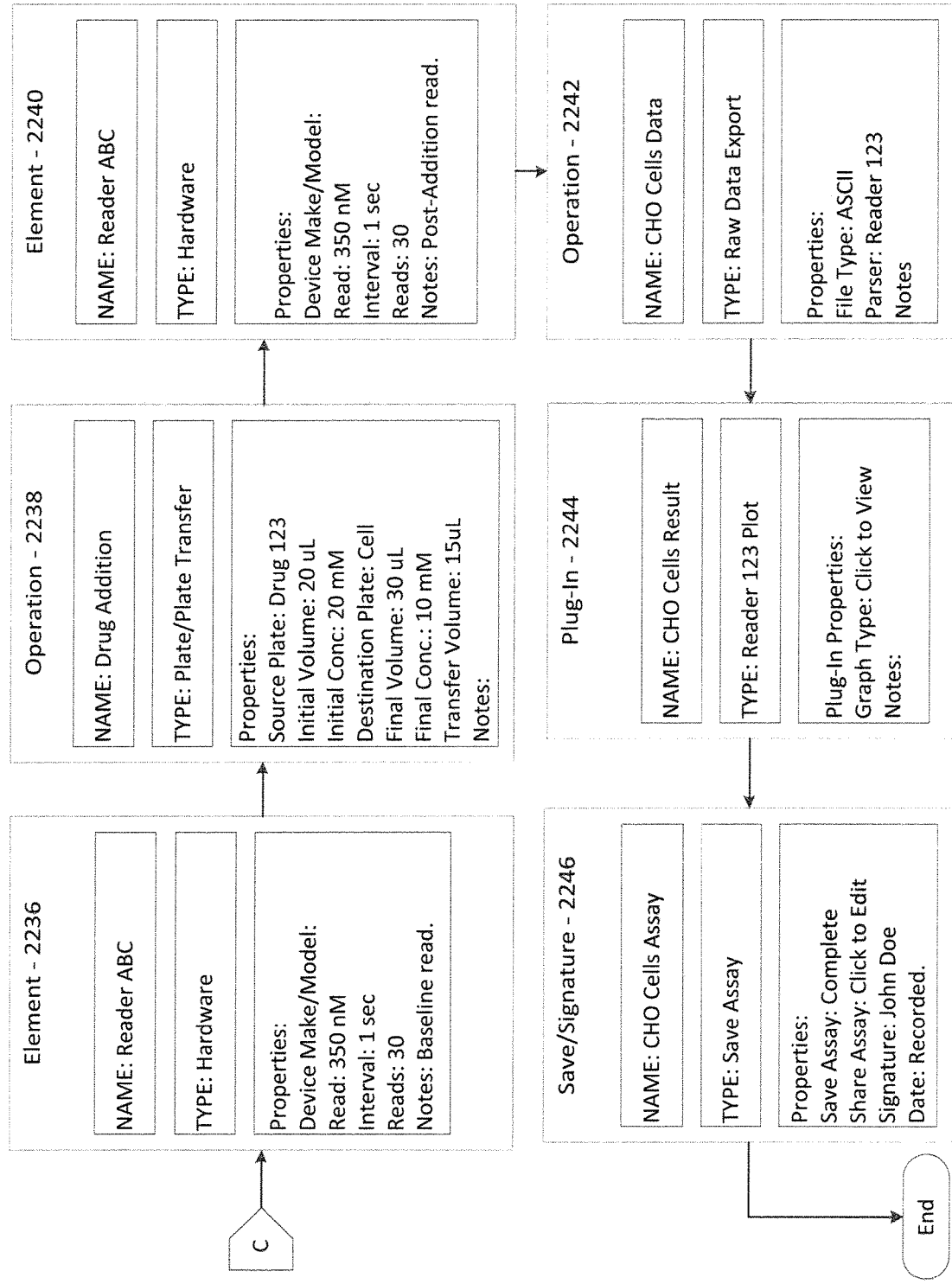
FIG. 22D illustrates an exemplary process and assay workflow using the example assay described in FIGS. 21A and 21B, of certain embodiments.

Continuing from FIG. 22C to FIG. 22D, Reader ABC is an element of type hardware with properties including device make, model, read wavelength, read interval, number of desired reads, and notes (2236). Here Reader ABC is being used to perform a baseline, or pre-addition read. Drug addition is an operation of type plate/plate transfer with properties including source plate, initial volume, initial concentration, destination plate, final volume, final concentration, transfer volume, and notes (2238). Reader ABC is an element of type hardware with properties including device make, model, read wavelength, read interval, number of desired reads, and notes (2240). Here Reader ABC is being used to perform a post-addition read after cells have been exposed to various agents. CHO cells data is an operation of type raw data export with properties including file type, parser used, and notes (2242). CHO cells result is a plugin of type Reader 123 Plot with properties including graph type, and notes (2244). Save and signature is performed as a final step of type save assay which has properties including save assay type, share assay, signature, and date (2246).

Figure 23:
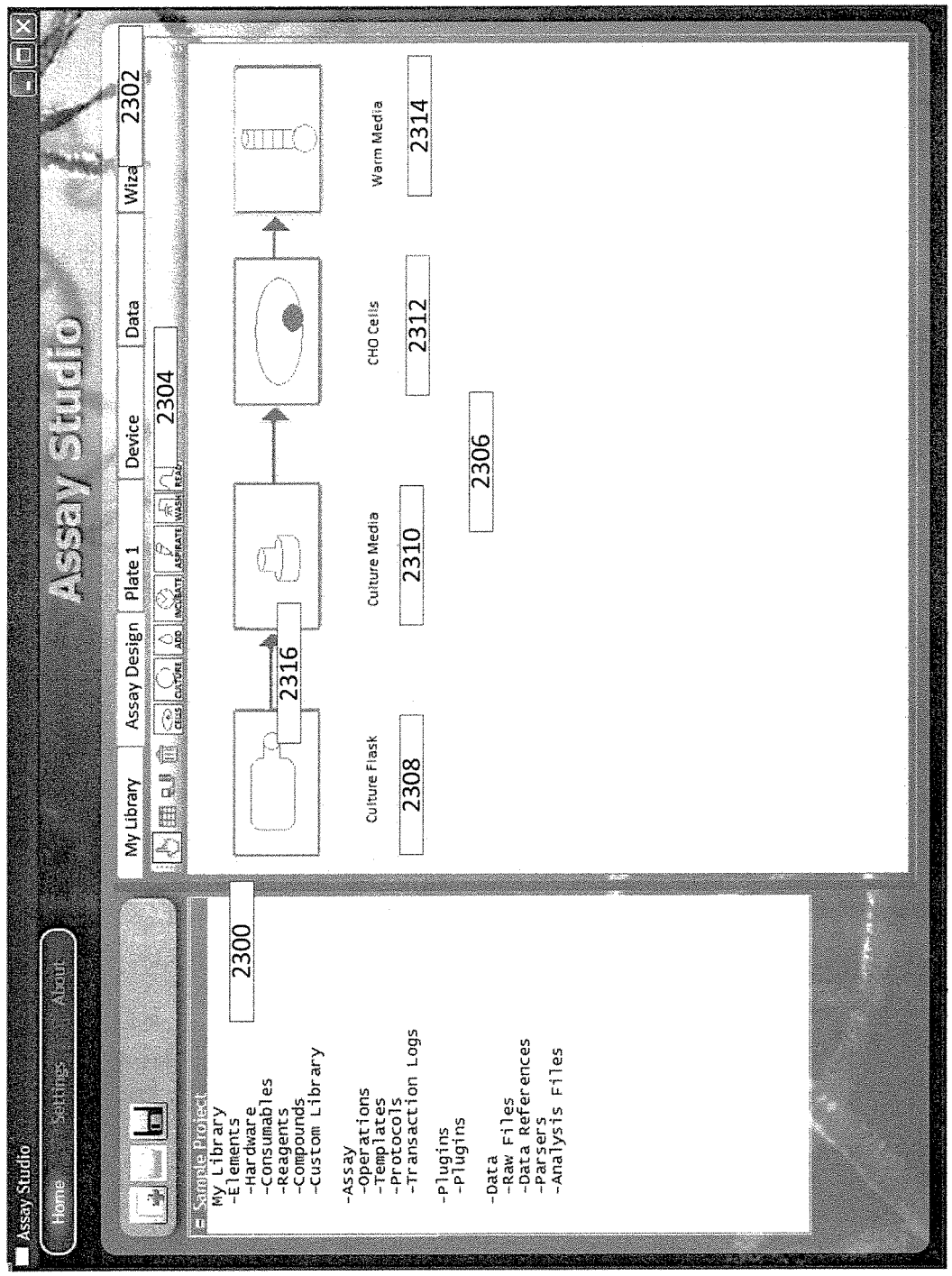
FIG. 23 illustrates an exemplary graphical user interface for generating assays, of certain embodiments.

FIG. 23 illustrates an exemplary graphical user interface from the assay software techniques described herein. The software includes a graphical user interface (GUI) which would allow a user to visually design an assay using elements, operations, and plugins as outlined in FIG. 22, including left tree navigation (2300), tabbed navigation panel (2302), customized toolbar with commonly used iconic representations of elements, operations, and plugins (2304), workspace (2306), example icons such as a culture flask element icon (2308), culture media element icon (2310), cells element icon (2312), warm media operation icon (2314), linking relationships (2316).

Figure 24:
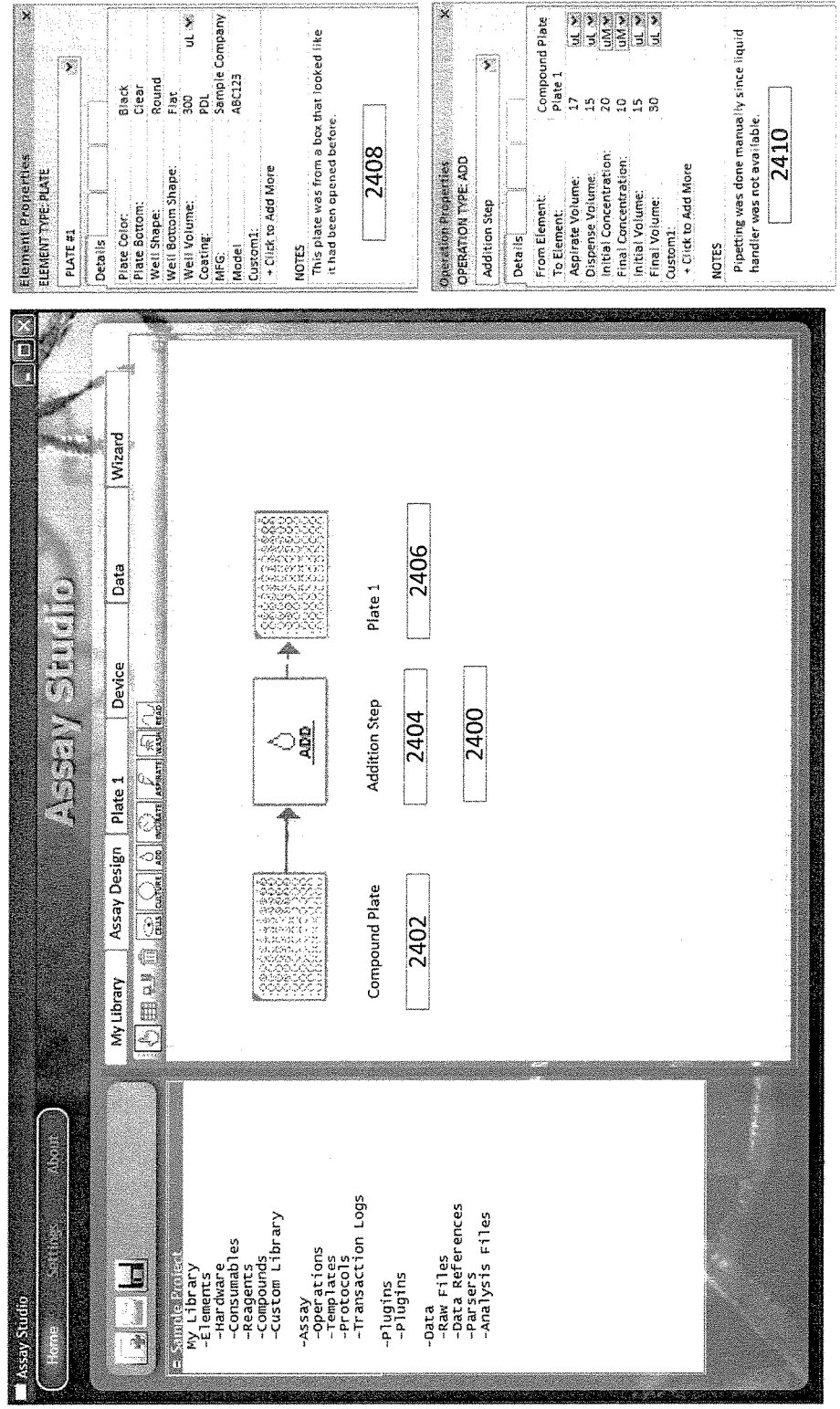
FIG. 24 illustrates an exemplary graphical user interface for generating assays, including a properties interface, of certain embodiments.

The interface left tree navigation (2300) allows the user to quickly access various files in the assay project. The Assay Design is part of a tabbed navigation panel (2302) allowing the user to click between panel views. The Assay Design panel includes a customized toolbar with commonly used iconic representations of elements, operations, and plugins (2304). The user can click or drag the icon to the workspace (2306) and create relationship links between the items. The culture flask element (2200 of FIG. 22) is depicted as a culture flask element icon (2308). The culture media element (2202 of FIG. 22) is depicted as a culture media element icon (2310). The CHO cells element (2204 of FIG. 22) is depicted as a CHO cells element icon (2312). The warm media operation (2206 of FIG. 22) is depicted as a warm media operation icon (2314). Assay components can be linked to one another (2316) and relationships can be defined. The use of visual icons as assay steps results in fast assay design and implementation. For example, a user can simply select the elements, operations, and plugins through the graphical interface, and the software converts the selected objects into the detailed data file. Additionally, visual representation allows the viewer to quickly understand the steps involved in the assay and serves as powerful tool for sharing information. Furthermore, the properties of each element, operation, and plugin can be defined. FIG. 24 shows the properties box in detail. By linking elements, operations, plugins to each other and defining properties for each component, a robust set of information is quickly assembled using a visual interface.

FIG. 24 illustrates an exemplary graphical user interface (GUI) of the software as described in FIG. 23 and depicts an example properties interface for the current techniques described herein. The software includes the Assay Design workspace (2400), a compound plate element (2402), an addition step operation (2404), the destination plate element (2406), an element properties box (2408), and an operations properties box (2410). The Assay Design workspace (2400) depicts a compound plate element (2402), an addition step operation (2404), and the destination plate of the addition operation (2406). The properties of the element depicted in (2406) are shown in the element properties box (2408). Properties may include a variety of default and custom attributes which can be defined by the user. The properties box (2408) includes plate color, plate bottom, well shape, well bottom shape, well volume, coating, manufacturer, model number, custom attribute option, and notes (2408). These properties are associated with the element of name Plate #1, which is an element of type plate. This allows the user to enter this information once, and pull this specific element from the library at any time, and simply edit the properties as needed without necessarily needing to re-enter the information. This makes routine assay components readily available to the user. Furthermore, the user can use visual icons to create assay designs with a drag/drop action, pre-populate the properties which are stored with the specific element, and only update changes. The addition step is an operation of type add with a unique set of properties including from element, to element, aspirate volume, dispense volume, initial concentration, final concentration, initial volume, final volume, a custom attribute option, and notes (2410). Once again, the properties can be associated with this specific operation and be updated as needed by the user. The properties of each element, operation, and plugin allow the Wizard (described in FIG. 6) to evaluate assay parameters and warn the user if a parameter does not meet the correct value or rule criteria. For example, should a user indicate a total volume of 20 uL when 10 uL is added to a well containing 15 uL, then the Wizard could evaluate this information from the properties and warn the user that the final volume is not accurate. Furthermore, if a custom rule is violated, the Wizard could warn the user based on the properties of the element, operation, or plugin used. One such rule may be set to have a maximum passage number for a cell type. If element properties indicate cells used have a passage number of 12 which exceeds the maximum rule value of 10, the Wizard could warn the user.

FIGS. 25A-25H is an example of a transaction log file. This file sequentially includes all elements, operations, plugins, and their respective properties used in an experiment along with the user signature and timestamp. The transaction log file may begin with the user name, date, and timestamp as show in FIG. 25A. The first element in the transaction log file is shown in FIG. 25A as being the same data for the element in step 2200 of FIG. 22A. This element is an element of type consumable with the name Culture Flask and has properties including manufacturer, model number, volume capacity, initial volume, and notes. The element including all properties are displayed in the transaction log file. The next element in the transaction log file is based on the second element shown in step 2202 of FIG. 22A, which is an element of type reagent with the name Culture Media have the properties of HBSS volume of 89 mL, FBS volume of 10 mL, Pen/Strep volume of 1 mL, a final volume of 100 mL, and notes. As shown, these properties can be extracted directly from the assay and included in the transaction file. The transaction file follows sequentially the elements, operations, plugins, data, and respective properties as shown in the assay software (FIGS. 22A-22D). The transaction log file may also include user name, date, timestamp, and external validation keys may also be added in some embodiments to provide $3^{rd}$-party validation and added security to date, timestamp, and user information as part of this file. This file can be stored in the Assay Library (320) of FIG. 3. Furthermore, this transaction log file can be stored externally in the Intranet Network Library (120) or elsewhere such that it can be accessed by an administrator. The file is also searchable which allows an administrator to perform such tasks as querying users, assays, and more as described in FIG. 20. The transaction log file may be of value when evidence of assay performed is required. It may also serve as an audit trail.

FIG. 26 illustrates an exemplary graphical user interface (GUI) of the software plugin interface for a plugin of type 384 Plugin. The plugin of type 384 Plugin (2600) named 384 Well Plate (2602) includes a plate map or virtual microplate (2604), various well map area markers (2606), (2618), (2614), a method for creating new selections (2610), and labels for plate well areas (2608), (2612), (2616).

This example depicts a plugin with a specialized properties interface (2600). While elements and operations have properties boxes, plugins may have the option of a specialized properties interface. In this example, the plugin of type 384 Plugin (2600) named 384 Well Plate (2602) is shown. Microplates are common in assays and are available in a variety of matrix sizes. Each well in a microplate may contain different experiments with different experimental parameters. In the plugin, a plate map or microplate is shown (2604). The map depicts various areas within the microplate. For example, the first 2 columns (2606) may contain positive controls—substances known to show a positive response. The positive control wells are also labeled at the top of the plate by color, name, and notes (2608) and assigned a unique color on the map (2606). The user can assign as many wells with as many labels as needed to create a plate map. Controls allow the user to add to a selection, remove a selection, clear a selection, or create a new selection on the plate (2610). The negative controls are wells which should not elicit a response in the assay (2612). These wells are shown on the far right of the plate map (2614). The experimental wells are labeled at the top (2616) and shown in the center area of the plate map by color (2618). This type of plugin with a specialized properties interface allows the user to visually design the plate map for an assay. Furthermore, the plate map may be used for many experiments since it can be stored as a template in the library (330). The user can run many plates (as often occurs in high throughput screening labs) using the same template without having to re-enter properties. Additionally, technology providers (e.g.: assay kit providers) can prepare such plugins and allow users to download them such that the user can quickly run an assay as described by the manufacturer. Furthermore, this is only one type of plugin that can be created. Specialized properties interface plugins can be provided for DNA assays, protein assays, synthesis assays, petrochemical assays, and more as described in FIG. 5. Users can use a plugin creation interface (506) to design plugins for use with particular or custom assays. They can be stored in the local device Library (200), Intranet Network Library (120), or Extranet Main Network Library (160) to be shared with the global community as well as other locations.

FIGS. 27A, 27B, 27C, and 27D illustrates a logical assay workflow using the software techniques described herein. The user starts the software and begins with a login (2702) process. Once logged in, a navigation tree is loaded in the left panel (2704). The user may create a new assay (2706) or load an existing assay.

If the assay is an existing assay, the user selects the assay from the assay library (2708). The selected assay is loaded in the assay design panel (2710). The user can update the properties of the elements, operations, and plugins (2714). The user can also remove elements, operations, and plugins as desired or add items (2714) such as elements, operations, and plugins to the assay.

Continuing from 27A to 27B, if the user chooses to build a new assay, the user may choose to add an element (2716), an operation (2732), or a plugin (2746). If the user chooses to add a new element (2718), they can create a new element using the element creation interface (2720) which is added to the library. The user can select the new or existing element using the element selection interface (2722) which selects the element from a library (2724). The element is then added to the workspace (2726) and the user can update the element properties (2728). The user may choose to add more items such as element, operations, or plugins (2730).

If the user chooses to add an operation (2732) the user can add a new operation (2734) and create the new operation using the operation creation interface (2736) which adds the new operation to the library. The user can select the new or existing operation using the operation selection interface (2738) which selects the operation from a library (2740). The operation is then added to the workspace (2742) and the user can update the operation properties (2744). The user may choose to add more items such as element, operations, or plugins (2730).

If the user chooses to add a plugin (2746) the user can add a new plugin (2748) and create the plugin using the plugin creation interface (2750) which adds the new plugin to the library. The user can select the new or existing plugin using the plugin selection interface (2752) which selects the plugin from a library (2754). The plugin is then added to the workspace (2756) and the user can update the plugin properties (2758). The user may choose to add more items such as element, operations, or plugins (2730).

Continuing from 27B to 27C, if the user chooses to not add additional elements, operations, or plugins (2730) and (2714), the user can choose to run the wizard (2760). If the wizard is started, the wizard engine (2762) can evaluate the properties of all elements, operations, and plugins in the assay and provide a response to the user via wizard response (2764). The user may then also choose to add data to the assay (2766).

Alternatively, the user may choose not to run the wizard. The user may also choose to add data to the assay (2766). If the user chooses not to add data, the user may save the assay (2784). If the user chooses to add data to the assay they may import the data (2768) and use the data import interface (2770) and select a parser for the data (2772) and add the data to the library. The data can be selected from the data library (2774) and added to the assay (2776).

The user may choose to perform data analysis on the data (2778). Data analysis can be performed with the data analysis engine (2780) and the data analysis can be saved to the library (2782). Assay can be saved (2784). Alternatively, if the user chooses not to perform data analysis, the assay can be saved as well (2784).

Continuing from 27C to 27D, the user can add their signature to the assay using the signature engine (2786). The transaction file is also generated using the transaction engine (2788), user module 2790, and encryption engine (2792) which generates the transaction file as described in FIG. 11 and FIG. 25. The assay is saved to the library (2794). The user may logout end exit (2796).

The saved assays or components can be shared with the team or with the global community as described in FIGS. 16A-16B, FIGS. 17A-17B, FIGS. 18A-18B, and FIGS. 19A-19B.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

While the foregoing refers to the "invention," this disclosure may include more than one invention.

What is claimed is:

1. A computerized method for collaboratively developing and controlling the execution of an assay specification among groups of users with different responsibilities for the assay specification, the method comprising the following steps performed by a computing device:

storing in a database:
  a set of user-selectable element data objects, each element data object defining a component that can be used in one or more assays;
  a set of user-selectable operation data objects, each operation data object defining an action that can be performed for one or more element data objects; and
  a set of validation rules to determine whether an identified set of element data objects and an identified set of operation data objects define valid assay operations that may be performed by a user;
displaying on a graphical interface the set of user-selectable element data objects and the set of user-selectable operation data objects;
receiving, from a first user, data indicative of selecting, for a first portion of a candidate assay specification:
  a first set of element data objects from the set of element data objects; and
  a first set of operation data objects from the set of operation data objects, each operation data object from the first set of operation data objects defining an action to perform on one or more of the element data objects from the first set of selected element data objects and specifying a controlled temporal order of actions on the first set of element data objects;
displaying on a graphical interface a digital workspace, a graphical representation of the selected first set of element data objects from the set of element data objects, and the first set of operation data objects from the set of operation data objects based on the received data indicative of the selection;
executing validation rules to validate the first set of element data objects and the first set of operation data objects;
generating the first portion of the candidate assay specification based on the received data, the first portion of a candidate assay specification comprising a specification of the first set of element data objects and the first set of operation data objects;
sharing the first portion of the candidate assay specification to a library that is accessible by other groups of users in addition to the first user;
receiving, from a second user in a different group than that of the first user, data indicative of the second user selecting the first portion of the candidate assay specification;
receiving, from the second user, second data indicative of selecting, for a second portion of the candidate assay specification based on the first portion of the candidate assay specification:

a second set of element data objects from the set of element data objects; and
a second set of operation data objects from the set of operation data objects, each operation data object from the second set of operation data objects defining an action to perform on one or more of the element data objects from the second set of selected element data objects and specifying a controlled temporal order of actions for execution on the second set of element data objects;
executing validation rules to validate that:
  the second set of element data objects and the second set of operation data objects specify valid assay operations; and
  the second set of element data objects and the second set of operation data objects specify valid assay operations when executed in conjunction with the entire first portion of the candidate assay specification; and
generating the candidate assay specification based on the first and second portions, the candidate assay specification comprising a full specification of the first and second sets of element data objects and the first and second sets of operation data objects, wherein generating the candidate assay specification comprises converting a graphical representation of the selected first and second sets of element data objects and the first and second sets of operation data objects to a text-based assay data file.

2. The computerized method of claim 1, further comprising:

generating step-by-step execution instructions for the candidate assay specification, each step listing one or more physical components from the first set of element data objects, and one or more actions, from the set of operation data objects, to perform on the one or more physical components;
displaying a first step from the step-by-step execution instructions;
receiving data indicative of a completion of the first step; and
recording a completion timestamp of the first step to update a transaction log file to record completion of the first step of the candidate assay specification, wherein the transaction log file includes data from the candidate assay specification performed by a user so that the transaction log file records the operations performed and specified by the user.

3. The computerized method of claim 1, further comprising:

sharing different portions of the candidate assay specification with third and fourth users such that each user cannot access the portion of the candidate assay specification available to the other user;
receiving data indicative of execution of the shared different portions of the assay from each of the third and fourth users, comprising:
execution of one or more element data objects from the set of user-selectable element data objects by each of the third and fourth users;
execution of one or more user-selectable operation data objects from the set of user-selectable operation data objects by each of the third and fourth users;
or both; and
generating a transaction log file that includes data from the candidate assay specification performed by the third and fourth user to record the operations performed and specified by the third and fourth user, such that individual interaction with the candidate assay specification can be tracked over time for each of the first and second user.

4. The computerized method of claim 1, further comprising:
receiving data indicative of a request to purchase a physical component defined by an element data object, wherein the element data object includes data indicative of a vendor of the physical component; and
transmitting an order request to the vendor for the physical component.

5. The computerized method of claim 1, further comprising:
receiving data indicative of a request to load a second candidate assay specification;
and generating a graphical representation of the second candidate assay specification.

6. The computerized method of claim 3, further comprising:
checking permission data associated with the second user for access to the first portion;
determining, based on the permission data associated with the second user, that the second user does not have permission to access the at least portions of the first portion;
generating an abbreviated first portion of the candidate assay specification that includes: a subset of element data objects from the first set of element data objects that the second user has permission to access; and
a subset of operation data objects from the first set of operation data objects that the second user has permission to access.

7. The computerized method of claim 3, further comprising:
receiving data indicative of a request for transaction information from each of the third and fourth users; and
providing, to each of the third and fourth users, data indicative of transaction information from the transaction log file for the portion of the candidate assay specification shared with each of the third and fourth users, the data comprising individual status information for the user indicative of each of the third and fourth users' steps, assays, and procedures performed for the full candidate assay specification.

8. The computerized method of claim 7, further comprising:
receiving data indicative of a search item, the search item comprising a user-selectable element data object from the set of user-selectable element data objects, a user-selectable operation data object from the set of user-selectable operation data objects, or both;
determining that one or more transaction log files of the candidate assay specification includes the search item; and
providing data indicative of the one or more transaction log files.

9. The computerized method of claim 1, further comprising generating a transaction log file for the candidate assay specification, wherein the transaction log file includes data from the candidate assay specification performed by the first user to record:
addition of one or more new element data objects from the set of user-selectable element data objects that are performed;
addition of one or more new user-selectable operation data objects from the set of user-selectable operation data objects that are performed;
or both.

10. The computerized method of claim 1, wherein generating the candidate assay specification comprises updating the candidate assay specification to reflect:
deletion of one or more element data objects from the set of user-selectable element data objects;
deletion of one or more user-selectable operation data objects from the set of user-selectable operation data objects; or both.

11. The computerized method of claim 1, further comprising:
receiving data indicative of a stroked signature from a device with a touchscreen for a user's execution of the candidate assay specification, wherein the stroked signature is indicative of completion of a step of executing the candidate assay specification; and
updating a transaction log file for the candidate assay specification to include data indicative of completion of the step and the stroked signature.

12. The computerized method of claim 3, wherein generating the transaction log file comprises storing a timestamp for each item recorded in the transaction log file to include historical data associated with the data from the candidate assay specification that is performed.

13. The computerized method of claim 3, wherein generating the transaction log file for the candidate assay specification comprises:
determining that the data from the candidate assay specification performed by each of the third and fourth users comprises an error based on the candidate assay specification; and generating a warning to alert the user of the error.

14. A computer implemented system for collaboratively developing and controlling the execution of an assay specification among groups of users with different responsibilities for the assay specification, the system comprising:
one or more memory devices that store instructions; and
one or more processors that execute the instructions to:
store in a database:
a set of user-selectable element data objects, each element data object defining a component that can be used in one or more assays;
a set of user-selectable operation data objects, each operation data object defining an action that can be performed for one or more element data objects; and
a set of validation rules to determine whether an identified set of element data objects and an identified set of operation data objects define valid assay operations that may be performed by a user;
display on a graphical interface the set of user-selectable element data objects and the set of user-selectable operation data objects;
receive, from a first user, data indicative of selecting, for a first portion of a candidate assay specification:
a first set of element data objects from the set of element data objects; and
a first set of operation data objects from the set of operation data objects, each operation data object from the first set of operation data objects defining an action to perform on one or more of the element data objects from the first set of selected element data objects and specifying a controlled temporal order of actions on the first set of element data objects;

display, on a graphical interface a digital workspace, a graphical representation of the selected first set of element data objects from the set of element data objects, and the first set of operation data objects from the set of operation data objects based on the received data indicative of the selection;

execute validation rules to validate the first set of element data objects and the first set of operation data objects;

generate the first portion of the candidate assay specification based on the received data, the first portion of a candidate assay specification comprising a specification of the first set of element data objects and the first set of operation data objects;

sharing the first portion of the candidate assay specification to a library that is accessible by other groups of users in addition to the first user;

receive, from a second user in a different group than that of the first user, data indicative of the second user selecting the first portion of the candidate assay specification;

receive, from the second user, second data indicative of selecting, for a second portion of the candidate assay specification based on the first portion of the candidate assay specification:
a second set of element data objects from the set of element data objects; and
a second set of operation data objects from the set of operation data objects, each operation data object from the second set of operation data objects defining an action to perform on one or more of the element data objects from the second set of selected element data objects and specifying a controlled temporal order of actions for execution on the second set of element data objects;

execute validation rules to validate that:
the second set of element data objects and the second set of operation data objects specify valid assay operations; and
the second set of element data objects and the second set of operation data objects specify valid assay operations when executed in conjunction with the first portion of the candidate assay specification; and generate the candidate assay specification based on the first and second portions, the candidate assay specification comprising a full specification of the first and second sets of element data objects and the first and second sets of operation data objects, wherein generating the candidate assay specification comprises converting a graphical representation of the selected first and second sets of element data objects and the first and second sets of operation data objects to a text-based assay data file.

15. The computer implemented system of claim 14, wherein the one or more processors execute the instructions to:
share different portions of the candidate assay specification with third and fourth users such that each user cannot access the portion of the candidate assay specification available to the other user;
receive data indicative of execution of the shared different portions of the assay from each of the third and fourth users, comprising:
execution of one or more element data objects from the set of user-selectable element data objects by the each of the third and fourth users;
execution of one or more user-selectable operation data objects from the set of user-selectable operation data objects by the each of the third and fourth users;
or both; and
generate a transaction log file that includes data from the candidate assay specification performed by the third and fourth user to record the operations performed and specified by the third and fourth user, such that individual interaction with the candidate assay specification can be tracked over time for each of the third and fourth user.

16. The computer implemented system of claim 15, wherein the one or more processors execute the instructions to:
receive data indicative of a request for transaction information from each of the third and fourth users; and
provide, to each of the third and fourth users, data indicative of transaction information from the transaction log file for the portion of the candidate assay specification shared with each of the third and fourth users, the data comprising individual status information for the user indicative of each of the third and fourth users' steps, assays, and procedures performed for the full candidate assay specification.

17. A non-transitory computer readable medium for storing instructions that, when executed by one or more processors, cause the one or more processors to perform a method for collaboratively, developing and controlling the execution of an assay specification among groups of users with different responsibilities for the assay specification, comprising:
storing in a database:
a set of user-selectable element data objects, each element data object defining a component that can be used in one or more assays;
a set of user-selectable operation data objects, each operation data object defining an action that can be performed for one or more element data objects; and
a set of validation rules to determine whether an identified set of element data objects and an identified set of operation data objects define valid assay operations that may be performed by a user;
displaying on a graphical interface the set of user-selectable element data objects and the set of user-selectable operation data objects;
receiving, from a first user, data indicative of selecting, for a first portion of a candidate assay specification:
a first set of element data objects from the set of element data objects; and
a first set of operation data objects from the set of operation data objects, each operation data object from the first set of operation data objects defining an action to perform on one or more of the element data objects from the first set of selected element data objects and specifying a controlled temporal order of actions on the first set of element data objects;
displaying on a graphical interface a digital workspace, a graphical representation of the selected first set of element data objects from the set of element data objects, and the first set of operation data objects from the set of operation data objects based on the received data indicative of the selection;
executing validation rules to validate the first set of element data objects and the first set of operation data objects;
generating the first portion of the candidate assay specification based on the received data, the first portion of a candidate assay specification comprising a specification of the first set of element data objects and the first set of operation data objects;

sharing the first portion of the candidate assay specification to a library that is accessible by other groups of users in addition to the first user;

receiving, from a second user in a different group than that of the first user, data indicative of the second user selecting the first portion of the candidate assay specification;

receiving, from the second user, second data indicative of selecting, for a second portion of the candidate assay specification based on the first portion of the candidate assay specification:
- a second set of element data objects from the set of element data objects; and
- a second set of operation data objects from the set of operation data objects, each operation data object from the second set of operation data objects defining an action to perform on one or more of the element data objects from the second set of selected element data objects and specifying a controlled temporal order of actions for execution on the second set of element data objects;

executing validation rules to validate that:
- the second set of element data objects and the second set of operation data objects specify valid assay operations; and
- the second set of element data objects and the second set of operation data objects specify valid assay operations when executed in conjunction with the first portion of the candidate assay specification; and generating the candidate assay specification based on the first and second portions, the candidate assay specification comprising a full specification of the first and second sets of element data objects and the first and second sets of operation data objects, wherein generating the candidate assay specification comprises converting a graphical representation of the selected first and second sets of element data objects and the first and second sets of operation data objects to a text-based assay data file.

18. The non-transitory computer readable medium of claim 17, wherein the instructions cause the one or more processors to:

share different portions of the candidate assay specification with third and fourth users such that each user cannot access the portion of the candidate assay specification available to the other user;

receive data indicative of execution of the shared different portions of the assay from each of the third and fourth users, comprising:
- execution of one or more element data objects from the set of user-selectable element data objects by the user;
- execution of one or more user-selectable operation data objects from the set of user-selectable operation data objects by the user; or both; and generate a transaction log file that includes data from the candidate assay specification performed by the third and fourth user to record the operations performed and specified by the third and fourth user, such that individual interaction with the candidate assay specification can be tracked over time for each of the first and second user.

19. The computerized method of claim 1, wherein receiving the data from the first user indicative of selecting (a) the first set of element data objects and (b) the first set of operation data objects for the first portion of the candidate assay specification comprises receiving the data from the first user as the first user as the user performs an experiment without loading an assay.

* * * * *